US008538563B1

(12) United States Patent
Barber

(10) Patent No.: US 8,538,563 B1
(45) Date of Patent: Sep. 17, 2013

(54) SYSTEMS AND METHODS FOR PROVIDING FANTASY SPORTS CONTESTS WITH WAGERING OPPORTUNITIES

(75) Inventor: David Barber, Tulsa, OK (US)

(73) Assignee: United Video Properties, Inc., Santa Clara, CA (US)

( * ) Notice: Subject to any disclaimer, the term of this patent is extended or adjusted under 35 U.S.C. 154(b) by 2293 days.

(21) Appl. No.: 10/234,349

(22) Filed: Aug. 30, 2002

(51) Int. Cl.
*A63F 13/10* (2006.01)
*A63F 13/12* (2006.01)
*G07F 17/32* (2006.01)
*A63F 11/00* (2006.01)

(52) U.S. Cl.
CPC ........ *G07F 17/3276* (2013.01); *G07F 17/3288* (2013.01); *A63F 2011/0097* (2013.01); *A63F 2300/8052* (2013.01)
USPC .................................. 700/91; 463/28; 463/42

(58) Field of Classification Search
CPC .............. G07F 17/3204; G07F 17/323; G07F 17/3244; G07F 17/3272; G07F 17/3276; G07F 17/3288; G07F 17/3225; A63F 2300/61; A63F 2300/5533; A63F 2300/5546; A63F 2300/6009; A63F 2011/0097; A63F 2011/0072; A63F 2300/8052; A63F 13/10; A63F 13/12
USPC .................. 705/14; 700/91–93; 463/26–28, 463/2–4, 6–8, 25, 30–31, 40–42; 273/244, 273/244.1, 244.2, 245, 246, 247, 248, 259, 273/277, 298
See application file for complete search history.

(56) References Cited

U.S. PATENT DOCUMENTS

| | | | | |
|---|---|---|---|---|
| 4,322,612 | A * | 3/1982 | Lange | 463/28 |
| 4,527,798 | A * | 7/1985 | Siekierski et al. | 463/17 |
| 4,918,603 | A * | 4/1990 | Hughes et al. | 463/4 |
| 5,018,736 | A | 5/1991 | Pearson et al. | 273/439 |
| 5,263,723 | A | 11/1993 | Pearson et al. | 273/439 |
| 5,276,312 | A * | 1/1994 | McCarthy | 463/26 |
| 5,283,734 | A * | 2/1994 | Von Kohorn | 463/17 |
| 5,398,938 | A * | 3/1995 | Money | 463/61 |
| 5,489,096 | A * | 2/1996 | Aron | 273/138.1 |
| 5,564,701 | A * | 10/1996 | Dettor | 463/16 |

(Continued)

FOREIGN PATENT DOCUMENTS

| | | | |
|---|---|---|---|
| WO | WO 98/51384 | A1 * | 11/1998 |
| WO | WO 03/015403 | | 2/2003 |

OTHER PUBLICATIONS

"The Odds Against Me," by John Scarne, 1966, Simon & Schuster, New York.*

(Continued)

*Primary Examiner* — David L Lewis
*Assistant Examiner* — Matthew D. Hoel
(74) *Attorney, Agent, or Firm* — Ropes & Gray LLP

(57) ABSTRACT

Systems and methods for providing to a user the ability to use a fantasy sports contest application to access fantasy sports contests and wagering opportunities are presented. In some embodiments of the present invention, the fantasy sports contest application may provide to the user the ability to place a wager based on the user's performance in a fantasy sports contest. In some embodiments of the present invention, the fantasy sports contest may provide to the user the ability to place a wager based on a real-life sporting event that is related to a fantasy sports contest in which the user participates. The fantasy sports contest application may provide to the user the ability to place a wager for money, fantasy sports contest points, non-cash prizes and points redeemable for prizes.

184 Claims, 49 Drawing Sheets

(56) References Cited

U.S. PATENT DOCUMENTS

| | | | | |
|---|---|---|---|---|
| 5,575,474 | A * | 11/1996 | Rossides | 463/26 |
| 5,810,360 | A * | 9/1998 | Srichayaporn | 273/292 |
| 5,819,457 | A * | 10/1998 | Parker | 40/657 |
| 5,842,921 | A * | 12/1998 | Mindes et al. | 463/16 |
| 5,846,132 | A | 12/1998 | Junkin | 463/42 |
| 5,860,862 | A | 1/1999 | Junkin | 463/40 |
| 5,895,048 | A * | 4/1999 | Smith, Jr. | 273/293 |
| 5,898,762 | A * | 4/1999 | Katz | 379/93.12 |
| 5,971,854 | A * | 10/1999 | Pearson et al. | 463/41 |
| 6,001,016 | A * | 12/1999 | Walker et al. | 463/42 |
| 6,104,815 | A * | 8/2000 | Alcorn et al. | 380/251 |
| 6,112,128 | A * | 8/2000 | Steinmetz | 700/91 |
| 6,126,543 | A * | 10/2000 | Friedman | 463/16 |
| 6,193,610 | B1 | 2/2001 | Junkin | 463/40 |
| 6,236,900 | B1 * | 5/2001 | Geiger | 700/91 |
| 6,292,706 | B1 * | 9/2001 | Birch et al. | 700/91 |
| 6,347,086 | B1 * | 2/2002 | Strachan | 370/389 |
| 6,371,855 | B1 * | 4/2002 | Gavriloff | 463/42 |
| 6,527,270 | B2 * | 3/2003 | Maksymec et al. | 273/138.1 |
| 6,645,068 | B1 * | 11/2003 | Kelly et al. | 463/9 |
| 6,669,565 | B2 * | 12/2003 | Liegey | 463/42 |
| 6,688,978 | B1 * | 2/2004 | Herman | 463/25 |
| 6,695,701 | B2 * | 2/2004 | Aronson et al. | 463/28 |
| 6,939,137 | B1 * | 9/2005 | Colaio et al. | 434/107 |
| 7,275,990 | B2 * | 10/2007 | Walker et al. | 463/25 |
| 7,690,991 | B2 * | 4/2010 | Black | 463/26 |
| 2001/0019965 | A1 * | 9/2001 | Ochi | 463/25 |
| 2002/0013176 | A1 * | 1/2002 | Yoshimi et al. | 463/42 |
| 2002/0107073 | A1 * | 8/2002 | Binney | 463/42 |
| 2002/0143790 | A1 * | 10/2002 | Qian | 707/104.1 |
| 2003/0054885 | A1 * | 3/2003 | Pinto et al. | 463/42 |
| 2003/0096651 | A1 * | 5/2003 | Black | 463/42 |
| 2003/0199315 | A1 * | 10/2003 | Downes | 463/28 |
| 2003/0220143 | A1 * | 11/2003 | Shteyn et al. | 463/42 |

OTHER PUBLICATIONS

"The Odds Against Me," by John Scarne, 1966, Simon & Schuster, New York).*

"Scarne's Complete Guide to Gambling," by John Scarne, 1961, Simon & Schuster, New York.*

"Scarne's Complete Guide to Gambling," by John Scarne, 1961, Simon & Schuster, New York, N.Y., chapters on horse racing, sports betting, and numbers rackets.*

Cliff Charpentier, "1984 Fantasy Football Digest," Fantasy Sports Inc., Jun. 1984.

Jim Donaldson, "The Official Fantasy Football League Manual," Contemporary Books, Inc., 1985.

Cliff Charpentier, "1985 Fantasy Football Digest," Lerner Publications Company, 1985.

"All Pro Yearbook 1987: The Fantasy Football Magazine," All Pro Publishing Company, 1987.

BBC Sport, *Fantasy Football Monthly, The Game* <http://bbcfootball.fantasyleague.co.uk/ et al.> (accessed Sep. 17, 2002).

CNN Sports Illustrated, *Fantasy Football Challenge* <http://footballl2201.si.cnn.com/ et al.> (accessed Sep. 23, 2002).

CNN Sports Illustrated, *Fantasy Golf Challenge* <http://gold5.si.cnn.com/ et al.> (accessed Sep. 23, 2002).

CNN Sports Illustrated, *Fantasy Nascar Challenge* <http://racing20.si.cnn.com/ et al.> (accessed Sep. 23, 2002).

CBS SportsLine.com, *John B. Sample League* <http://cbs.sportsline.com/> ( accessed Nov. 24, 1999).

CBS SportsLine.com, *Fantasy Baseball* <http://baseball101.fantasy.sportsline.com/ et al.> (accessed Sep. 23-24, 2002).

CBS SportsLine.com, *Fantasy Football* <http://football2145.fantasy.sportsline.com et al.> (accessed Sep. 23-24, 2002).

CBS SportsLine.com, *Fantasy Golf* <http://golf1.fantasy.sportsline.com/ et al.> (accessed Sep. 23, 2002).

CBS SportsLine.com, *Fantasy Hockey* <http://hockey2102.fantasy.sportsline.com/ et al.> (accessed Sep. 23-24, 2002).

CBS SportsLine.com, *Fantasy Racing* <http://racing.fantasy.sportsline.com/ et al.> (accessed Sep. 23, 2002).

ESPN Internet Ventures, *ESPN Fantasy Games* <http://games.espn.go.com/cgi/home/request.dll?FRONTPAGE et al.> (accessed Sep. 16-18, 2002).

"Fantasy-Football," Franchise Football League, May 23, 2003.

"Strat-O-Matic Pro Football," Strat-O-Matic Game Co. Inc., May 23, 2003.

"2000 Fantasy Basketball, Help Topics," Fantasy Sports Properties, Inc., May 23, 2003.

"2000 Fantasy Football, Help Topics," Fantasy Sports Properties, Inc., May 23, 2003.

"2000 Fantasy Hockey, Help Topics," Fantasy Sports Properties, Inc., May 23, 2003.

"2001 Fantasy Baseball, Help Topics," Fantasy Sports Properties, Inc., May 23, 2003.

* cited by examiner

SYSTEMS AND METHODS FOR PROVIDING FANTASY SPORTS CONTESTS WITH WAGERING OPPORTUNITIES

BACKGROUND OF THE INVENTION

This invention relates to fantasy sports contests, and more particularly, this invention relates to systems and methods for providing wagering opportunities in conjunction with fantasy sports contests.

In known fantasy sports contests, a user (i.e., a fantasy sports contestant) selects a roster, a team, a particular individual, or a group of individuals in a season-long athletic competition. Fantasy sports contests are typically based on real-life team sports (e.g., football, baseball, basketball, hockey, soccer, rugby, etc.), real-life athletic events in which individuals compete (e.g., golf, tennis, automotive racing, etc.), and real-life sporting events involving animals (e.g., horse and dog racing). The user is given the ability to take on the role of a fictional general manager with powers which may include the ability to draft, trade, dismiss and otherwise manage the user's fantasy sports contest team selections.

Known fantasy sports contest systems provide services to users which include providing statistical information for real-life athletic competition and tracking users' standings (i.e., rankings) in fantasy sports contests. Known fantasy sports contest systems typically determine a user's standing (i.e., ranking) in a fantasy sports contest based on the performance of the user's fantasy sports contest team selections in real-life athletic competition. For example, a conventional fantasy sports contest system might award five fantasy sports contest points to the user for every goal scored in real-life by a member of the user's fantasy sports contest soccer team. Generally, the user who has accumulated the most fantasy sports contest points by the conclusion of a fantasy sports contest (e.g., the end of a real-life athletic season) is the overall winner of that fantasy sports contest.

Fantasy sports contestants may often find it desirable to wager with one another based on, for example, which of the fantasy sports contestants accumulates the most fantasy sports contest points in a fantasy sports contest (e.g., for a particular week of the fantasy sports contest, over the entire fantasy sports contest, etc.). Fantasy sports contestants may also find it desirable to wager based on real-life athletic events (e.g., real-life athletic events that are related to the contestants' fantasy sports contest). In particular, because fantasy sports contestants typically track closely real-life athletic events (e.g., to plan favorable trades of the contestants' fantasy sports contest team selections, as a hobby or pastime, for entertainment purposes, etc.), fantasy sports contestants may find it desirable to wager (e.g., with other fantasy sports contestants, through a wagering service) based on the outcomes of these real-life athletic events.

Known fantasy sports contest systems do not provide to a user the ability to wager. In particular, a user of a known fantasy sports contest system is required to establish independently from the fantasy sports contest system terms of a wager with, for example, another fantasy sports contestant. Therefore, fantasy sports contest data (e.g., real-life sports statistics, fantasy sports standings, etc.) that may otherwise be useful in establishing the terms of a wager may be not be conveniently accessible to a user who is determining whether to wager. Additionally, the user may have no choice but to reiterate (i.e., independent from the fantasy sports contest system) an opportunity to wager to, for example, a second fantasy sports contestant in the event that wager terms cannot be established with a first fantasy sports contestant. Furthermore, because known fantasy sports contest systems do not store or otherwise process data for the user's wagers, the user may forget the agreed-upon terms of a wager or, even worse, whether a wager was ever made.

In view of the foregoing, it would be desirable to provide systems and methods for providing wagering opportunities in conjunction with fantasy sports contests.

SUMMARY OF THE INVENTION

It is an object of the present invention to provide systems and methods for providing wagering opportunities in conjunction with fantasy sports contests.

This and other objects are accomplished in accordance with the present invention by providing a fantasy sports contest application that provides to a user the ability access to fantasy sports contests and wagering opportunities.

Systems and methods for providing to a user the ability to use a fantasy sports contest application to access fantasy sports contests and wagering opportunities are provided in accordance with the present invention. The fantasy sports contest application may display to the user fantasy sports contest information that is associated with a fantasy sports contest in which the user participates. The fantasy sports contest information may include, for example, information for real-life athletic competition that is associated with the user's fantasy sports contest or information that indicates the user's performance in the fantasy sports contest. The fantasy sports contest application may provide to the user the ability to place a wager related to the fantasy sports contest and may process the wager for the user.

In some embodiments of the present invention, the fantasy sports contest application may provide to the user the ability to place a wager based on the user's performance in a fantasy sports contest. For example, the fantasy sports contest application may provide to the user the ability to place a wager based on whether the user wins the fantasy sports contest or a portion of the fantasy sports contest (e.g., a particular week of a season-long fantasy sports contest). In some embodiments of the present invention, the fantasy sports contest application may provide to the user the ability to place a wager based on a portion of a sporting event, a sporting event, or more than one sporting event that is related to a fantasy sports contest in which the user participates. For example, the fantasy sports contest application may provide to a contestant of a fantasy sports Major League Baseball contest the ability to place a wager based on Major League Baseball events. In some embodiments of the present invention, the fantasy sports contest application may provide to the user the ability to use the fantasy sports contest to place a wager unrelated to a fantasy sports contest in which the user participates.

In some embodiments of the present invention, the fantasy sports contest application may display to the user information indicating a wagering opportunity that is related to a fantasy sports contest in which the user participates. In response to receiving with the fantasy sports contest application a user indication of the wagering opportunity, the wager may be accepted for the user.

In some embodiments of the present invention, the fantasy sports contest application may use application data to at least partially define a wagering opportunity for the user. For example, the fantasy sports contest application may use application data that indicates an account balance of the user to define a maximum wager amount for the user. The maximum wager amount for the user may also be set to an arbitrary number. The total amount of wagers by a user for a given time period may also be set (e.g, daily wagering limits). In some embodiments of the present invention, the fantasy sports contest application may provide to the user the ability to at least partially define a wagering opportunity. For example, the fantasy sports contest application may provide to a user the ability to at least partially define wagering opportunity terms such as a wagering opportunity description and to whom a wagering opportunity is directed.

Wagering opportunities of the present invention may be opportunities to wager for, for example, fantasy sports contest points (i.e., points that accumulate to increase the user's standing in the fantasy sports contest), points redeemable for prizes (i.e., cash or non-cash prizes), non-cash prizes, or money. Wagering opportunities of the present invention may have, for example, a predetermined payout schedule (e.g., the winner receiving 25 points redeemable for prizes, the winner receiving a specified percentage of the sum of all the entry fees to a wagering pool, etc.) or may be organized in a pari-mutuel approach (i.e., determining a winning wagerer's payout based on the number and disposition of other wagerers). In some embodiments of the present invention, the fantasy sports contest application may provide to the user the ability to access only wagering opportunities that are valid for the user (e.g., wagering opportunities for money if wagering for money is legally permitted in the user's geographic region).

In some embodiments of the present invention, multiple fantasy sports contest leagues can be grouped together into a fantasy sports contest. A fantasy sports contest league for a particular sport may be a sub-division of a larger fantasy sports contest for that sport (e.g., multiple fantasy sports NBA Basketball contest leagues can be grouped together into a fantasy sports contest). A fantasy sports contest of the present invention may include one or more leagues all of which are for a particular sport, may include one or more leagues for multiple sports, or may not be sub-divided into leagues.

In some embodiments of the present invention, the fantasy sports contest application may provide to one or more fantasy sports contestants the ability to access wagering opportunities. For example, the fantasy sports contest application may provide to one or more fantasy sports contestants that participate in a fantasy sports contest league the ability to access intra-fantasy sports contest league ("intra-league") wagering opportunities. Intra-league wagering opportunities are opportunities to wager between contestants of the same fantasy sports contest league or wagering opportunities for fantasy sports contest points between a contestant of a fantasy sports contest league and the fantasy sports contest application system.

As another example, the fantasy sports contest application may provide to one or more fantasy sports contestants that participate in fantasy sports contest leagues the ability to access inter-fantasy sports contest league ("inter-league") wagering opportunities. Inter-league wagering opportunities are opportunities to wager between different fantasy sports contest leagues or between contestants of different fantasy sports contest leagues. Inter-league wagering opportunities need not be limited to those between leagues or contestants of the same fantasy sports contest. Still another example, the fantasy sports contest application may provide to one or more fantasy sports contestants the ability to access out-of-fantasy sports contest league ("out-of-league") wagering opportunities.

Out-of league wagering opportunities include all other wagering opportunities that are not intra-league or inter-league wagering opportunities (e.g., traditional sports-related wagering opportunities on the outcome of a game).

In some embodiments of the present invention, the fantasy sports contest application may store data for a wager of the user. The fantasy sports contest application may display to the user various wagering information including, for example, information for an outcome of a wager, information indicating the parties involved in a wager, information indicating when a wager was placed, and information indicating whether a wager has been paid.

In some embodiments of the present invention, the fantasy sports contest application may provide to the user the ability to enable wagering related to a fantasy sports contest in which the user participates. For example, the fantasy sports contest application may provide to the user an option to enable one or more of intra-league wagering, inter-league wagering, and out-of league wagering related to the fantasy sports contest. In some embodiments of the present invention, the fantasy sports contest application may provide to the user alternatives to wagering for money if wagering for money is not legally permitted in the user's geographic region. In some embodiments of the present invention, the fantasy sports contest application may provide to the user the ability to enable wagering unrelated to a fantasy sports contest in which the user participates.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
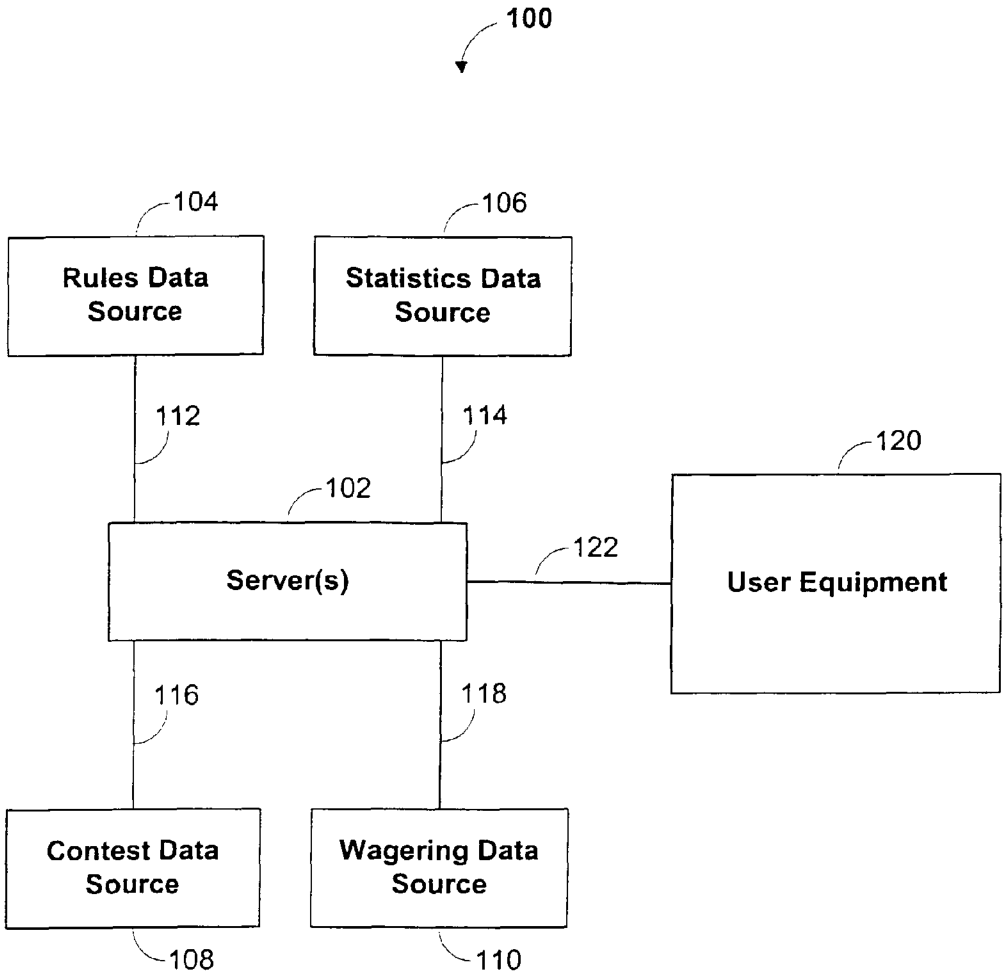
FIG. 1 is an illustrative client/server system for providing fantasy sports contests with wagering opportunities in accordance with one embodiment of the present invention.

Systems and methods for providing wagering opportunities in conjunction with fantasy sports contests are presented.

Fantasy sports contests of the present invention may include any suitable sports contest in which the user is given the ability to make decisions that may affect the standing of the user in the sports contest. For example, in typical team-oriented fantasy sports contests, the user may participate in the capacity of a fictional general manager. In this situation, the user may be have responsibilities such as creating a team roster (e.g., drafting players), selecting reserves, making trades, and otherwise maintaining the composition of the user's team roster. It will be understood that any other suitable decision-making capability may be given to the user in a fantasy sports contest in addition to or in place of those indicated above.

Fantasy sports contests of the present invention need not be limited or restricted in time. For example, a fantasy sports contest may last an entire season, a portion of a season, multiple seasons, a definite period of time (e.g., one month, two weeks, three days, one hour, etc.), the duration of a particular event (e.g., Wimbledon, etc.), a portion of a particular event, or any other suitable period of time.

In one suitable approach, fantasy sports contests of the present invention may include contests in which the user is not necessarily playing the role of a fictional general manager. For example, fantasy sports contests may involve the user selecting (i.e., blindly or with calculation) whether particular outcomes will occur (e.g., whether a particular golfer will make the next putt). Any such suitable decision-making may be the basis of a fantasy sports contest or a part of a fantasy sports contest.

Fantasy sports contests of the present invention may use any suitable one or more scoring systems. For example, existing fantasy scoring systems include straight point systems (e.g., points are awarded and subtracted based on real-life plays without regard to the performance of other players on other fantasy teams in a league), rotisserie systems (e.g., points are awarded based on the user's relative ranking against other users), and head-to-head systems (e.g., users in a league are matched against one another in a round-robin series of one-on-one contests during the course of a season). These are merely illustrative scoring systems. Any other suitable scoring system may be used in the fantasy sports contests of the present invention.

It will be understood that the above are merely illustrative elements of fantasy sports contests. Any other suitable arrangement or approach may be used. It will further be understood that the nature of the fantasy sports contests may vary depending on which activity or sport is involved or based on any other suitable criteria.

The present invention is primarily described herein in terms of a fantasy sports contest application. The fantasy sports contest application may be any suitable software, hardware, or both that may be used to implement the features of present invention. It will be understood that any other suitable software, hardware, or both (e.g., a wagering application) may be used in conjunction with the fantasy sports contest application or in place of the fantasy sports contest application to implement some or all of the features of the present invention.

Illustrative systems and methods for providing fantasy sports contest applications are described, for example, in U.S. Pat. Nos. 4,918,603 (Hughes, et al.), 5,846,132 (Junkin), 5,971,854 (Junkin) and 6,193,610 (Junkin), as well as Hughes et al. U.S. patent application Ser. No. 09/428,991, filed Oct. 29, 1999, Hughes et al. U.S. Provisional Patent Application No. 60/329,587, filed Oct. 15, 2001, and Hughes U.S. Provisional Patent Application No. 60/338,916, filed Nov. 5, 2001, which are all hereby incorporated by reference herein in their entireties.

FIG. 1 shows an illustrative client/server system for providing fantasy sports contests with wagering opportunities in accordance with one embodiment of the present invention. A fantasy sports contest application may be at least partially implemented by server 102. For example, portions of the fantasy sports contest application that implement features involved in the processing of client requests and in the tracking of the performance of fantasy sports contestants may be implemented by server 102. Server 102 may be one or more servers capable of accessing or otherwise receiving application data from rules data source 104, statistics data source 106, contest data source 108 and wagering data source 110. Server 102 may be based on one or more computers.

Rules data source 104 may be any equipment suitable for generating, storing, or otherwise providing application data including fantasy sports contest rules to server 102. In some embodiments of the present invention, rules data source 104 may provide application data that indicates rules specific to one or more fantasy sports contests and one or more fantasy sports contestants to server 102. For example, rules data source 104 may provide data that governs user participation in fantasy sports contests (e.g., data governing a Maximum number of fantasy sports contests that a user may participate in, data governing a maximum number of fantasy sports contest trades that may be made in a week, other fantasy sports contest application options, etc.). As another example, rules data source 104 may provide data that governs user participation in wagering opportunities (e.g., data governing whether a user is permitted to view, propose, accept and otherwise manage wagering opportunities, data governing whether users of the fantasy sports application are eligible to compete for non-cash prizes, money, or points redeemable for prizes, data setting a limit on the amount of a wager, data determining other wagering options, etc.).

Statistics data source 106 may be any equipment suitable for generating, storing or otherwise providing application data including statistics data to server 102. In some embodiments of the present invention, statistics data source 106 may provide real-life sports statistics data including real-life play-by-play accounts to server 102. For example, statistics data source 106 may provide statistics data for a real-life football game, baseball game, soccer game, automobile racing event, horse racing event, or any other sports event to server 102. The fantasy sports contest application may use data from statistics data source 106 to, for example, calculate fantasy sports contest standings. In some embodiments of the present invention, statistics data source 106 may provide data for events that can be wagered on to server 102. For example, statistics data source 106 may provide data for sporting events, televised events, events broadcasted on radio, or any, other events that can be wagered on. Statistics data from statistics data source 106 may be used to, for example, determine wagering opportunities and to determine wagering outcomes.

Contest data source 108 may be any equipment suitable for generating, storing or otherwise providing application data including data for fantasy sports contests to server 102. For example, contest data source 108 may provide application data including a list of fantasy sports contestants of a particular fantasy sports contest league, fantasy sports contest standings, a list of available fantasy sports contest selections (e.g., sports players), or any other data for fantasy sports contests. In some embodiments of the present invention, contest data source 108 may provide application data specific to one or more fantasy sports contestants to server 102. For example, contest data source 108 may provide application data including fantasy sports contestant preferences (e.g., whether a contestant wishes to view wagering opportunities), a list of a fantasy sports contestant's team selections, or any other data specific to one or more fantasy sports contestants.

Wagering data source 110 may be any equipment suitable for generating, storing or otherwise providing application data including wagering data to server 102. In some embodiments of the present invention, wagering data source 110 may provide data for available wagering opportunities to server 102. For example, wagering data source 110 may provide data indicating events that can be wagered on. In some embodiments of the present invention, wagering data source 110 may provide data for wagers (i.e., wagering opportunities that have been accepted) to server 102. For example, wagering data source 110 may provide data that indicates the terms of wagers (e.g., the parties involved in a wager, an amount of a wager, a type of a wager, an outcome of a wager, other data indicating the terms of a wager, etc.). In some embodiments of the present invention, wagering data source 110 may provide data that indicates guidelines of acceptable wagering opportunities and wagers. For example, wagering data source 110 may provide data indicating a limit on the amount of an acceptable wagering opportunity or wager, types of acceptable wagering opportunities or wagers, or any other data indicating guidelines of acceptable wagering opportunities or wagers. Wagering data may also include handicapping, tote board, current track conditions, other information used in horse racing, or any other wagering odds, spreads, or betting lines used in other sports.

In the example of FIG. 1, data for fantasy sports contests and wagering opportunities and wagers is provided by separate data sources 104, 106, 108 and 110. In other embodiments of the present invention, data for fantasy sports contests and wagering opportunities and wagers may provided by a single data source or any other combination of data sources.

Server 102 accesses or otherwise receives application data from data sources 104, 106, 108 and 110 over communications paths 112, 114, 116 and 118, respectively. Each of communications paths 112, 114, 116 and 118 may be one or more satellite communications paths, fiber-optic paths, coaxial cable paths, radio frequency paths, electromagnetic communications paths, microwave communications paths, Internet paths, or any other suitable wired or wireless communications paths or combination of such paths. Communications paths 112, 114, 116 and 118 may have sufficient bandwidth to transmit video signals. Server 102 may also communicate data to data sources 104, 106, 108 and 110 over communications paths 112, 114, 116 and 118, respectively, or other suitable communications paths.

An application client running on user equipment 120 retrieves application data from server 102 over communications path 122. The fantasy sports contest application may be at least partially implemented by user equipment 120. For example, the portions of the fantasy sports contest application that implement features involved in user interaction may be implemented by user equipment 120. User equipment 120 may be based on any suitable hardware platform or topology. Suitable hardware platforms may include, for example, satellite receivers, personal computer televisions (PC/TVs), personal computers (e.g., with television tuner cards), cable set-top boxes, televisions, any other suitable hardware platform or combination of such hardware platforms. User equipment 120 may be based on one or more computers. There may be numerous installations of user equipment 120. However, only one installation of user equipment 120 has been shown in FIG. 1 to avoid over-complicating the drawing. Communications path 122 may be one or more satellite communications paths, fiber-optic paths, coaxial cable paths, radio frequency paths, electromagnetic communications paths, microwave communications paths, Internet paths, or any other suitable wired or wireless communications paths or combination of such paths. Communications path 122 may have sufficient bandwidth to transmit video signals. The application client running on user equipment 120 may also communicate data to server 102 over communications path 122 or other suitable communications path.

An application client running on user equipment 120 may retrieve fantasy sports contest data and wagering data from server 102 using any suitable approach. For example, the application client may pass SQL (structured query language) requests as messages to server 102. In another suitable approach, the application client may invoke remote procedures that reside on server 102 using one or more remote procedure calls. Server 102 may execute SQL statements for such invoked remote procedures. In still another suitable approach, client objects executed by the application may communicate with server objects executed by server 102 using, for example, an object request broker (ORB). Server 102 may, for example, run a suitable database engine (e.g., SQL Server by Microsoft) and provide data to the application client implemented on user equipment 120. In some embodiments of the present invention, server 102 may provide one or more of fantasy sports contest data and wagering data to user equipment 102 using a suitable "push" methodology (e.g., forced messages).

In some embodiments of the present invention, server 102 may transmit, in response to an application client request, application data to user equipment 120 discretely as separate files, messages, or packets, in a continuous data stream (e.g., using a carousel-based approach), or both. For example, responsive to initialization (e.g., boot-up) of the fantasy sports contest application by user equipment 120, server 102 may transmit real-life sports statistics data obtained from statistics data source 106 to user equipment 120 in a real-time, continuous data stream. As another example, server 102 may transmit rules data from rules data source 104 to user equipment 120 on-demand and in separately-addressed data packets.

In some embodiments of the present invention, one or more servers of server 102 may provide fantasy sports contest data to user equipment 120 and one or more servers of server 102 may provide wagering data to user equipment 120. For example, one or more servers of server 102 may provide fantasy sports contest data from rules data source 104, statistics data source 106 and contest data source 108 to user equipment 120, and one or more servers of server 102 may provide wagering data from wagering data source 110 to user equipment 120. In some embodiments of the present invention, one or more servers of server 102 may provide both fantasy sports contest data and wagering data to user equipment 120. For example, one or more servers of server 102 may provide both fantasy sports contest data and wagering data from data sources 104, 106, 108 and 110 to user equipment 120.

Fantasy sports contest data and wagering data may be integrated to provide an at least partially unified presentation at user equipment 120. For example, fantasy sports contest data may be displayed in a first region of a display screen and wagering data may be displayed in a second region of the display screen. As another example, fantasy sports data may be displayed in a first display screen and may include a user-selectable option to view wagering data in a second display screen. Still another example, fantasy sports data and wagering data may be fully integrated in the same display screens.

In some embodiments of the present invention, the fantasy sports application may be fully operative to provide fantasy sports contests with wagering opportunities to a user. For example, the fantasy sports contest application may use application data from data sources 104, 106, 108 and 110 to define and display fantasy sports contest options and wagering options for a user.

In some embodiments of the present invention, the fantasy sports contest application may interface with one or more wagering applications (e.g., implemented at least partially by server 102 and user equipment 120) to provide fantasy sports contests with wagering opportunities to a user. The fantasy sports contest application and the one or more wagering applications may communicate using, for example, various Application Programming Interfaces ("APIs") to provide fantasy sports contests with wagering opportunities to the user. At least a portion of the data provided to user equipment 120 may be common to both the fantasy sports contest application and the one or more wagering applications. For example, statistics data from statistics data source 106 may be used to calculate fantasy sports contest standings with the fantasy sports contest application and to define wagering opportunities and outcomes with the one or more wagering applications. As another example, rules data from rules data source 104 may be used to determine whether a user is permitted to wager (which may determine various options and settings of both the fantasy sports contest application and the one or more wagering applications).

In some embodiments of the present invention, the fantasy sports contest application (e.g., and one or more wagering applications) may be at least partially implemented by one or more of data sources 104, 106, 108 and 110. For example, portions of the fantasy sports contest application that implement features involved in the processing of client requests and in the tracking of the performance of fantasy sports contestants may be implemented by one or more of data sources 104, 106, 108 and 110.

In some embodiments of the present invention, data sources 104, 106, 108 and 110 may transmit application data directly to user equipment 120. Data sources 104, 106, 108 and 110 may transmit application data to user equipment 120 using any suitable approach. For example, statistics data source 106 may transmit application data including statistics data to user equipment 120 in a real-time data stream. As another example, rules data source 104 may transmit application data including fantasy sports contest rules data and contest data source 108 may transmit application data including fantasy sports contest data to user equipment 120 continuously, periodically (e.g., providing application data to user equipment 120 weekly, each time user equipment 120 initializes the fantasy sports contest application, etc.), on-demand, or using any other suitable approach or combination of approaches. Still another example, wagering data source 110 (e.g., having one or more servers) may transmit application data including wagering data to user equipment 120 in response to an application client request.

Figure 2:
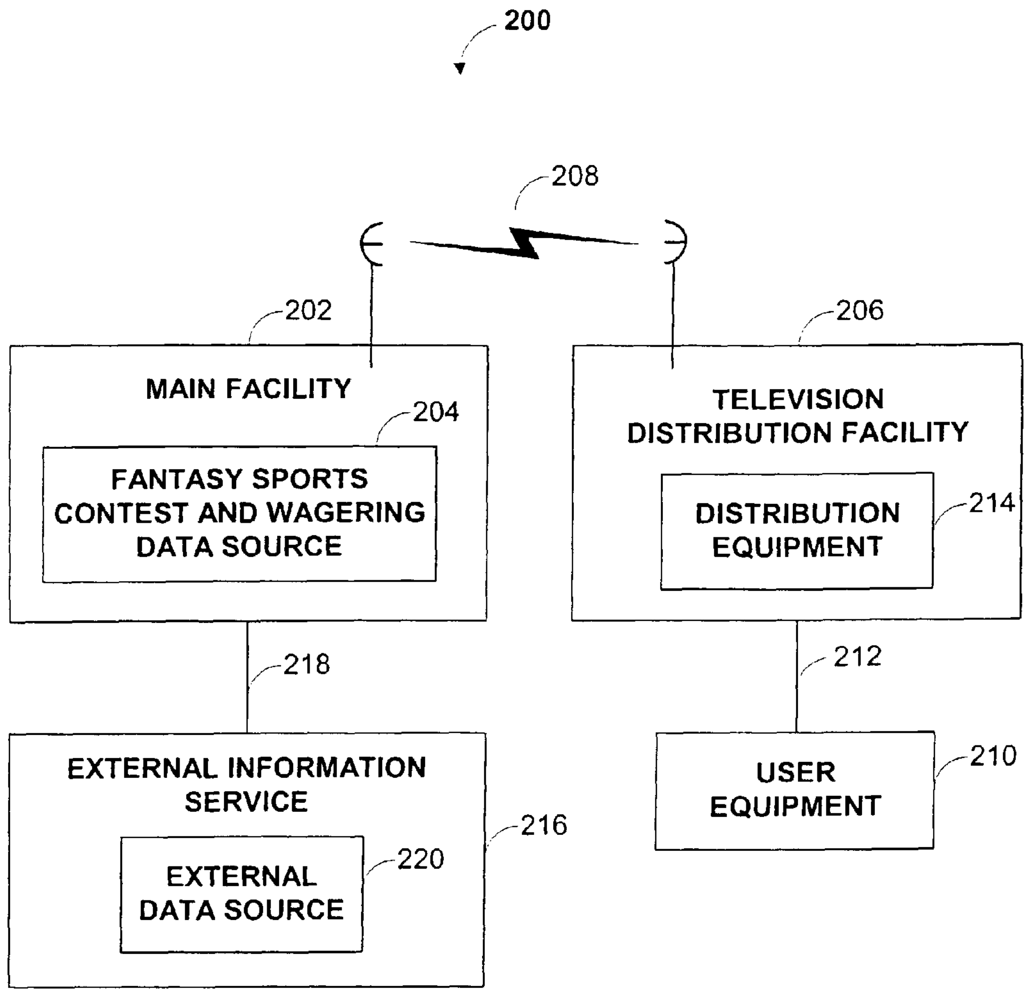
FIG. 2 is an illustrative interactive television system for providing fantasy sports contests with wagering opportunities in accordance with one embodiment of the present invention.

In some embodiments of the present invention, the fantasy sports contest application may be implemented on an interactive television platform. For example, FIG. 2 shows an illustrative interactive television system 200 for providing to a user fantasy sports contests with wagering opportunities. Main facility 202 may transmit application data from fantasy sports contest and wagering data source 204 to television distribution facility 206 via communications path 208. There may be numerous installations of television distribution facility 206. However, only one installation of television distribution facility 206 is shown to avoid over-complicating the drawing. Fantasy sports contest and wagering data source 204 may be any suitable computer or computer-based system for generating, storing, or obtaining application data (e.g., manually from an operator, electronically via a computer network or other connection, or via storage media) and putting the data into electronic form for distribution by main facility 202. In the example of FIG. 2, fantasy sports contest and wagering data source 204 provides both fantasy sports contest and wagering data. In other embodiments of the present invention, fantasy sports contest data and wagering data may be provided by separate data sources (e.g., in embodiments in which the fantasy sports contest application interfaces with one or more wagering applications to provide fantasy sports contests with wagering opportunities).

Main facility 202 may transmit application data for the fantasy sports contest application to television distribution facility 206 using any suitable approach. For example, main facility 202 may transmit application data to television distribution facility 206 continuously (e.g., via a real-time data feed), periodically (e.g., via localizations directed to one or more television distribution facilities 206 that receive similar data or are located in a similar geographical region or coverage area), on-demand (e.g., using a client/server based approach), or using any other suitable approach or combination of approaches. Television distribution facility 206 may communicate data to main facility 202 using communication path 208 or other suitable communication path.

Television distribution facility 206 may be any facility suitable for distributing television signals and application data including fantasy sports contest application data to user equipment 210 via communications path 212. For example, television distribution facility 206 may be a cable system headend, a broadcast distribution facility, a satellite television distribution facility, or any other suitable facility for distributing television signals and application data to users. User equipment 210 may communicate data to television distribution facility 206 using communications path 212 or other suitable communications path.

Each of communications paths 208 and 212 may be one or more satellite communications paths, fiber-optic paths, coaxial cable paths, radio frequency paths, electromagnetic communications paths, microwave communications paths, Internet paths, or any other suitable wired or wireless communications paths or combination of such paths. Communications paths 208 and 212 may have sufficient bandwidth to transmit video signals.

Television distribution facility 206 may include distribution equipment 214. Distribution equipment 214 may be any equipment suitable for distributing application data to user equipment 210. Distribution equipment 214 may include, for example, suitable transmission hardware for distributing application data on a television channel sideband, in the vertical blanking interval of a television channel, using an out-of-band digital signal, or by any other suitable data transmission technique. Distribution equipment 214 may transmit analog or digital signals including fantasy sports contest application data to user equipment 210 on, for example, multiple television channels.

In some embodiments of the present invention, distribution equipment 214 may include one or more servers capable of providing, in response to an application client request, application data for the fantasy sports contest application to user equipment 210. For example, distribution equipment 214 may include one or more servers capable of providing data for fantasy sports contests and wagering opportunities and wagers to user-equipment 210 using any suitable approach (e.g., on-demand, in a carousel-based approach, etc.).

In some embodiments of the present invention, distribution equipment 214 may communicate application data with user equipment 210 via the Internet using an internet service system. For example, distribution equipment 214 may communicate statistics data (e.g., used to determine fantasy sports contest standings and wagering opportunities and outcomes) received from main facility 202 or other suitable facility to user equipment 210 via the Internet. In some embodiments of the present invention, distribution equipment 214 may receive application data via the Internet and may distribute the data to user equipment 210 (e.g., via the Internet, via satellite, or via any other suitable wired or wireless path or combination of such paths).

Television distribution facility 206 may transmit application data for the fantasy sports contest application to user equipment 210 using any suitable approach. For example, television distribution facility 206 may transmit application data to user equipment 210 periodically, continuously (e.g., in a real-time data stream, using a carousel-based approach, etc.), on-demand, or using any other suitable approach or combination of approaches.

In some embodiments of the present invention, data sources may be located at facilities separate from main facility 202. For example, external information service 216 may provide data to main facility 202 via communications path 218 for distribution. External information service 216 may be any facility suitable for providing application data (e.g., for the fantasy sports contest application, for one or more wagering applications that interfaces with the fantasy sports contest application, etc.) to main facility 202. There may be multiple installations of external information service 216. However, only one installation of external information service 216 is shown in FIG. 2 to avoid over-complicating the drawing. Communications path 218 may be one or more satellite communications paths, fiber-optic paths, coaxial cable paths, radio frequency paths, electromagnetic communications paths, microwave communications paths, Internet paths, or any other suitable wired or wireless communications paths or combination of such paths. Communications path 218 may have sufficient bandwidth to transmit video signals.

External information service 216 may contain external data source 220. External data source 220 may be any suitable computer or computer-based system for generating, storing, or obtaining application data (e.g., manually from an operator, electronically via a computer network or other connection, or via storage media) and putting the data into electronic form for distribution to main facility 202 or other facility.

In some embodiments of the present invention, external information service 216 may provide statistics data, rules data, contest data, wagering data or any other application data to main facility 202. For example, external information service 216 may be a statistics service that provides real-life sports statistics data to main facility 202. The statistics data may be used, for example, to calculate fantasy sports contest league standings and to determine wagering opportunities and outcomes. As another example, external information service 216 may be a rules service that provides rules data to main facility 202. The rules data may be used, for example, to determine whether a fantasy sports contestant is permitted to wager for money, non-cash prizes, fantasy sports contest points or points redeemable for prizes based on the user's geographical location, account information, or any other information or combination of such information. Still another example, external information service 216 may be a wagering service that provides wagering data (e.g., data indicating wagering opportunities, wager terms, etc.) to main facility 202. The wagering data may be used to, for example, determine wagering opportunities and outcomes, determine whether a user has deposited sufficient funds to the user's account for wagering, and to determine whether a user should be otherwise restricted from wagering (e.g., a user with a history for failing to settle lost wagers). In some embodiments of the present invention, external information service 216 may provide application data directly to one or more of television distribution facility 206 and user equipment 210. In some embodiments of the present invention, external information service 216 may be a tote used in pari-mutuel wagering or other wagering server that keeps track of wagering pay-offs.

The fantasy sports contest application may be implemented at any suitable location in system 200. For example, the fantasy sports contest application may be implemented at user equipment 210, at television distribution facility 206, at main facility 202, at any other suitable location (that is not necessarily shown in system 200), or at any combination thereof. Certain portions of the fantasy sports contest application may be implemented at user equipment 210 (e.g., those portions that implement features involved in user interaction), whereas certain other portions of the fantasy sports contest application may be implemented at main facility 202, television distribution facility 206, or external information service 216 (e.g., those portions that implement features involved in the processing of client requests and in the tracking of the performance of fantasy sports contestants). Any such suitable arrangement of the fantasy sports contest application may be implemented in accordance with the present invention.

Figure 3:
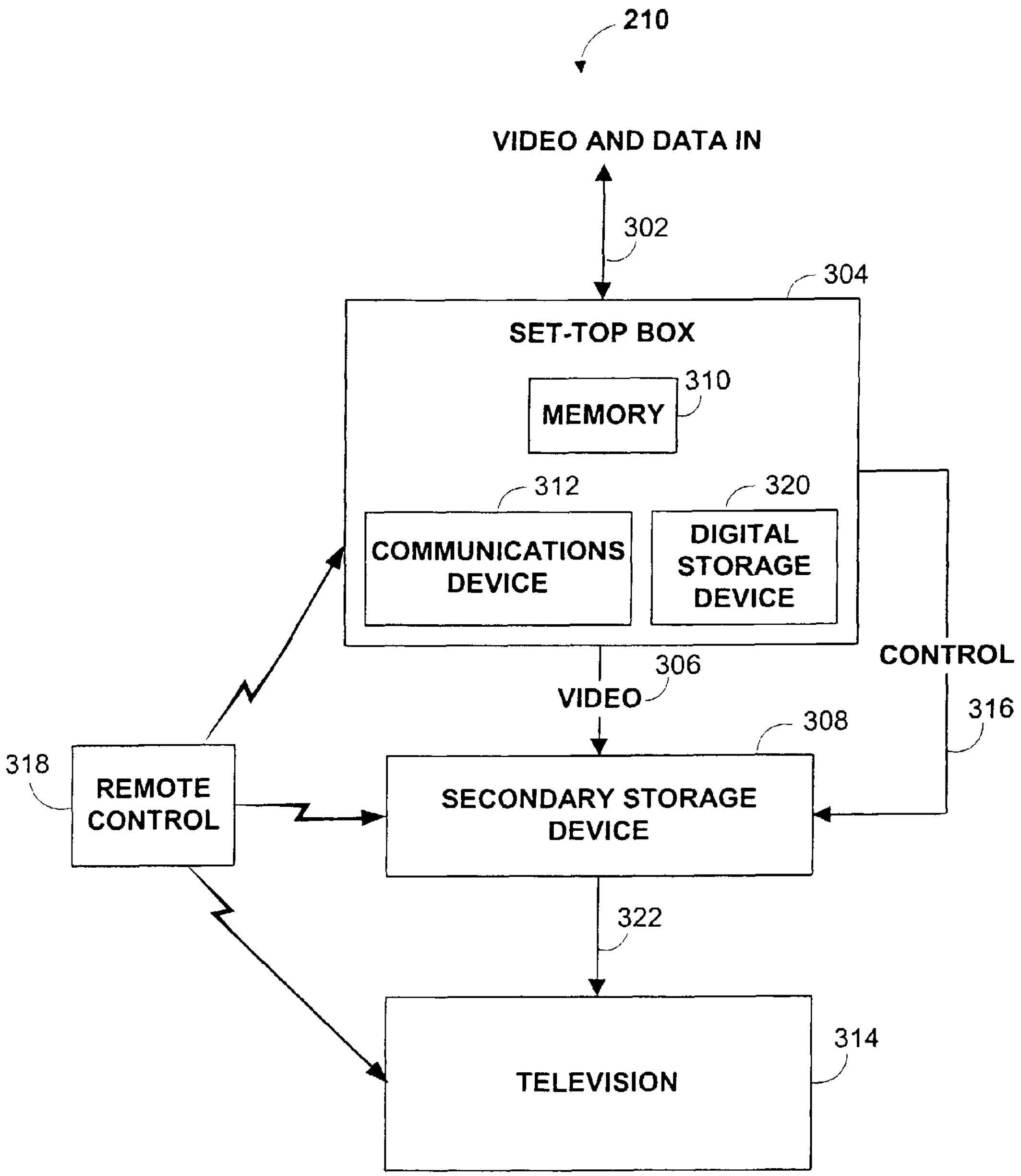
FIG. 3 is an illustrative arrangement of the user equipment of FIG. 2 in accordance with one embodiment of the present invention.

Referring to both FIGS. 2 and 3, FIG. 3 shows an illustrative arrangement of user equipment 210 in accordance with one embodiment of the present invention. User equipment 210 may receive analog or digital programming (e.g., television programming, pay-per-view programming, video-on-demand programming, etc.) and fantasy sports contest application data at input 302 from television distribution facility 206, main facility 202, external information service 216, or any other suitable equipment or a combination thereof, depending on the chosen implementation.

During normal television viewing, a user may tune set-top box 304 to a desired television channel. The signal for that television channel may then be provided at video output 306. The signal supplied at output 306 is typically either a radio-frequency (RF) signal on a predefined channel (e.g., channel 3 or 4), or an analog demodulated video signal, but may also be a digital signal provided on an appropriate digital bus (e.g., a bus using the Institute of Electrical and Electronics Engineers (IEEE) 1394 standard (not shown)). The video signal at output 306 may be received by secondary storage device 308, which may be an optional component in the embodiment of FIG. 3.

Set-top box 304 may have memory 310. Memory 310 may be any memory or other storage device, such as a random access memory (RAM), read only memory (ROM), flash memory, a hard disk drive, a combination of such devices, or any memory suitable for storing application instructions and application data for use by the fantasy sports contest application.

Set-top box 304 may have communications device 312 for communicating directly with distribution facility 206, main facility 202, external information service 216, or any other suitable equipment or a combination thereof, over suitable communications paths. Communications device 312 may be a modem (e.g., cable modem, telephone modem, digital subscriber line (DSL) modem, integrated service digital network (ISDN) modem, or any suitable analog or digital modem), network interface card (e.g., an Ethernet card, etc.), or other suitable communications device. Communications device 312 may also be a personal computer with an Internet connection if, for example, distribution equipment 214 or other suitable equipment communicates data with user equipment 210 via the Internet. In some embodiments, communications device 312 may be a component of television 314.

Optional secondary storage device 308 may be any suitable type of analog or digital program storage device or player (e.g., a videocassette recorder (VCR), a personal video recorder (PVR), a digital versatile disc (DVD) player, etc.). In some embodiments of the present invention, data for fantasy sports contests and wagering opportunities and wagers may be stored in secondary storage device 308. Program recording (e.g., recording of sporting events that are related to a contestant's fantasy sports contest or wagers) and other features may be controlled by set-top box 304 using control path 316. If secondary storage device 308 is a videocassette recorder or a personal video recorder, for example, a typical control path 316 may involve the use of an infrared transmitter coupled to the infrared receiver in the recorder that normally accepts commands from a remote control such as remote control 318. Remote control 318 may be used to control set-top box 304, secondary storage device 308, and television 314.

The fantasy sports contest application may run on set-top box 304, television 314 (provided that television 314 has suitable processing circuitry and memory), a suitable analog or digital receiver (not shown) connected to television 314, or digital storage device 320 if digital storage device 320 has suitable processing circuitry and memory. The fantasy sports contest application may also run cooperatively on a suitable combination of these devices.

If desired, a user may record programming (e.g., television programs, pay-per-view programs, video-on-demand (VOD) programs, non-video-on-demand programs, etc.) in digital form on digital storage device 320. Digital storage device 320 may also record data for fantasy sports contests and wagering opportunities and wagers including, for example, statistics data and rules data. Digital storage device 320 may be contained in set-top box 304 or it may be an external device connected to set-top box 304 via an input/output port and appropriate interface. Digital storage device 320 may be a writeable optical storage device (such as a DVD player capable of handling recordable DVD discs), a magnetic storage device (such as a disk drive or digital tape), or any other digital storage device.

Processing circuitry in set-top box 304 may format received video, audio and data signals into a digital file format. The file format may be an open file format such as the Moving Picture Experts Group (MPEG) MPEG-2 standard or the Moving Joint Photographic Experts Group (MJPEG) standard. The resulting data may be streamed to and stored in digital storage device 320, secondary storage device 308, or other storage device via an appropriate bus (not shown) (e.g., a bus using the Institute Electrical and Electronics Engineers (IEEE) 1394 standard). In some embodiments, an MPEG-2 data stream or series of files may be received from television distribution facility 206, main facility 202, external information service 216, or other equipment and stored by digital storage device 320 or secondary storage device 308.

Television 314 may receive video signals from secondary storage device 308 via communications path 322. The video signals on communications path 322 may either be generated by secondary storage device 308 when playing back a prerecorded storage medium (e.g., a videocassette or a recordable digital video disc), by digital storage device 320 when playing back a prerecorded digital medium, may be passed through from set-top box 304, may be provided directly to television 314 from set-top box 304 if secondary storage device 308 is not included in user television equipment 210, or may be received directly by television 314 from any other suitable facility or location (e.g., main facility 202). During normal television viewing, the video signals provided to television 314 may correspond to the desired channel to which a user has tuned with set-top box 304. Video signals may also be provided to television 314 by set-top box 304 when set-top box 304 is used to play back information stored on digital storage device 320.

Referring to FIGS. 1-4, FIG. 4 is an illustrative schematic block diagram of portions of user equipment (120, 210) in accordance with various embodiments of the present invention. Fantasy sports contest data and wagering data from server 102, data sources 104, 106, 108 and 110, television distribution facility 206, main facility 202, external information service 216, or other suitable equipment or combination thereof may be received by control circuitry 402 or received by communications device 404 and provided to control circuitry 402.

Control circuitry 402 may include a processor or processing circuitry for receiving and processing application instructions for the fantasy sports contest application. Control circuitry 402 may include any suitable processor, such as a microprocessor or group of microprocessors, and other processing circuitry such as caching circuitry, direct memory access (DMA) circuitry, input/output (I/O) circuitry, etc. For example, control circuitry 402 may process application instructions to generate application display screens. The functions of control circuitry 902 may be integrated into an advanced television receiver, personal computer television (PC/TV), or any other suitable arrangement. If desired, a combination of such arrangements may be used.

Digital storage device 406 and secondary storage device 408 may record media (e.g., television programming if fantasy sports contests and wagering opportunities are provided in an interactive television platform) and store data for fantasy sports contests and wagering opportunities and wagers. For example, secondary storage device 408 may be any suitable type of analog or digital program storage device (e.g., a videocassette recorder (VCR), a personal video recorder (PVR), a digital versatile disc (DVD), etc.). Digital storage device 406 may be, for example, a writeable optical storage device (such as a DVD player capable of handling recordable DVD discs), a magnetic storage device (such as a disk drive or digital tape), or any other digital storage device. In embodiments in which the fantasy sports contest application is provided in an interactive television arrangement, program recording and other features may be controlled by control circuitry 402. For example, in response to commands from a user, control circuitry 402 may instruct secondary storage device 408 and digital storage device 406 to record television programming for events that affect fantasy sports contest league standings and wagering outcomes.

Memory 410 may be any memory or other storage device, such as a random access memory (RAM), read only memory (ROM), flash memory, a hard disk drive, a combination of such devices, etc., that is suitable for storing fantasy sports contest data and wagering data for use by control circuitry 402.

Communications device 404 may support communications between user equipment 120 and server 102, or any other suitable equipment or combination of equipment. In embodiments in which the fantasy sports contest application is implemented in an interactive television arrangement, communications device 404 may support communications between user equipment 210 and distribution equipment 214, main facility 202, external information service 216, or any other suitable equipment or combination of equipment. Communications device 404 may be a modem (e.g., a cable modem, digital subscriber line (DSL) modem, telephone modem, integrated services digital network (ISDN) modem, or any suitable analog or digital modem), network interface card (e.g., an Ethernet card, Token ring card, etc.), or any other suitable communications device.

User input device 412 may be any suitable input device for allowing a user to communicate to the fantasy sports contest application. For example, a user may make a fantasy sports contest team selection or accept a wagering opportunity from an application display screen (e.g., indicate a fantasy sports contest application option) using user input device 412. User input device 412 may be a pointing device, wireless remote control, keyboard, touch-pad, voice recognition system, or any other suitable user input device. User-entered instructions from user input device 412 may instruct control circuitry 402 to direct an audio device (not shown) to provide audio (e.g., music, talk-radio, television audio, etc.). During normal television viewing (i.e., when the fantasy sports contest application is implemented in an interactive television arrangement), user-entered instructions from user input device 412 may instruct control circuitry 402 to direct display device 414 to display a desired television channel on display device 414. Display device 414 may be any suitable display device such as a personal computer monitor, a television, or a PC/TV. To provide a user with fantasy sports contest options and wagering options, the fantasy sports contest application running on user equipment 210 (FIG. 2) may generate, for example, fantasy sports contest application information display screens for display on display device 414.

Referring to both FIGS. 1 and 2, client/server system 100 and interactive television system 200 can incorporate security systems to insure the confidentiality of communications, the integrity of data, the identification and authentication of the sender of data, access control over what may be done with the data (e.g., not providing data for wagering opportunities for money in geographic regions in which wagering for money is not legally permitted) and non-repudiation measures to prevent a party from backing out of a transaction (e.g., having the user confirm a wager, storing redundant data for wagers in more than one location or by more than one party, etc.). In particular, systems 100 and 200 may incorporate various security systems in connection communications sent over, for example, one or more of communications paths 112, 114, 116, 118, 122, 218, 208 and 212. For example, for the confidentiality of communications, systems 100 and 200 may use well-known cryptographic methods such as encrypting data with symmetric keys and non-symmetric keys (e.g., public/private key cryptosystems). Cryptographic algorithms that can be used may include, for example, RSA (Rivest-Shamir-Adleman), Rabin, Diffie-Hellman, DSS (digital signature standard), DES (data encryption standard), or any other suitable algorithms or combination of such algorithms.

Systems 100 and 200 may use techniques including using cryptographic checksums, digital signatures, secure socket layer and other techniques to verify the integrity of data. For example, data received by user equipment (120, 210), server 102, television distribution facility 206 or any other equipment can be signed and its integrity can be checked using techniques such as hashing, exchanging keys, and checking digital certificates by a third party (e.g., VeriSign, Inc. provides services for securing web sites such as its object signing digital ID service for Java which allows end users to confirm the source and integrity of received content).

Systems 100 and 200 may use various techniques to identify and authenticate the sender of data (e.g., a user of user equipment (120, 210), server 102, etc.). For example, the identity of a user of user equipment (120, 210) can be signaled by requiring that the user enter his password, user ID, card key or other suitable means of identification (e.g., a fingerprint or some other observational technique that identifies an individual, entering a token ID that dynamically changes and is displayed on a token, etc.) or combination thereof.

The security features of systems 100 and 200 can be implemented utilizing support from, for example, hardware (e.g., secure processor operating modes), an operating system (e.g., secure processes, memory, file systems and devices), and an application (e.g., a signed application running in a trusted computing environment). The security features of systems 100 and 200 can also be implemented using the services of digital rights management (DRM) system that is integrated into an operating system or otherwise added to an end-user computing environment (e.g., at user equipment (120, 210)). Data which is to protected by the rights system can be sent in secure containers or objects protected using the confidentiality and integrity techniques described above.

Referring to both FIGS. 1 and 2, any suitable facility or location may define wagering opportunities for fantasy sports contestants. In some embodiments of the present invention, server 102 may define wagering opportunities for fantasy sports contestants. For example, server 102 may define (e.g., manually via a system operator or automatically using any suitable criteria) wagering opportunities for fantasy sports contestants based on statistics data received from statistics data source 106 or other source of statistics data. In some embodiments of the present invention, the fantasy sports contest application may define wagering opportunities based on data input via user input device 412 (FIG. 4) or other suitable user interface. In some embodiments of the present invention (i.e., in which the fantasy sports contest application is provided in an interactive television arrangement), main facility 202 or external information service 216 may define wagering opportunities for a fantasy sports contestant. For example, main facility 202 or external information service may define wagering opportunities based on rules data stored in data sources 204 and 220 (e.g., data indicating whether a user is permitted to wager).

Figure 4:
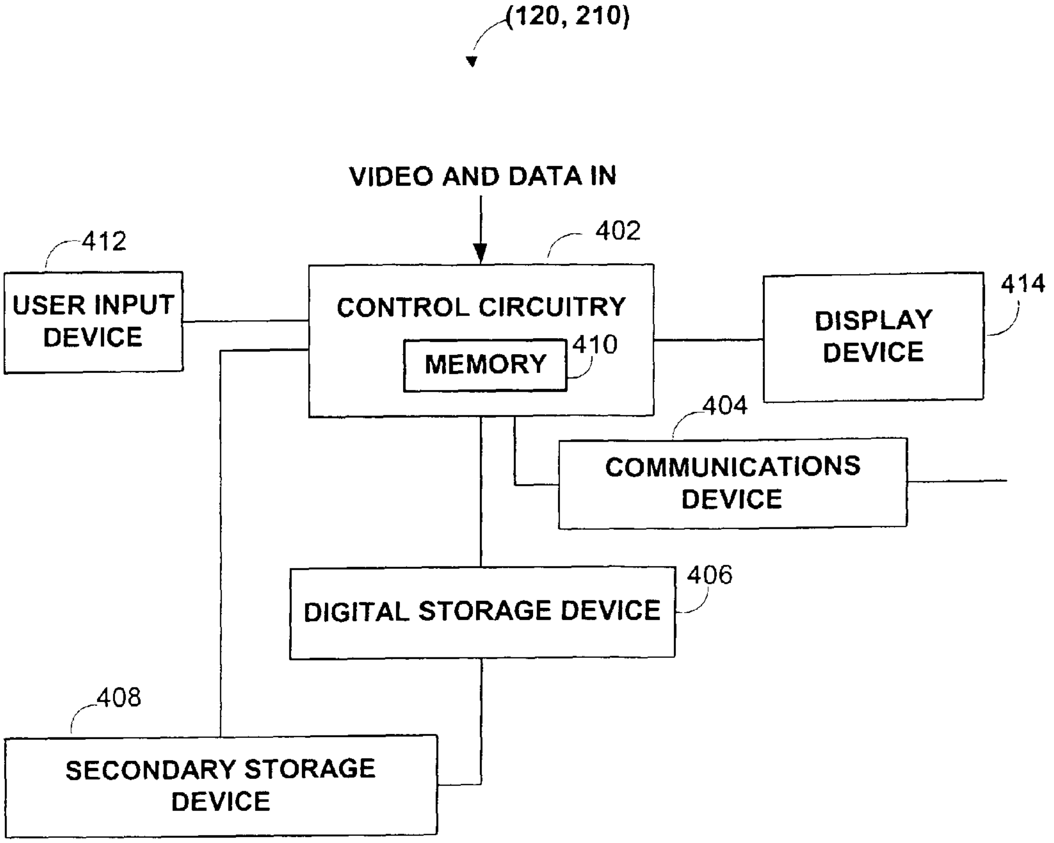
FIG. 4 is an illustrative arrangement of the user equipment of FIGS. 1 and 2 in accordance with various embodiments of the present invention.

User equipment (120, 210) may request or otherwise receive application data for various types of wagering opportunities. For example, user equipment 120 may receive data for various types of wagering opportunities from server 102, from data sources 104, 106, 108 and 110 (e.g., each having one or more servers), and from user input device 412 (FIG. 4). As another example, user equipment 210 may receive data for various types of wagering opportunities from user input device 412 (FIG. 4) or a server included as part of distribution equipment 214 or external information service 216. In some embodiments of the present invention, user equipment (120, 210) may receive application data for wagering opportunities between various parties including fantasy sports contestants who participate in various fantasy sports contest leagues. A fantasy sports contest league may be a sub-division of a fantasy sports contest, the contest comprising other fantasy sports contests (e.g., a fantasy sports NBA Basketball contest may comprise multiple individual fantasy sports NBA Basketball contest leagues and may induce fantasy competition between members of the individual different leagues). For example, in some embodiments of the present invention, user equipment (120, 210) may receive data for intra-fantasy sports contest league ("intra-league") wagering opportunities. Intra-league wagering opportunities are opportunities to wager between contestants of the same fantasy sports contest league or wagering opportunities for fantasy sports contest points between a contestant of a fantasy sports contest league and the fantasy sports contest application system. The fantasy sports contest application may provide opportunities to view, propose, accept and otherwise manage intra-league wagering opportunities to fantasy sports contestants.

In some embodiments of the present invention, intra-league wagering opportunities may be based on one or more fantasy sports contestants' performance in a fantasy sports contest. For example, an intra-league wagering opportunity between a user who participates in a fantasy sports contest league and one or more other contestants of that fantasy sports contest league may be based on whether the user will accumulate the most fantasy sports contest points (e.g., by the conclusion of a particular week of a fantasy sports contest league, by the conclusion of the entire fantasy sports contest league, etc.). As another example, an intra-league wager between a user of a particular fantasy sports contest and the fantasy sports contest application system may be based on whether the user wins the fantasy sports contest of which the user's fantasy sports contest league is a sub-division.

In some embodiments of the present invention, intra-league wagering opportunities may be based on real-life sporting events that are related to contestants' fantasy sports contest leagues. For example, intra-league wagering opportunities between contestants of the same fantasy sports NFL football contest league may be based on NFL football events (e.g., the outcome of a particular game or group of games, the outcome of a particular quarter, the outcome of a particular possession, the outcome of a particular field goal attempt, the outcome of a televised NFL draft, etc.). As another example, intra-league wagering opportunities between a contestant of a fantasy Major League Baseball contest league and the fantasy sports contest application system may be based on real-life Major League Baseball events.

In some embodiments of the present invention, intra-league wagering opportunities may be based on real-life sporting events and other events that are unrelated to contestants' fantasy sports contest leagues. For example, intra-league wagering opportunities between contestants of the same fantasy soccer league may be based on Major League Baseball events. Intra-league wagering opportunities may be based on any other events that are unrelated to contestants' fantasy sports contests leagues and that can be wagered on such as, for example, televised events, broadcasted events, or events that are otherwise made public (e.g., the Grammy awards).

In some embodiments of the present invention, user equipment (120, 210) may receive data for inter-fantasy sports contest league ("inter-league") wagering opportunities. Inter-league wagering opportunities are opportunities to wager between different fantasy sports contest leagues or between contestants of different fantasy sports contest leagues. The fantasy sports contest application may provide opportunities to view, propose, accept and otherwise manage inter-league wagering opportunities.

In some embodiments of the present invention, inter-league wagering opportunities may be based on one or more fantasy sports contestants' performance in a fantasy sports contest. For example, inter-league wagering opportunities between one or more contestants of a first fantasy sports contest league and one or more contestants of a second fantasy sports contest league may be based on which league will perform better in its corresponding fantasy sports contest (e.g., the first and second fantasy sports contest leagues being of the same type and sub-divisions of the same fantasy sports contest).

In some embodiments of the present invention, inter-league wagering opportunities may be based on real-life sporting events that are related to contestants' fantasy sports contest leagues. For example, inter-league wagering opportunities between a first fantasy Major League Baseball contest league and second fantasy Major League Baseball contest league may be based on real-life Major League Baseball events.

In some embodiments of the present invention, inter-league wagering opportunities may be based on events that are unrelated to contestants' fantasy sports contest leagues. For example, inter-league wagering opportunities between fantasy sports contest leagues or contestants of fantasy sports contest leagues may be based on trivia contests, televised game shows, quiz shows, or other events that are unrelated contestants' fantasy sports contest leagues.

In some embodiments of the present invention, inter-league wagering opportunities between one or more contestants of a first fantasy sports contest league and one or more contestants of a second fantasy sports contest league may be based on events that are related to only the first fantasy sports contest league. For example, inter-league wagering opportunities between a contestant of a fantasy college football contest league and a contestant of a fantasy soccer contest league may be based on real-life college football events.

In some embodiments of the present invention, user equipment (120,210) may receive data for out-of-fantasy sports contest league ("out-of-league") wagering opportunities. Out-of-league wagering opportunities include all wagering opportunities that are not intra-league wagering opportunities and inter-league wagering opportunities. The fantasy sports contest application may provide opportunities to view, propose, accept and otherwise manage out-of-league wagering opportunities.

In some embodiments of the present invention, out-of-league wagering opportunities may be based on events that are related to contestants' fantasy sports contest leagues. For example, out-of-league wagering opportunities (e.g., wagering opportunities based on defined wagering odds or spreads) between a contestant of a fantasy sports contest league and a wagering service or a non-fantasy sports contestant (e.g., a user of the fantasy sports contest application that is not currently involved in a fantasy sports contest) may be based on events that are related to that fantasy sports contest league.

In some embodiments of the present invention, out-of-league wagering opportunities may be based on events that are unrelated to fantasy sports contest leagues. For example, out-of league wagering opportunities between a contestant of a fantasy Major League Baseball contest league and a wagering service may be based on real-life Minor League baseball events.

In some embodiments of the present invention, the fantasy sports contest application may provide to fantasy sports contestants the ability to wager for fantasy sports contest points. For example, the fantasy sports contest application may provide to contestants of the same fantasy sports contest league (i.e., intra-league wagering opportunities) the ability to wager for fantasy sports contest points to enhance league competition and user-enjoyment. As another example, the fantasy sports contest application may provide to contestants of different fantasy sports contest leagues (i.e., inter-league wagering opportunities) that are competing to accumulate the most fantasy sports contest points the ability to wager for fantasy sports contest points.

In some embodiments of the present invention, the fantasy sports contest application may provide to fantasy sports contestants the ability to wager for money. For example, the fantasy sports contest application may provide to a user who participates in a fantasy sports contest the ability to wager one or more other fantasy sports contestants for money based on the user's performance in the fantasy sports contest. As another example, because fantasy sports contestants may track closely real-life sporting events (e.g., that may be both related and unrelated to the contestants' fantasy sports contest leagues), and because the contestants may find it desirable to wager on these events, the fantasy sports contest may provide to fantasy sports contestants the ability to wager for money based on real-life sporting events.

In some embodiments of the present invention, the fantasy sports contest application may provide to fantasy sports contestants the ability to wager for prizes (i.e., non-cash prizes). For example, because wagering for money may not be legally permitted in particular geographic regions, to fantasy sports contestants of these geographical regions the ability to wager for prizes. As another example, the fantasy sports contest application may provide to contestants who prefer to wager for prizes the ability to wager for prizes (e.g., gift certificates, free subscriptions to the fantasy sports contest application service, a trophy, etc.).

In some embodiments of the present invention, the fantasy sports contest application may provide to fantasy sports contestants the ability to wager for points redeemable for prizes. For example, because fantasy sports contestants (e.g., of different fantasy sports contest leagues) may live in geographical regions in which monetary currencies are different, the fantasy sports contest application may provide to fantasy sports contestants the ability to wager for points redeemable for cash prizes to allow the contestants of the different geographical regions to better understand wagering opportunity terms (e.g., wagering opportunity amount). As another example, the fantasy sports contest application may provide to fantasy sports contestants in geographical regions in which wagering for money is not legally permitted the ability to wager for points redeemable for non-cash prizes.

In some embodiments of the present invention, the fantasy sports contest application may provide to fantasy sports contestants the ability to wager based on outcomes of single events. For example, the fantasy sports contest application may provide to fantasy sports contestants the ability to wager based on an outcome of a single sporting event or a portion of a single sporting event (e.g., a winner of a baseball game, whether a particular player gets a hit during a particular at-bat in a baseball game, a winner of an automobile race, etc.). As another example, the fantasy sports contest application may provide to fantasy sports contestants the ability to wager based on an outcome of a single non-sports event or a portion of a single non-sports event (e.g., the winner of the Oscar Award for "Best Movie", whether a contestant in a televised game show answers a particular question correctly, etc.).

In some embodiments of the present invention, the fantasy sports contest application may provide to fantasy sports contestants the ability to wager based on more than one event. For example, the fantasy sports contest application may provide to fantasy sports contestants the ability to wager based on more than one sporting event (e.g., a wagering pool for the World Series or NCAA Basketball tournament, how close a particular baseball player will come to breaking the record for longest hitting streak, etc.).

In some embodiments of the present invention, the fantasy sports contest application may provide to fantasy sports contestants the ability to wager for a predefined wagering opportunity amount. For example, the fantasy sports contest application may provide to fantasy sports contestants the ability to wager on a sporting event for a predefined amount of money (e.g., $10). As another example, the fantasy sports contest application may provide to fantasy sports contestants the ability to wager on a non-sports event for a predefined amount of points (e.g., 15 points) redeemable for prizes.

In some embodiments of the present invention, the fantasy sports contest application may provide to fantasy sports contestants the ability to wager based on defined odds or spreads. For example, the fantasy sports contest application may provide to fantasy sports contestants the ability to wager on a non-sports event in which the payout is determined by the number and disposition (i.e., wagering choice) of wagerers that accept the wagering opportunity (i.e., a pari-mutuel type wagering opportunity). As another example, the fantasy sports contest application may provide to fantasy sports contestants the ability to wager on a sporting event in which a certain team or player must clear a defined spread (e.g., a point spread for a basketball game, a number of strikeouts for a baseball pitcher) for a wagerer to win the wager.

The fantasy sports contest application (e.g., implemented at least partially on user equipment (120, 210)) may change its displays and available options based on application data for fantasy sports contests and wagering opportunities and wagers. FIGS. 5-10 and 12-39 show various fantasy sports contest application display screens in accordance with various embodiments of the present invention. The display screens of FIGS. 5-10 and 12-39 are only illustrative. Any other suitable user interface approach may be used.

Figure 5:
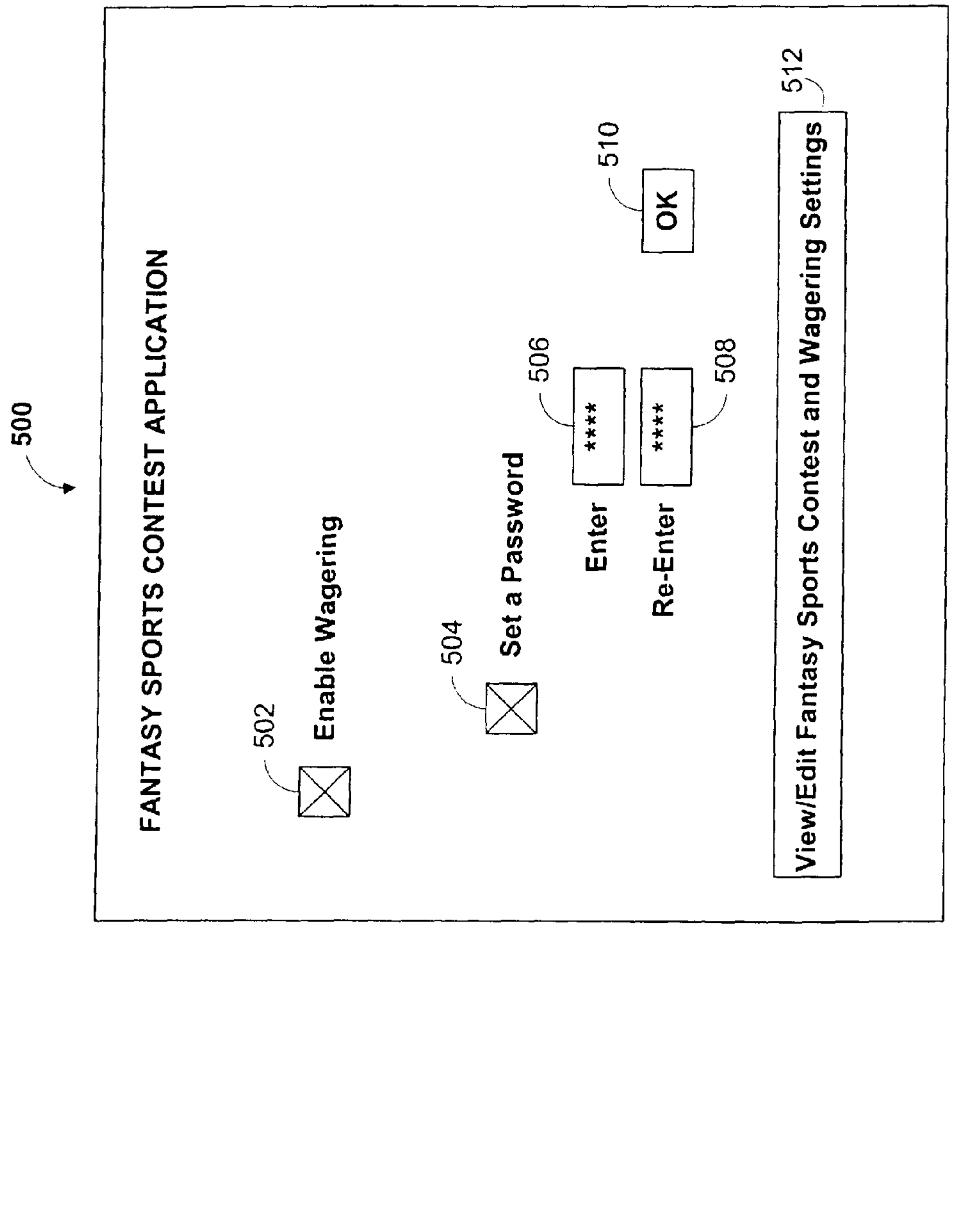
FIG. 5 is an illustrative fantasy sports contest application options display screen in accordance with one embodiment of the present invention.

FIG. 5 shows an illustrative fantasy sports contest application system options display screen 500. Display screen 500 may be displayed in response to initialization (e.g., boot-up) of the fantasy sports contest application, a user selection of a remote control key (e.g., using remote control 318 (FIG. 3)) to view fantasy sports contest options information, or any other user selection to view fantasy sports contest application options information. The fantasy sports contest application may enable wagering options and features (e.g., intra-league wagering, inter-league wagering, wagering for points, wagering for money, etc.) for a user in response to a user selection or indication of enable wagering option 502. For example, in embodiments of the present invention in which the fantasy sports contest application is fully operative to provide fantasy sports contests and wagering opportunities, the fantasy sports contest application may include wagering options and features in various fantasy sports contest application display screens in response to a user selection of enable wagering option 502. As another example, in embodiments of the present invention in which the fantasy sports contest application interfaces with one or more wagering applications to provide fantasy sports contests with wagering opportunities, the fantasy sports contest application may provide to a user various opportunities to access the one or more wagering applications from fantasy sports contest application display screens in response to a user selection of enable wagering option 502. In other embodiments of the present invention, the fantasy sports contest application may display separate options to enable various types of wagering (e.g., intra-league wagering, inter-league wagering, wagering for points, wagering for money, etc.). Also in other embodiments of the present invention, the fantasy sports contest application may enable wagering options and features for a user at all times, by default, or may determine for the user whether wagering options and features are enabled (e.g., based on laws governing a user's geographical region).

In some embodiments of the present invention, the fantasy sports contest application may provide to a user the ability to set a password. The password may prevent others from tampering with a user's fantasy sports contest settings and wagering settings. For example, in response to a user selection of option 504, the fantasy sports contest application may provide to a user the ability to enter a desired password into data region 506 and re-enter the password into data region 508. The fantasy sports contest application may set the password entered into data regions 506 and 508 in response to a user selection of "OK" option 510 or other option indicating a user confirmation of the password entered into data regions 506 and 508 (e.g., an "Enter" key of remote control 318 (FIG. 3)). In other embodiments of the present invention, the fantasy sports contest application may determine a password for the user. In embodiments of the present invention in which the fantasy sports contest application interfaces with one or more wagering applications to provide fantasy sports contests with wagering opportunities, a first user password may prevent others from tampering with a user's fantasy sports contest settings and a second user password may prevent others from tampering with a user's wagering settings.

Figure 6:
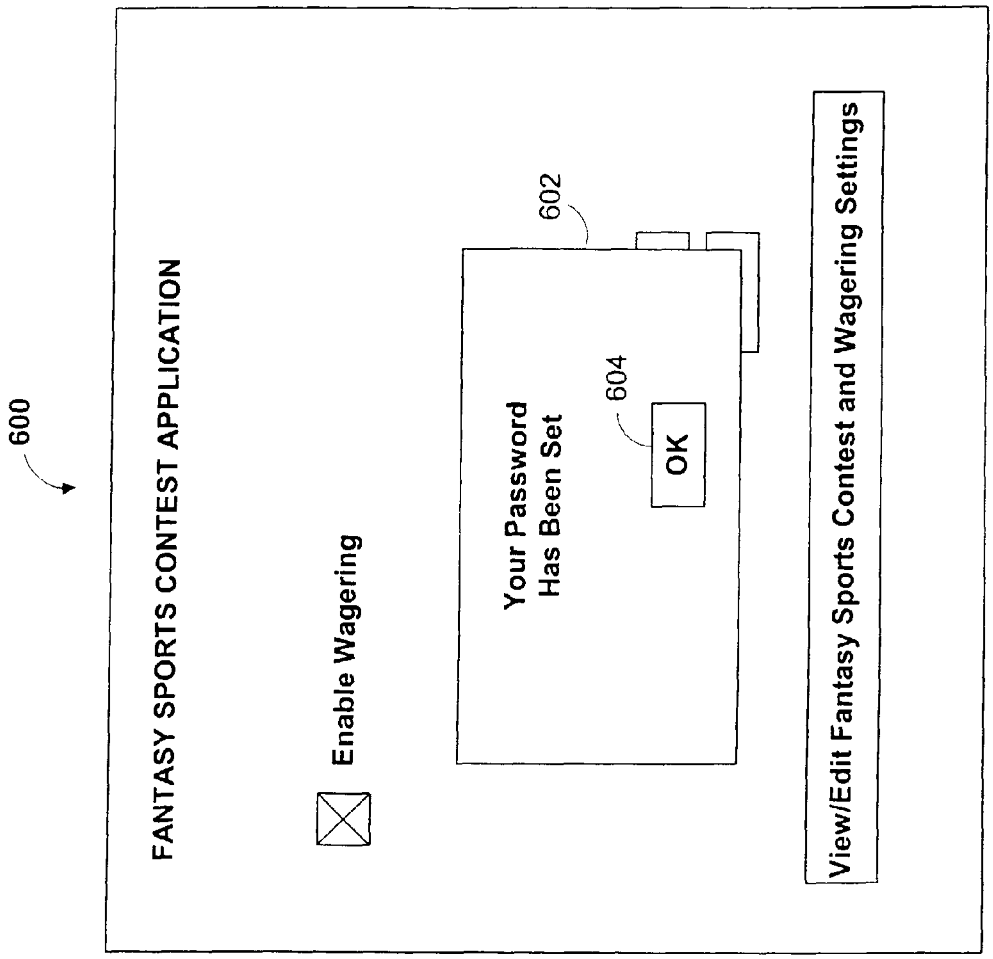
FIG. 6 is an illustrative fantasy sports contest application password confirmation display screen in accordance with one embodiment of the present invention.

FIG. 6 shows an illustrative password confirmation display screen 600. The fantasy sports contest application may display overlay 602 to indicate that a user password has been set by the fantasy sports contest application. The fantasy sports contest application may remove overlay 602 from display screen 600 in response to user selection of "OK" option 604. In other embodiments of the present invention, the fantasy sports contest application may display information confirming a user password in a separate display screen, in a separate region of display screen 600, or in any other suitable arrangement. In embodiments in which the fantasy sports contest application interfaces with one or more wagering applications to provide fantasy sports contests and wagering opportunities, the one or more wagering applications may display information for password confirmation in any other suitable arrangement in wagering application display screens (which may be integrated into fantasy sports contest application display screens).

In some embodiments of the present invention, the fantasy sports contest application may provide to a user the ability to view and edit fantasy sports contest and wagering settings. For example, returning to FIG. 5, the fantasy sports contest application may display option 512 to view and edit fantasy sports contest and wagering settings. In other embodiments of the present invention, a first option to view and edit fantasy sports contest settings and a second option to view and edit wagering settings may be displayed to the user.

Figure 7:
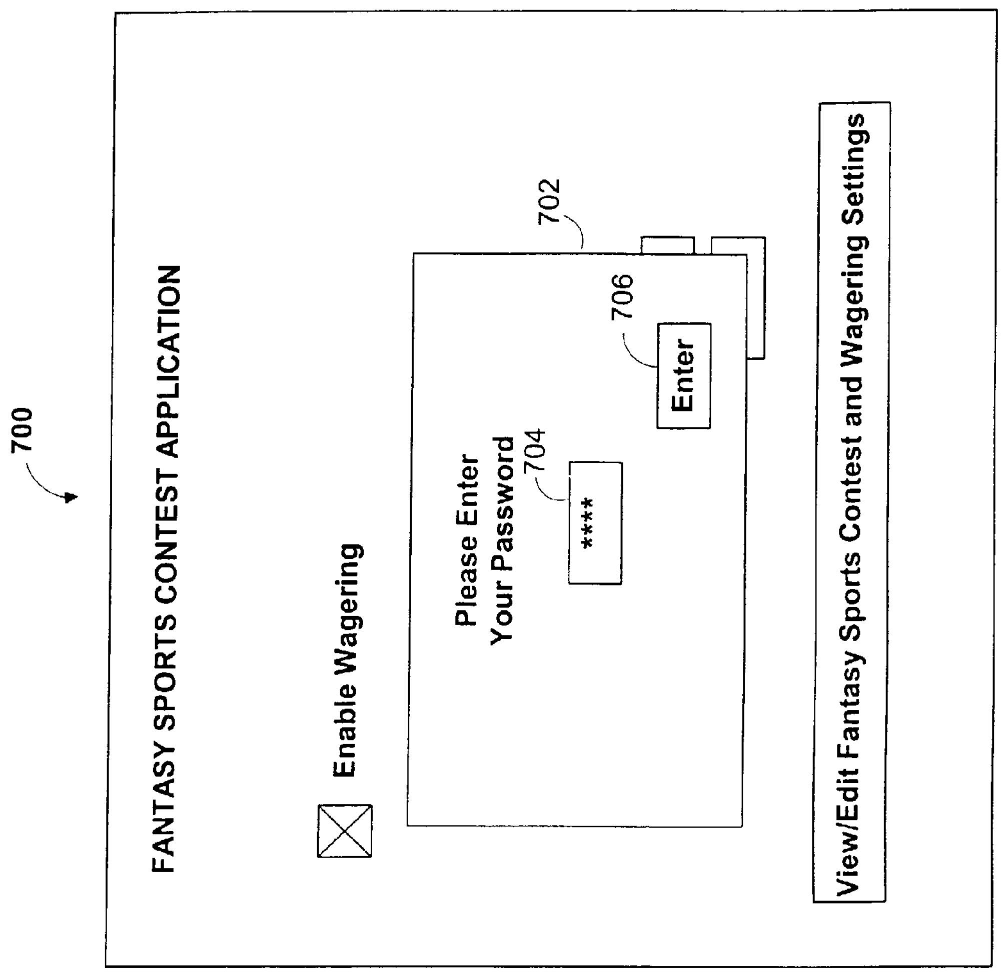
FIG. 7 is an illustrative fantasy sports contest application password entry display screen in accordance with one embodiment of the present invention.

In some embodiments of the present invention, a user may be required to enter a password to view and edit fantasy sports contest and wagering settings. FIG. 7 shows an illustrative password entry display screen 700. Referring to both FIGS. 5 and 7, the fantasy sports contest application may display password entry overlay 702 in response to a user selection of option 512 to view/edit fantasy sports contest and wagering settings. A user may be required to enter a valid password (e.g., the password entered by the user in data regions 506 and 508, a password determined for the user, a first password for fantasy sports contest settings, a second password for wagering settings, etc.) into data region 704 and subsequently select "Enter" option 706 to view and edit fantasy sports contest and wagering settings.

Figure 8:
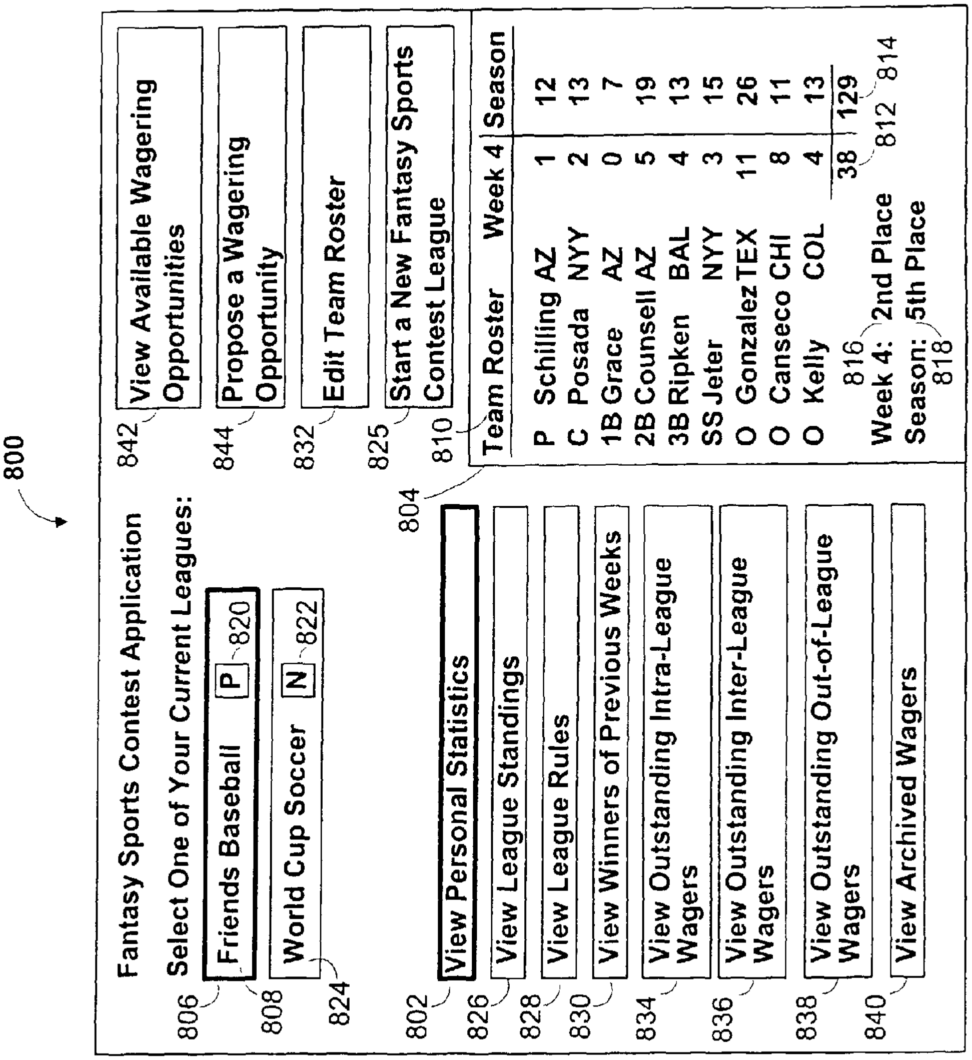
FIG. 8 is an illustrative fantasy sports contest application display screen showing a contestant's fantasy sports contest league statistics in accordance with one embodiment of the present invention.

FIG. 8 shows an illustrative fantasy sports contest and wagering settings display screen 800. Referring to both FIGS. 5 and 8, the fantasy sports contest application may display display screen 800 in response to a user selection of option 512 (FIG. 5) or other option to view and edit fantasy sports contests and wagering settings (e.g., initialization of the fantasy sports contest application). Display screen 800 may include options and settings for a user's fantasy sports contests and wagering opportunities and wagers. In embodiments in which the fantasy sports contest application is fully operative to provide fantasy sports contests with wagering opportunities, the fantasy sports application contest may use application data to define wagering opportunities and to include wagering information in various fantasy sports contest application display screens such as display screen 800. Alternatively, in embodiments in which the fantasy sports contest application interfaces with one or more wagering applications to provide fantasy sports with wagering opportunities, the fantasy sports contest application may direct the one or more wagering applications to display wagering information in, for example, a display region of a fantasy sports contest application display screen or in separate wagering application display screens.

In some embodiments of the present invention, the fantasy sports contest application may display to a fantasy sports contestant the contestant's personal fantasy sports contest statistics. For example, in response to a user selection of option 802 (or by default in response to, for example, a user selection of option 512 (FIG. 5) to view/edit fantasy sports contest and wagering settings), the fantasy sports contest application may display information indicating a contestant's performance in an active fantasy sports contest league (i.e., a user's fantasy sports contest league which the user has selected to view league data or a user's fantasy sports contest league which is the default selection) in display region 804. In this example, highlight region 806 indicates that fantasy baseball contest league "Friends Baseball" 808 is the active fantasy sports contest league. Display region 804 may include information for a particular contestant including, for example, members of a contestant's fantasy sports contest team roster 810, fantasy sports contest league point total for a current week 812, fantasy sports contest league point total for the season 814, fantasy sports contest league standing for a current week 816, fantasy sports contest league standing for the season 818 and any other fantasy sports contest data for a particular contestant. In some embodiments of the present invention, display region 804 may include other data for the user such as real-life statistics for the members of the user's team roster 810. In some embodiments of the present invention, the information of display region 804 or any other fantasy sports contest information or wagering information may be displayed in an overlay, in a separate display screen, or in any other display arrangement (e.g., a split-screen containing information for fantasy sports contests in a first region and information for wagering opportunities and wagers in a second region).

In some embodiments of the present invention, the fantasy sports contest application may display information for different types of fantasy sports contest leagues. For example, icon 820 indicates that fantasy sports contest league 808 is a private league (e.g., a league organized by and consisting of a group of friends, colleagues, etc.). Membership to a private fantasy sports contest league may be controlled by, for example, a league commissioner of the fantasy sports contest league. As another example, icon 822 indicates that fantasy soccer contest league "World Cup Soccer" 824 is a national league (i.e., a league organized by the fantasy sports contest application system and consisting of contestants who may or may not know each other). The fantasy sports contest application may indicate different types of fantasy sports contest leagues using any other suitable method (e.g., displaying data for different types of leagues in different colors). For example, the fantasy sports contest application may use any suitable display means to distinguish leagues utilizing pari-mutuel wagering and leagues that utilize fixed odds for wagering. The fantasy sports contest application may provide to a user an opportunity to start or participate in a new fantasy sports contest league and may allow a user to define various fantasy sports contest and wagering options and settings for the new fantasy sports contest league (e.g., whether the league is private or national, whether and how the winners of a fantasy sports contest league will be compensated, other fantasy sports contest and wagering settings, etc.) in response to a user selection of option 825 to start a new fantasy sports contest league.

Figure 9:
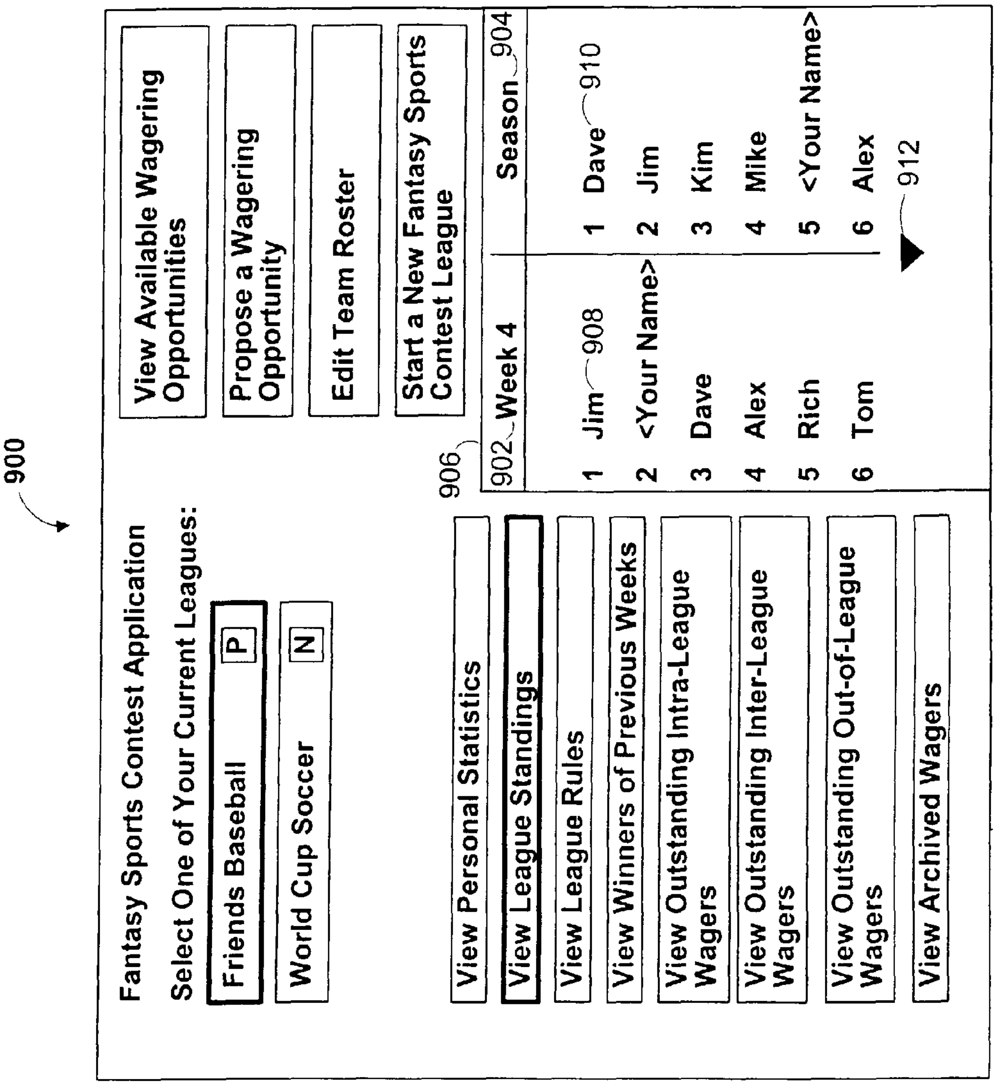
FIG. 9 is an illustrative fantasy sports contest application display screen showing fantasy sports contest league standings in accordance with one embodiment of the present invention.

In some embodiments of the present invention, the fantasy sports contest application may display to a fantasy sports contestant league standings for a fantasy sports contest league. FIG. 9 shows an illustrative fantasy sports contest league standings display screen 900. Referring to both FIGS. 8 and 9, the fantasy sports contest application may display league standings for current week 902 and season 904 of active league 808 in display region 906 in response to a user selection of option 826 to view league standings. As shown in FIG. 9, contestant "Jim" 908 may be in first place for "week 4" 902 of the fantasy sports contest league season and contestant "Dave" 910 may be in first place for the overall fantasy sports contest league season. In this example, the scoring system of active fantasy sports contest league "Friends Baseball" 808 may be a straight point scoring system (e.g., points are awarded and subtracted based on real-life plays without regard to the performance of other contestants in the user's fantasy sports contest league) or a rotisserie scoring system (e.g., points are awarded based on the user's relative ranking against other users). In other examples, the scoring system may be a head-to-head scoring system (e.g., users in a league are matched against one another in a round-robin series of one-on-one contests during the course of a season) or any other suitable scoring system or combination of such scoring systems. Arrow 912 may indicate that additional league standings or other fantasy sports contest and wagering data are available for viewing (e.g., in response to a user pressing a "Down" key of remote control 318 (FIG. 3)).

Figure 10:
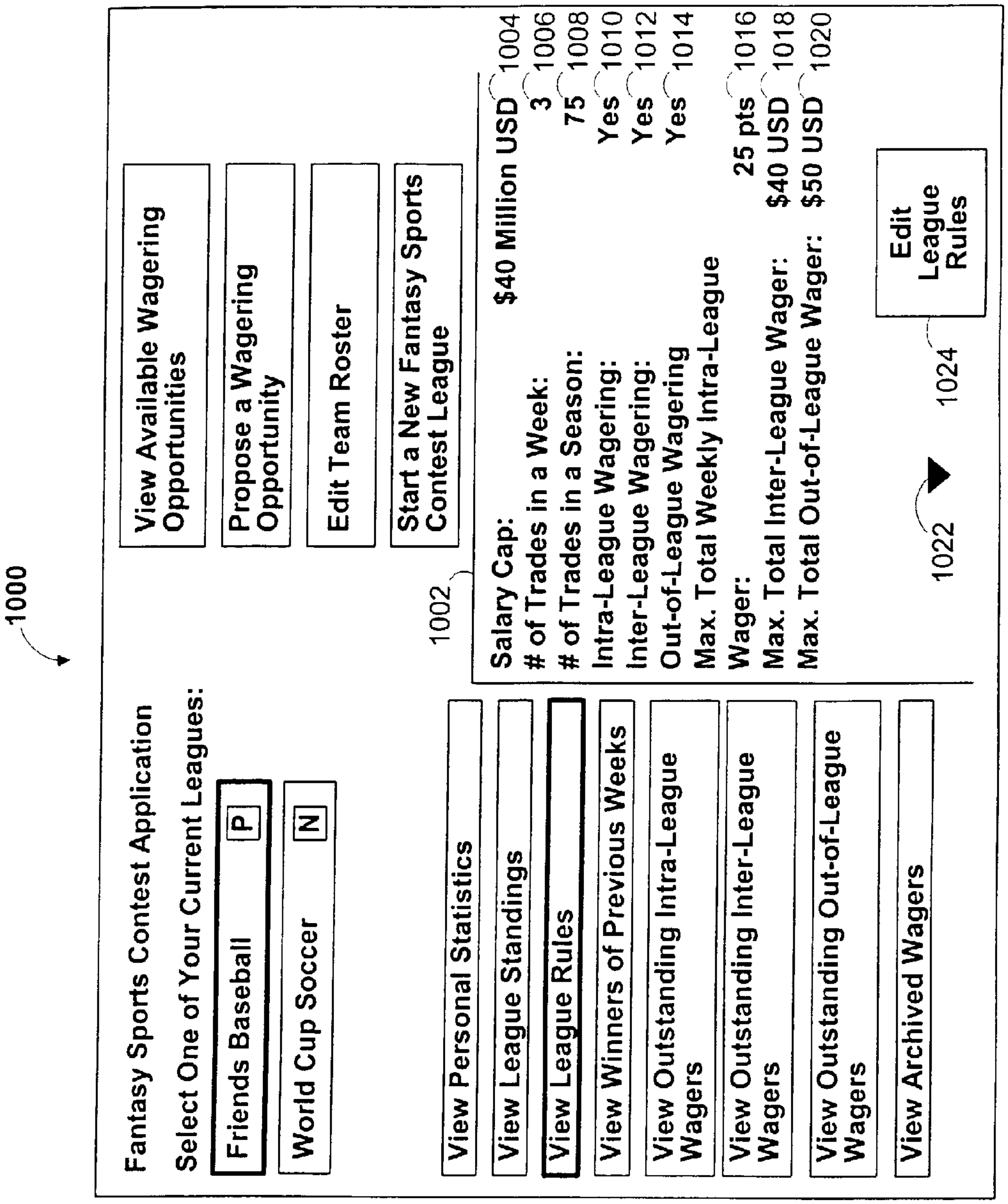
FIG. 10 is an illustrative fantasy sports contest application display screen showing fantasy sports contest league rules in accordance with one embodiment of the present invention.

In some embodiments of the present invention, the fantasy sports contest application may provide to a user the ability to view league rules for a fantasy sports contest league. FIG. 10 shows an illustrative fantasy sports contest league rules display screen 1000. Referring to both FIGS. 8 and 10, the fantasy sports contest application may display in display region 1002 league rules for active league 808 in response to a user selection of option 828 to view league rules. Display region 1002 may include information for rules of a fantasy sports contest league such as a team salary cap 1004 for the contestant's fantasy sports contest team, a limit on the number of fantasy sports contest player trades in a week 1006, a limit on the number of fantasy sports contest player trades in a season 1008, whether intra-league wagering is enabled 1010, whether inter-league wagering is enabled 1012, whether out-of-league wagering is enabled 1014, a limit on the amount of intra-league wagering in a week 1016, a limit on the amount of inter-league wagering in a week 1018, a limit on the amount of out-of-league wagering in a week 1020 (e.g., each of limits 1016, 1018 and 1020 expressed as a maximum number or amount of points, money, prize value, etc.) or any other rules for a fantasy sports contest league (e.g., a price that is charged to the user for each trade of a fantasy sports contest team selection and that accumulates to increase the reward for the winner of the user's fantasy sports contest league). Arrow 1022 may indicate that information for other rules and other fantasy sports contest and wagering information are available for viewing by the user. The fantasy sports contest application may, for example, use application data to define wagering opportunities and to display wagering options and settings for a user in fantasy sports contest application display screens such as display screen 1000.

Figure 11:
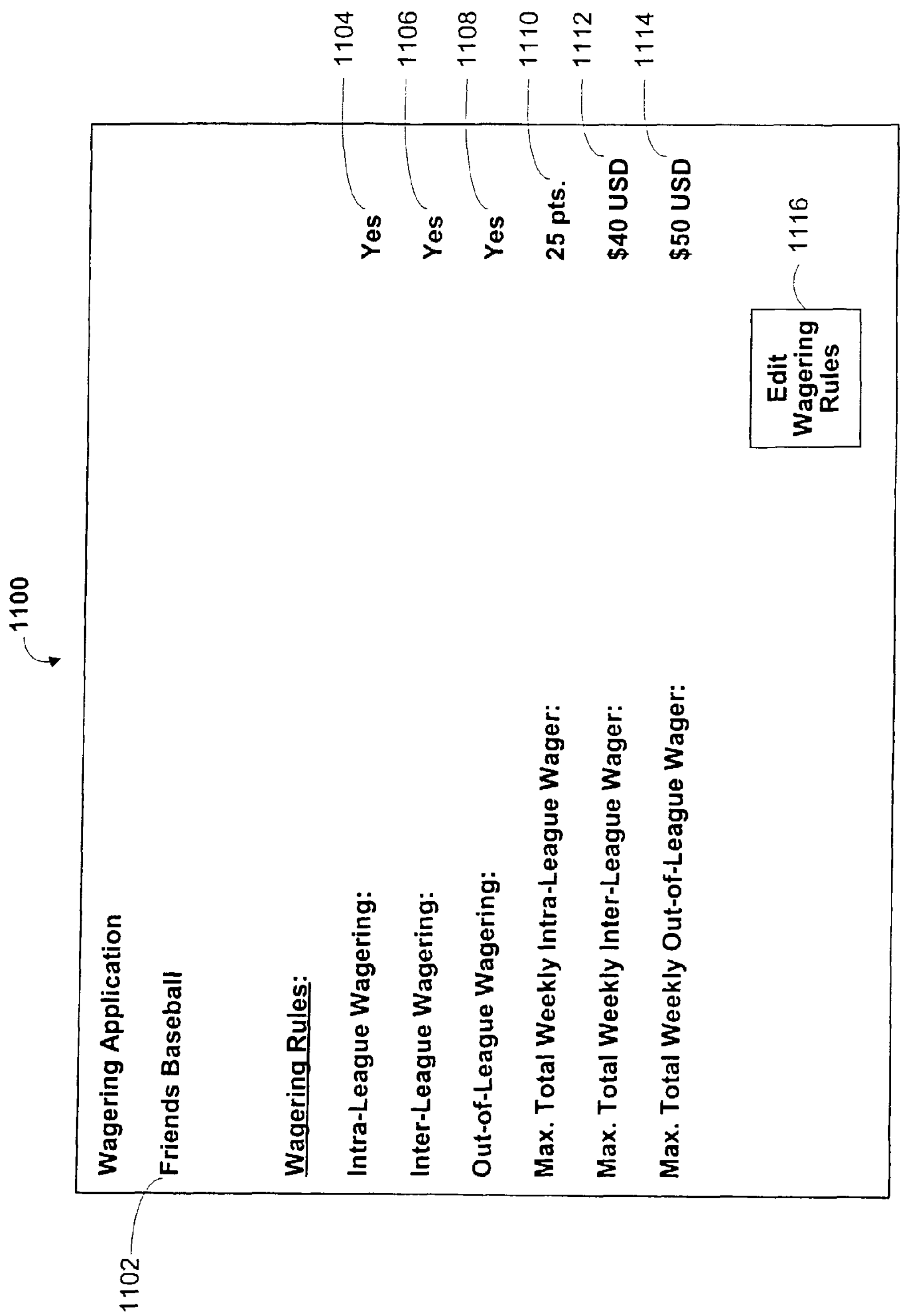
FIG. 11 is an illustrative wagering application settings display screen showing wagering rules for a fantasy sports contest league in accordance with one embodiment of the present invention.

In some embodiments of the present invention, the fantasy sports contest application may direct one or more wagering applications to display wagering information in, for example, a region of a fantasy sports contest application display screen or in a separate wagering application display screen in response to user selection from a fantasy sports contest application display screen. For example, a wagering application that interfaces with the fantasy sports contest application may display wagering rules information in display region 1002 in response to a user selection of option 828 to view league rules. FIG. 11 shows an illustrative wagering application display screen 1100. Referring to both FIGS. 8 and 11, as another example, the fantasy sports contest application may direct a wagering application that interfaces with the fantasy sports contest application to display wagering rules information for a particular fantasy sports contest league and contestant in display screen 1100 in response to a user selection of option 828 to view league rules. In this example, display screen 1100 may include wagering rules information for active fantasy sports contest league "Friends Baseball" (808, 1102) such as whether intra-league wagering is enabled 1104, whether inter-league wagering is enabled 1106, whether out-of-league wagering is enabled 1108, a limit on the amount of intra-league wagering in a week 1110, a limit on the amount of inter-league wagering in a week 1112, a limit on the amount of out-of-league wagering in a week 1114 (e.g., each of limits 1110, 1112 and 1114 expressed as a maximum number or amount of points, money, prize value, etc.) or any other wagering rules for active fantasy sports contest league "Friends Baseball" (808, 1102). The information of display screen 1100 is only illustrative. One or more wagering applications that interface with the fantasy sports contest application may display various other wagering information in separate wagering application display screens that are similar to display screen 1100 or in display regions of various fantasy sports contest application display screens (e.g., display region 1002 (FIG. 10)). The display arrangement of display screen 1100 is only illustrative. Any other suitable display arrangement may be used to display information for fantasy sports contests and wagering opportunities and wagers. For example, wagering information for wagering opportunities and wagers may be displayed in one or more overlays that overlay information for fantasy sports contests (e.g., or vice-versa).

Figure 12:
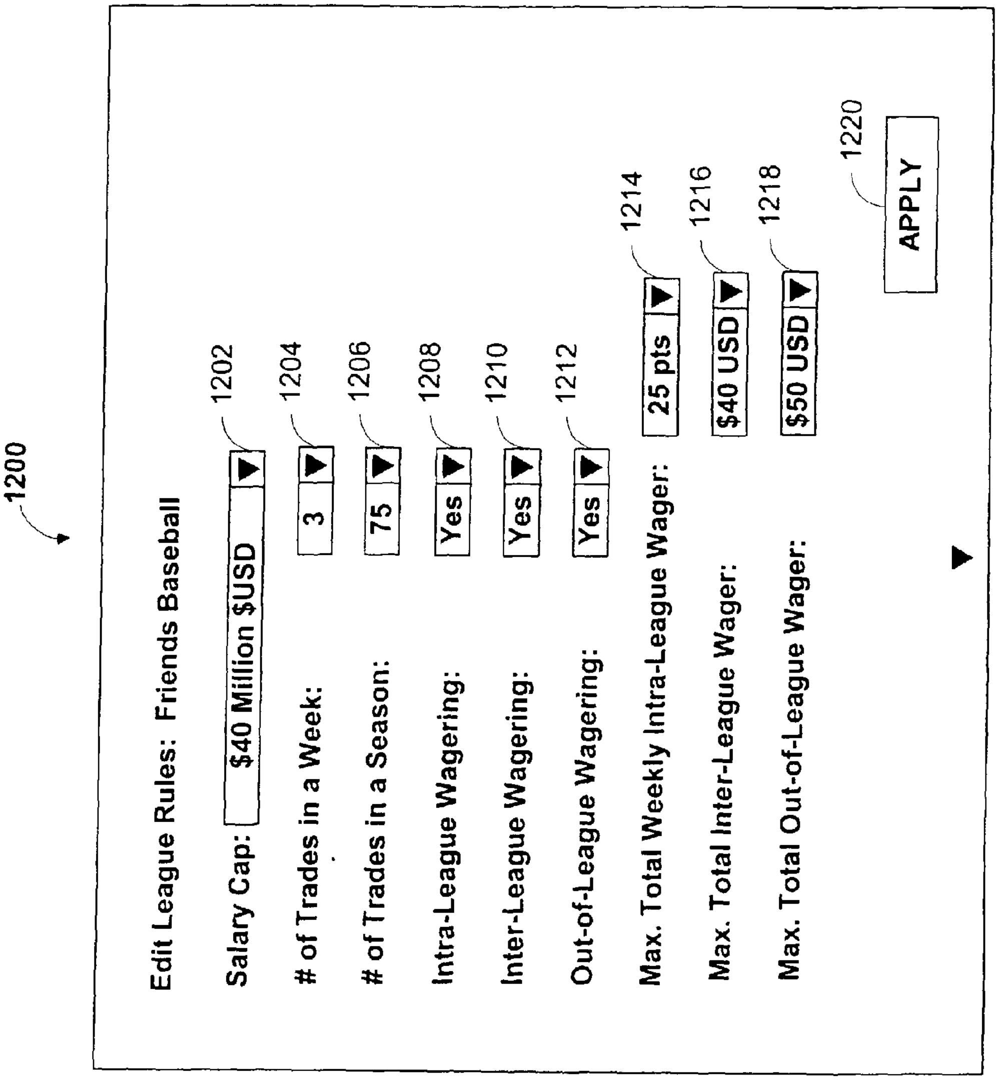
FIG. 12 is an illustrative fantasy sports contest application edit league rules display screen in accordance with one embodiment of the present invention.

In some embodiments of the present invention, the fantasy sports contest application may provide to a user the ability to edit rules for a fantasy sports contest league. FIG. 12 shows an illustrative edit fantasy sports contest league rules display screen 1200. Referring to both FIGS. 10 and 12, the fantasy sports contest application may provide to a user the ability to edit league rules in display screen 1200 in response to a user selection of option 1024 to edit league rules. Display screen 1200 may include various editable rules for a fantasy sports contest league and a fantasy sports contestant such as, for example, the fantasy sports contest league rules displayed in display region 1002 of display screen 1000. In particular, display screen 1200 may include editable fantasy sports contest league rules including an editable team salary cap 1202 for a contestant's fantasy sports contest team, an editable limit on the number of fantasy sports contest player trades in a week 1204, an editable limit on the number of fantasy sports contest player trades in a season 1206, an editable option that determines whether intra-league wagering is enabled 1208, an editable option that determines whether inter-league wagering is enabled 1210, an editable option that determines whether out-of-league wagering is enabled 1212, an editable limit on the amount of intra-league wagering in a week 1214 (or other period of time), an editable limit on the amount of inter-league wagering in a week 1216, an editable limit on the amount of out-of-league wagering in a week 1218, or any other editable fantasy sports contest league rules. In this example, a user may edit league rules (e.g., edit salary cap 1202 to be "$60 million USD") using the pull-down menus (e.g., pull-down menu 1202) shown in FIG. 12. In other examples, a user may be permitted to edit league rules by entering information into data fields or using any other suitable method of editing league rules. In some embodiments of the present invention, the fantasy sports contest application my provide to only a league commissioner of a fantasy sports contest league (e.g., a contestant of the fantasy sports contest league that sets rules for and otherwise watches over the fantasy sports contest league) the ability to edit league rules. The fantasy sports contest application may modify league rules as indicated by a user in display screen 1200 in response to a user selection of "APPLY" option 1220.

In some embodiments of the present invention, only a portion of the league rules may be editable throughout a fantasy sports contest league season. For example, salary cap 1004 may be editable only until the half-way point of a fantasy sports contest league season. As another example, users may be permitted to enable or disable only inter-league wagering 1010 (e.g., for points redeemable for prizes) throughout an entire fantasy sports contest league season. Still another example, users may be permitted to modify settings for intra-league wagering for money (e.g., enabling or disabling inter-league wagering for money, modifying a limit on the monetary amount for inter-league wagering, etc.) throughout an entire fantasy sports contest league season, but settings for intra-league wagering for fantasy sports contest league points may be locked-in (i.e., not editable) once the fantasy sports contest league season has started, is halfway over, etc.

Figure 13:
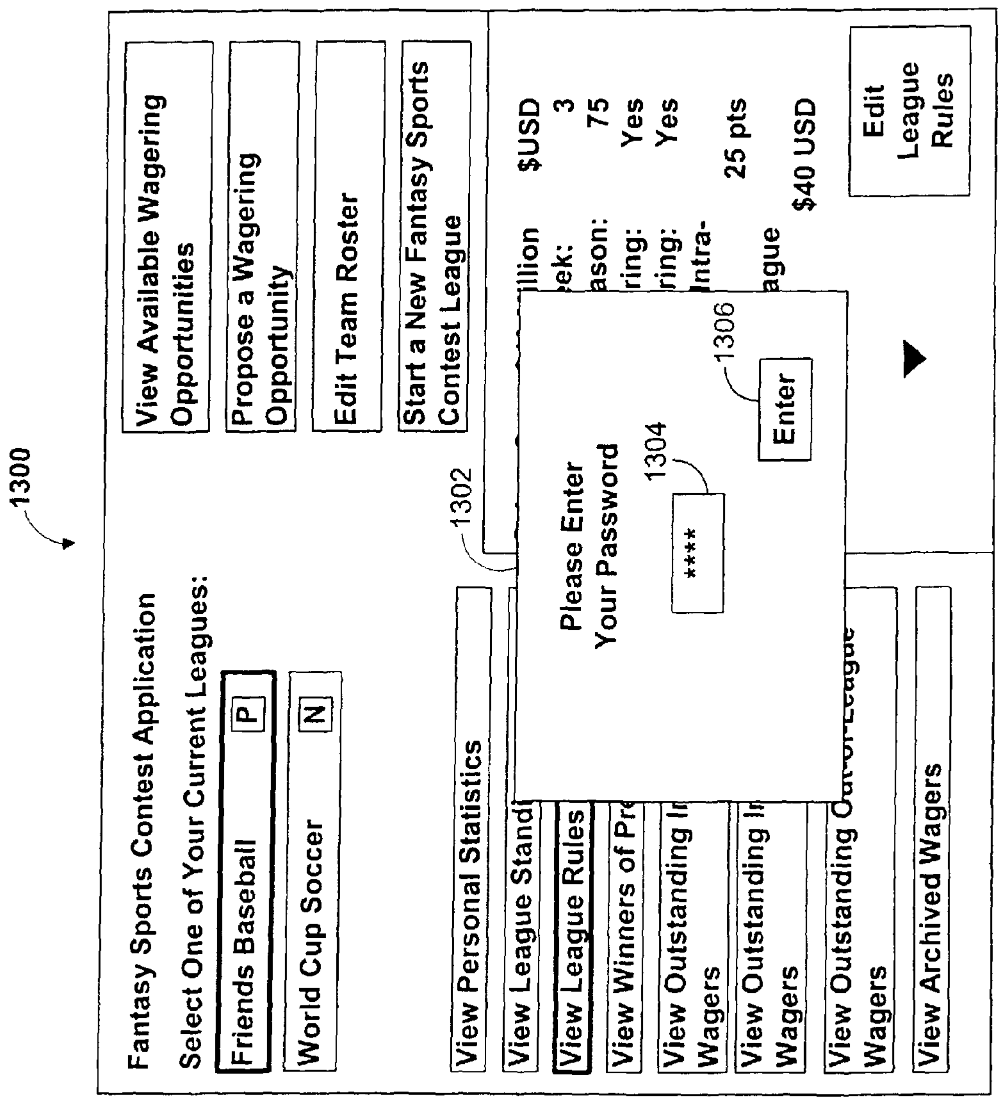
FIG. 13 is an illustrative fantasy sports contest application password entry overlay display screen in accordance with one embodiment of the present invention.

In some embodiments of the present invention, a user may be required to enter a password to edit league rules. FIG. 13 shows an illustrative password entry display screen 1300. Referring to both FIGS. 10 and 13, the fantasy sports contest application may display password overlay 1302 in response to a user selection of option 1024 to edit league rules. A user may be required to enter a valid password (e.g., the password of data regions 506 and 508 (FIG. 5), a password known only to a fantasy sports contest league commissioner, etc.) into data region 1304 and subsequently select "Enter" option 1306 of password overlay 1302 to edit league rules.

In some embodiments of the present invention, at least some of the fantasy sports contest and wagering rules may be determined for a user. For example, the fantasy sports contest application may use application data (e.g., accounting data indicating whether the members of a fantasy sports contest league have a history of timely settling lost bets) to determine whether wagering (e.g., intra-league wagering, inter-league wagering, and out-of-league wagering) is enabled or disabled for the members of a fantasy sports contest league. As another example, the fantasy sports contest application may use application data (e.g., data indicating a contestant's geographical location) to determine whether a particular fantasy sports contestant is permitted to wager for money, fantasy sports contest points, or points redeemable for prizes. Still another example, the fantasy sports contest application may determine all fantasy sports contest and wagering rules for members of a national fantasy sports contest league (e.g., national rotisserie soccer league "World Cup Soccer" 824 (FIG. 8)).

Figure 14:
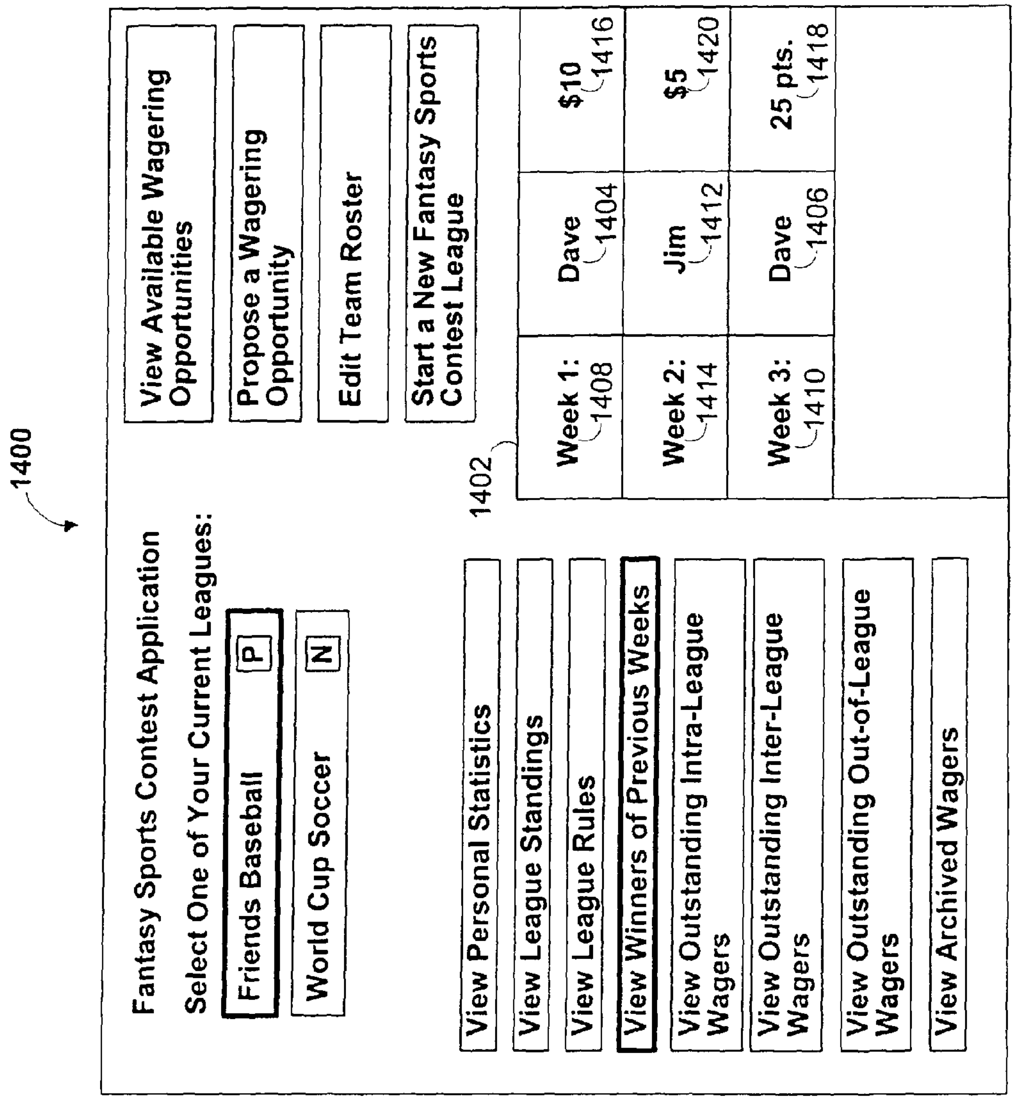
FIG. 14 is an illustrative fantasy sports contest application display screen showing winners of previous weeks of a fantasy sports contest league in accordance with one embodiment of the present invention.

In some embodiments of the present invention, the fantasy sports contest application may display to a fantasy sports contestant information for winners of previous weeks of a fantasy sports contest league season. FIG. 14 shows an illustrative previous winners display screen 1400. Referring to both FIGS. 8 and 14, the fantasy sports contest application may display in display region 1402 information for winners of previous weeks of a fantasy sports contest league season in response to a user selection of option 830 to view winners of previous weeks. In this example, display region 1402 includes information that indicates contestant "Dave" (1404, 1406) was the winner of "week 1" 1408 and "week 3" 1410 and contestant "Jim" 1412 was the winner of "week 2" 1414. Display region 1402 also includes payout information for the winners of previous weeks. For example, the information of display region 1402 indicates that contestant "Dave" (1404, 1406) won "$10" 1416 for "week 1" 1408 and "25 pts." 1418 for "week 3" 1410, and contestant "Jim" 1412 won "$5" 1420 for "week 2" 1414. Payout amounts 1416, 1418 and 1420 may be based on wagers made by fantasy sports contestants. For example, payouts 1416, 1418, and 1420 may be based on a payout schedule that was defined by the contestants of a fantasy sports contest at the start of the fantasy sports contest league (e.g., the winner of "week 1" 1408 receives "$10" 1416) in, for example, a display screen similar to edit league rules display screen 1200 (FIG. 12) having pull-down menus that can be used to define payouts. As another example, payouts 1416, 1418 and 1420 may be determined based on wagers made between fantasy sports contestants during the fantasy sports contest league (e.g., contestant "Dave" 1406 wagered "25 pts." 1418 with the fantasy sports contest application system that contestant "Dave" 1406 would win "week 3" 1410). Winners of fantasy sports contest leagues may be compensated with, for example, money, fantasy sports points, non-cash prizes, and points redeemable for prizes. In some embodiments of the present invention, the fantasy sports contest application may display in display region 1402 information for contests between fantasy sports contest leagues such as, for example, information indicating which fantasy sports contest league accumulated the most fantasy sports contest points in previous weeks. In some embodiments of the present invention, the fantasy sports contest application may display in display region 1402 information for wagers between fantasy sports contest leagues such as, for example, information indicating payouts that have been won by the fantasy sports contest leagues for wagers based on the performance of the fantasy sports contest leagues in a fantasy sports contest.

Figure 15:
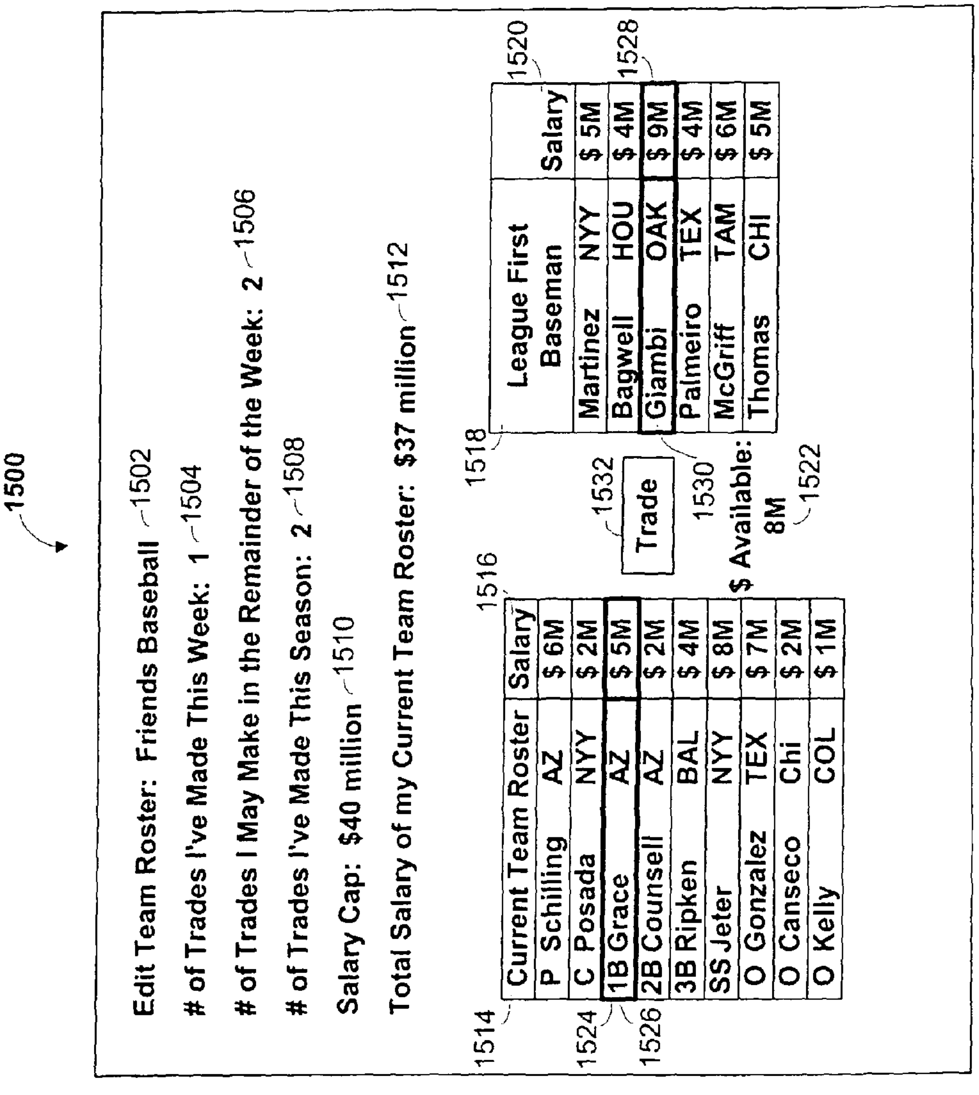
FIG. 15 is an illustrative fantasy sports contest application edit team roster display screen in accordance with one embodiment of the present invention.

In some embodiments of the present invention, the fantasy sports contest application may provide to a user an opportunity to edit a fantasy sports contest team roster for a fantasy sports contest league. FIG. 15 shows an illustrative edit team roster display screen 1500. Referring to FIGS. 8 and 15, the fantasy sports contest application may display display screen 1500 in response to a user selection of option 832 to edit a fantasy sports contest team roster. Display screen 1500 may include information such as, for example, active league 1502, number of trades a contestant has made in a current week 1504, number of trades that a contestant may make in the remainder of the week 1506 (e.g., based on league rule 1006 (FIG. 10)), number of trades a contestant has made in a fantasy sports contest league season 1508, salary cap 1510 (e.g., corresponding to league rule 1004 (FIG. 10)), total salary of current team roster 1512, current team roster 1514, salaries of players of current team roster 1516, available fantasy sports contest team players 1518, salaries of available fantasy sports contest team players 1520 (e.g., as defined by fantasy sports contest league contestants at the beginning of the league, as defined by the fantasy sports contest application, etc.), and salary funds available below the salary cap 1522. The fantasy sports contest application may provide to a user an opportunity trade players from current team roster 1514 for other fantasy sports contest players (e.g., available fantasy sports contest team players 1518), provided that the user remains below salary cap 1510.

Figure 16:
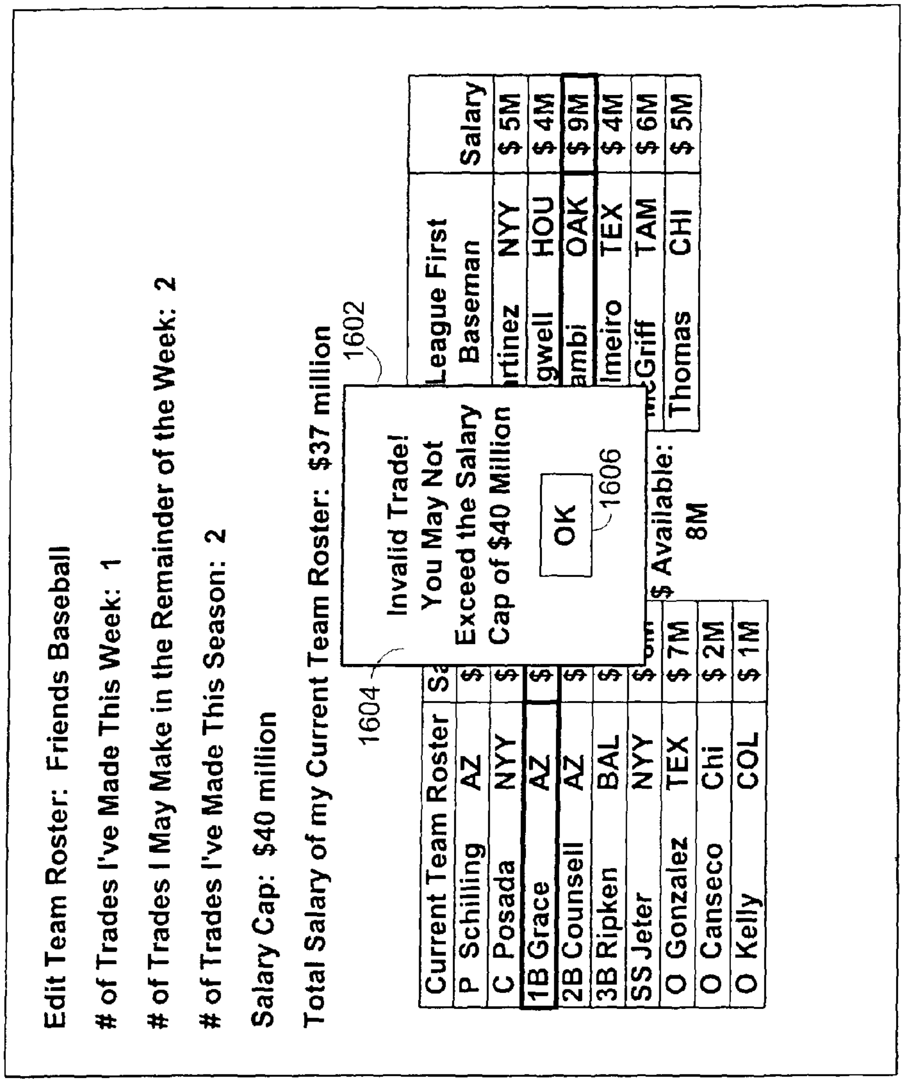
FIG. 16 is an illustrative fantasy sports contest application invalid trade display screen in accordance with one embodiment of the present invention.

In some embodiments of the present invention, the fantasy sports contest application may display information indicating that a trade attempt is invalid (e.g., because a user has exceeded the limit on the amount of trades that can be made, because a user already has one or more players for a particular position, etc.) when a user attempts to complete an invalid trade. FIG. 16 shows an illustrative invalid trade overlay display screen 1600. Referring to FIGS. 15 and 16, the fantasy sports contest application may display overlay 1602 in response to a user attempt to complete an invalid trade from display screen 1500. In particular, if a user positions highlight region 1524 on current rotisserie league first baseman Mark Grace 1526 and highlight region 1528 on available rotisserie league first baseman Jason Giambi 1530 and selects "Trade" option 1532, the fantasy sports contest application may display information 1604 in overlay 1602 indicating that the trade attempt is invalid because the user cannot exceed salary cap 1510. The fantasy sports contest application may remove overlay 1602 in response to a user selection of "OK" option 1606.

In some embodiments of the present invention, the fantasy sports contest application may provide to a user an opportunity to make selections for, for example, a wagering pool (e.g., a wagering pool that is related to the user's fantasy sports contest). For example, the fantasy sports contest application may display information for a wagering pool in response to a user selection of an option to edit wagering selections (not shown). An edit wagering settings display screen may appear similar to edit team roster display screen 1500 in that a user may be provided with an opportunity to make wagering pool selections (e.g., for a particular week of an NFL football season, for an entire tournament such as the NCAA Men's Basketball Tournament, etc.) using data provided by the fantasy sports contest application.

Figure 17:
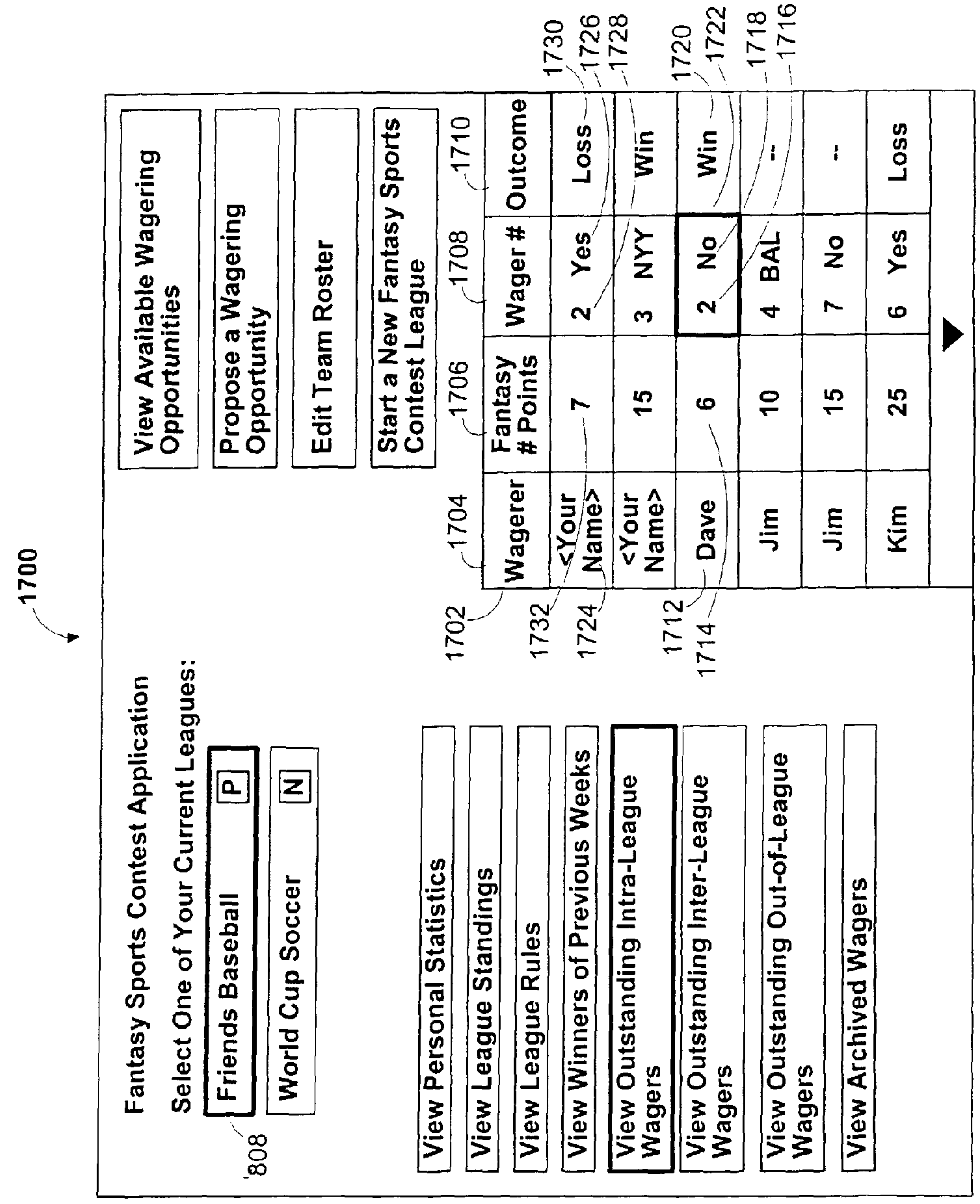
FIGS. 17-22 are illustrative fantasy sports contest application display screens showing outstanding intra-league wagers in accordance with various embodiments of the present invention.

In some embodiments of the present invention, the fantasy sports contest application may provide to a user the ability to view information for outstanding intra-league wagers (e.g., intra-league wagers for a current week, intra-league wagers that have not been paid, etc.). FIG. 17 shows an illustrative outstanding intra-league wager display screen 1700. Referring to both FIGS. 8 and 17, the fantasy sports contest application may display in display region 1702 a list of outstanding intra-league wagers in response to a user selection of option 834 to view outstanding intra-league wagers. Display region 1702 may include information that indicates to a user the terms of outstanding intra-league wagers. In this example, display region 1702 includes data for wagers between a fantasy sports contestant and the fantasy sports contest application system such as wagerer 1704, number of fantasy sports contest points wagered 1706, wager number 1708, and wager outcome 1710. For example, information in display region 1702 indicates that fantasy sports contestant "Dave" 1712 wagered 6 fantasy sports contest league points 1714 with the fantasy sports contest application system on wager number "2" 1716. Wager number "2" 1716 may be based on, for example, one or more contestants' performance in active fantasy sports contest league "Friends Baseball" 808 (FIG. 8). As another example, wager number "2" 1716 may be based on any event that can be wagered on for fantasy sports contest points (e.g., a sporting event that is related to active fantasy sports contest league "Friends Baseball" 808, an event that is unrelated to a fantasy sports contest league, etc.). Wager number 1716 is a "Yes" or "No" wagering opportunity to which wagerer 1712 chose "No" 1718. As indicated in display region 1702, wagerer 1712 won 1720 wager number 1716.

Figure 18:
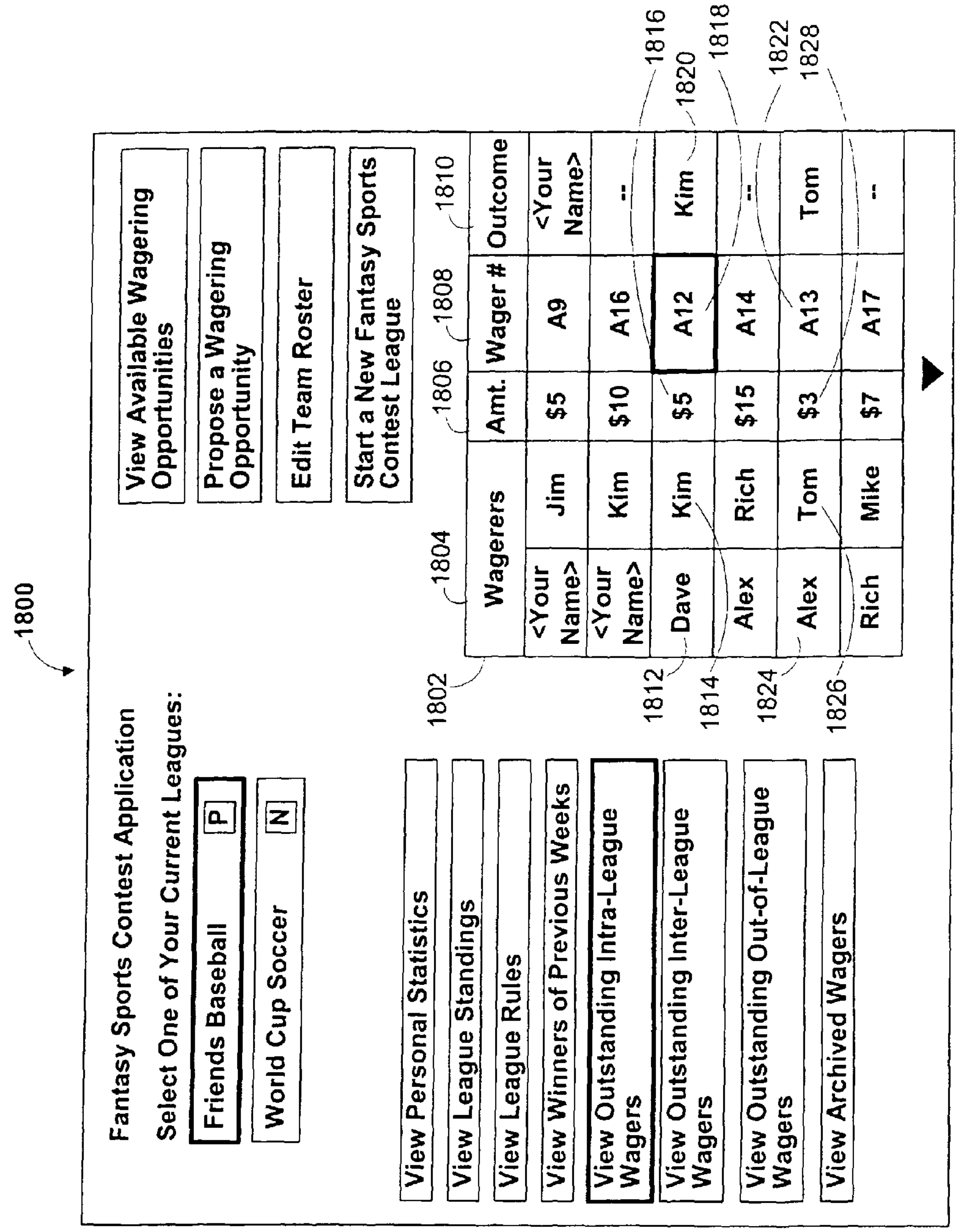

FIG. 18 shows another illustrative outstanding intra-league wager display screen 1800. Information in display region 1802 may indicate to a user the terms of outstanding intra-league wagers between fantasy sports contestants of the same fantasy sports contest league. Display region 1802 may include data such as, for example, wagerers 1804, amount wagered 1806, wager number 1808, and wager outcome 1810. For example, information in display region 1802 indicates fantasy sports contestants "Dave" 1812 and "Kim" 1814 wagered "$5" 1816 on wager number "A12" 1818. Wagerer 1814 won 1820 wager number "A12" 1818 and wagerer 1812 lost wager number "A12" 1818. Wager number "A12" 1818 may be based on, for example, one or more contestants' performance in active fantasy sports contest "Friends Baseball" 808 (FIG. 8). As another example, wager number "A12" 1818 may be based on any event that can be wagered on such as a sporting event that is related to active league "Friends Baseball" 808, a sporting event that is unrelated to the fantasy sports contest league, or any non-sports event that can be wagered on. In this example, display region 1802 displays information for wagers for money.

Figure 19:
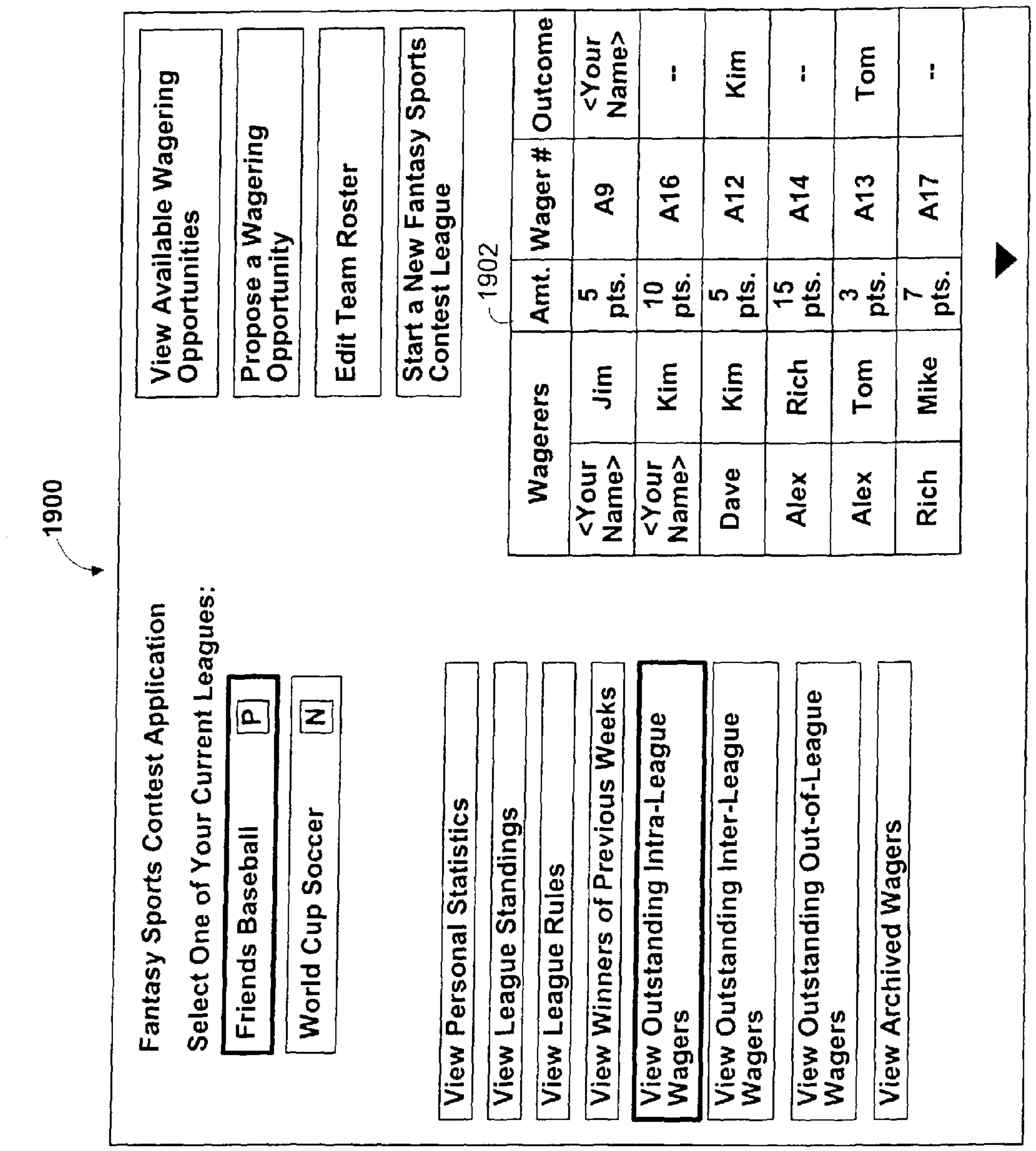

In other embodiments of the present invention, the fantasy sports contest application may display outstanding intra-league wager display screens that include information for wagers for non-cash prizes, fantasy sports contest points, or points redeemable for prizes. For example, FIG. 19 shows outstanding intra-league wager display screen 1900 that is similar to display screen 1800 (FIG. 18) except that display screen 1900 includes information for intra-league wagers for points 1902 (e.g., points redeemable for cash or non-cash prizes).

Figure 20:
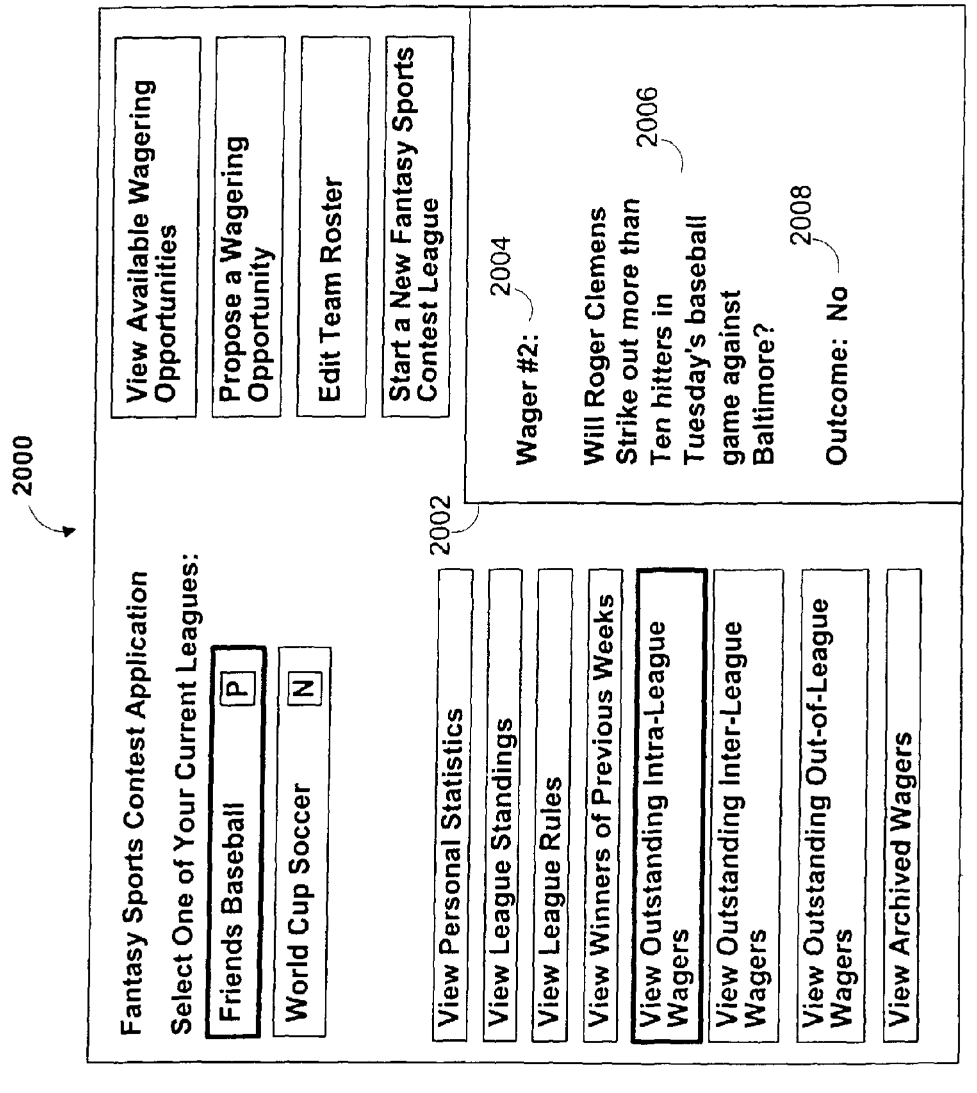

In some embodiments of the present invention, the fantasy sports contest application may provide to a user the ability to view information for particular outstanding intra-league wagers for fantasy sports contest points between a fantasy sports contestant and the fantasy sports contest application system. FIG. 20 shows an illustrative intra-league wager display screen 2000. Referring to both FIGS. 17 and 20, the fantasy sports contest application may display in display region 2002 information for wager number 1716 in response to a user selection of wager number 1716. A user may, for example, position highlight region 1722 on wager number 1716 and press a remote control "Enter" key (e.g., from remote control 318 (FIG. 3)) to select wager number 1716. Display region 2002 may include information for wager number 1716 such as, for example, wager number 2004, wager description 2006, and wager outcome 2006 (i.e., if the wager outcome is known). In this example, wager number (1716, 2004) is related to active fantasy sports contest league "Friends Baseball" 808 (FIG. 8), and based on the outcome of wager description 2006, "Will Roger Clemens strike out more than ten hitters in Tuesday's baseball game against Baltimore?". As indicated, the outcome of wager number (1716, 2004) is "No" 2008. Accordingly, because wagerer 1712 selected "No" 1718 to wager number 2 (1716, 2004), wagerer 1712 won 1718 wager number 2 (1716, 2004) for "6" fantasy sports contest league points 1714. Alternatively, because wagerer 1724 selected "Yes" 1726 to wager number (1728, 2004), wagerer 1724 lost 1730 wager number (1728, 2004) for "7" fantasy sports contest points 1732. Wager number 2004 may be a wager for the current week of active fantasy sports contest league "Friends Baseball" 808 (FIG. 8).

Figure 21:
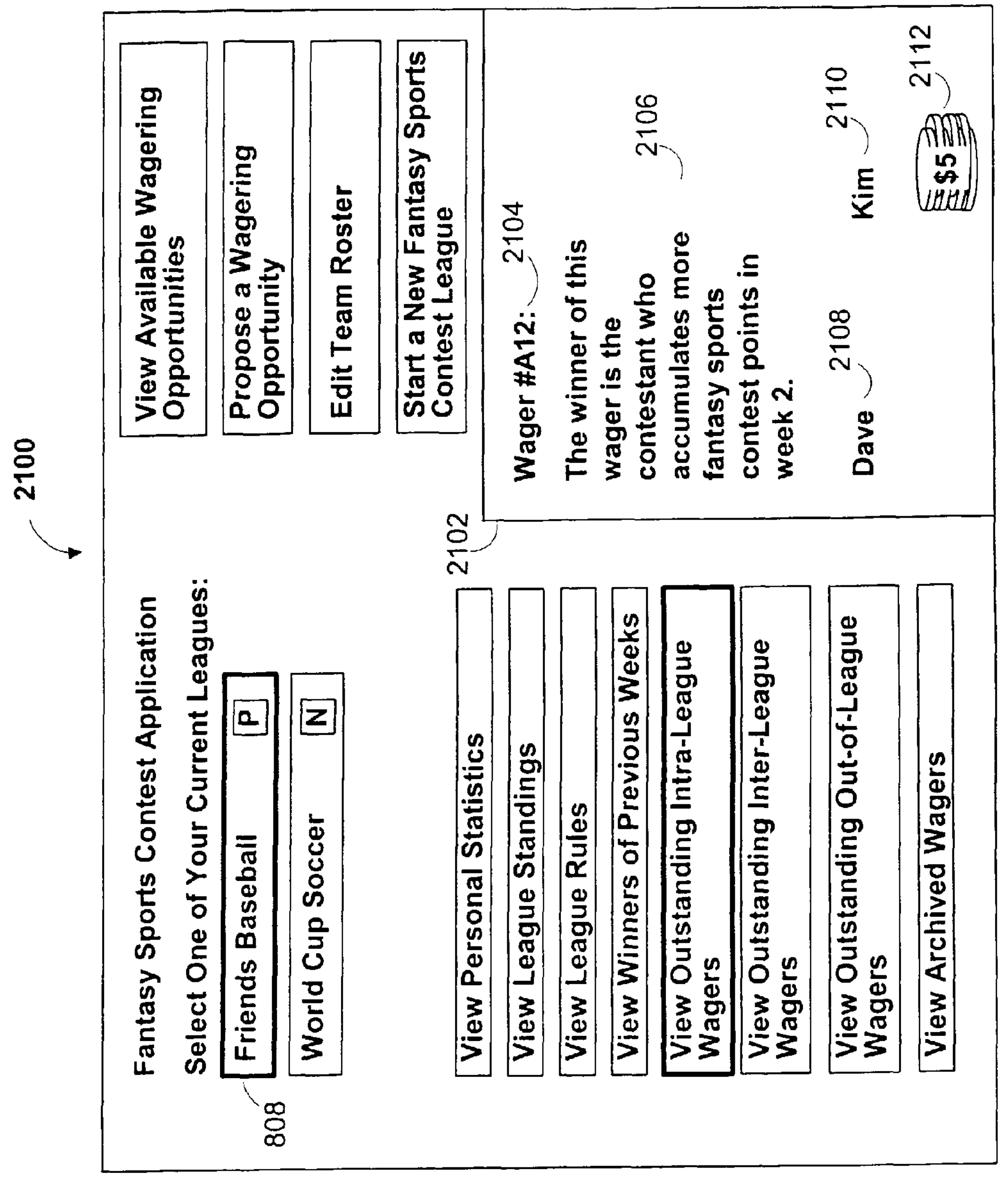

In some embodiments of the present invention, the fantasy sports contest application may provide to a user the ability to view information for particular outstanding intra-league wagers between fantasy sports contestants of the same fantasy sports contest league. FIG. 21 shows another illustrative intra-league wager display screen 2100. Referring to both FIGS. 18 and 21, the fantasy sports contest application may display in display region 2102 information for wager number "A12" 1818 in response to a user selection of wager number 1818. Display region 2102 may include information for wager number 1818 such as, for example, wager number 2104, wager description 2006, wagerers (2108, 2110), wagering terms (2112, 2114) and wager outcome and amount 2116 (i.e., if the wager outcome is known). In this example, wager number "A12" (1818, 2104) may be a wager related to active fantasy sports contest league "Friends Baseball" 808 (FIG. 8), and based on the outcome of wager description 2106, "The winner of this wager is the contestant who accumulates more fantasy sports contest points in week 2". Icon 2112 indicates that wagerer "Kim" (1814, 2110) won (i.e., by accumulating more fantasy sports contest points than contestant Dave (1812, 2108) wager number "A12" (1818, 2104) for "$5" (1816, 2112). Wager number "A12" (1818, 2104) may be displayed as an outstanding intra-league wager because contestant "Dave (1812, 2108) has not yet settled (e.g., paid) the wager with contestant "Kim" (1814, 2110).

Figure 22:
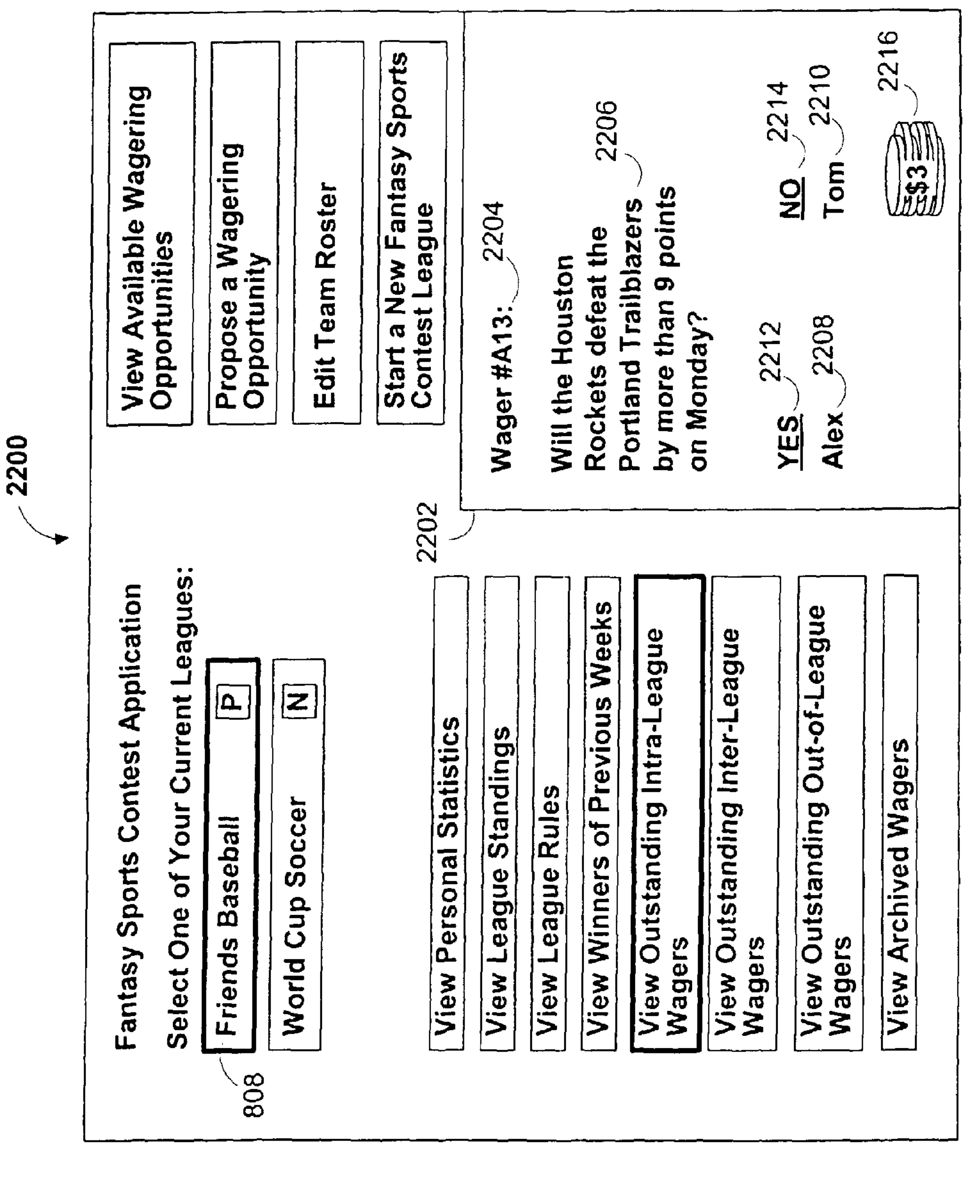

In some embodiments of the present invention, the fantasy sports contest application may provide to a user an opportunity to view information for intra-league wagers that are unrelated to fantasy sports contest leagues. FIG. 22 shows another illustrative intra-league wager display screen 2200. Referring to both FIGS. 18 and 22, the fantasy sports contest application may display in display region 2202 information for wager number "A13" 1822 in response to a user selection of wager number 1822. For example, display region 2202 may include information for wager number 1822 such as wager number 2204, wager description 2206, wagerers (2208, 2210), wagering terms (2212, 2214), and wager outcome and amount 2216. In this example, wager number "A13" (1822, 2204) is based on the outcome of wager description 2206, "Will the Houston Rockets defeat the Portland Trailblazers by more than 9 points on Monday?" which may be unrelated to active fantasy sports contest league "Friends Baseball" 808 (FIG. 8). Contestant "Alex" (1824, 2208) selected "YES" 2212 to wager number "A13" (1822, 2204) and contestant "Tom" (1826, 2210) selected "NO" 2214 to wager number "A13" (1822, 2204). Icon 2216 indicates wagerer "Tom" (1826, 2210) won wager number "A13" (1822, 2204) for "$3" (1828, 2216). In some embodiments of the present invention, wagering between members of fantasy sports contest leagues may be ancillary to a main fantasy competition (e.g., fantasy competition based on the performance of athletes in real-life athletic competition).

Figure 23:
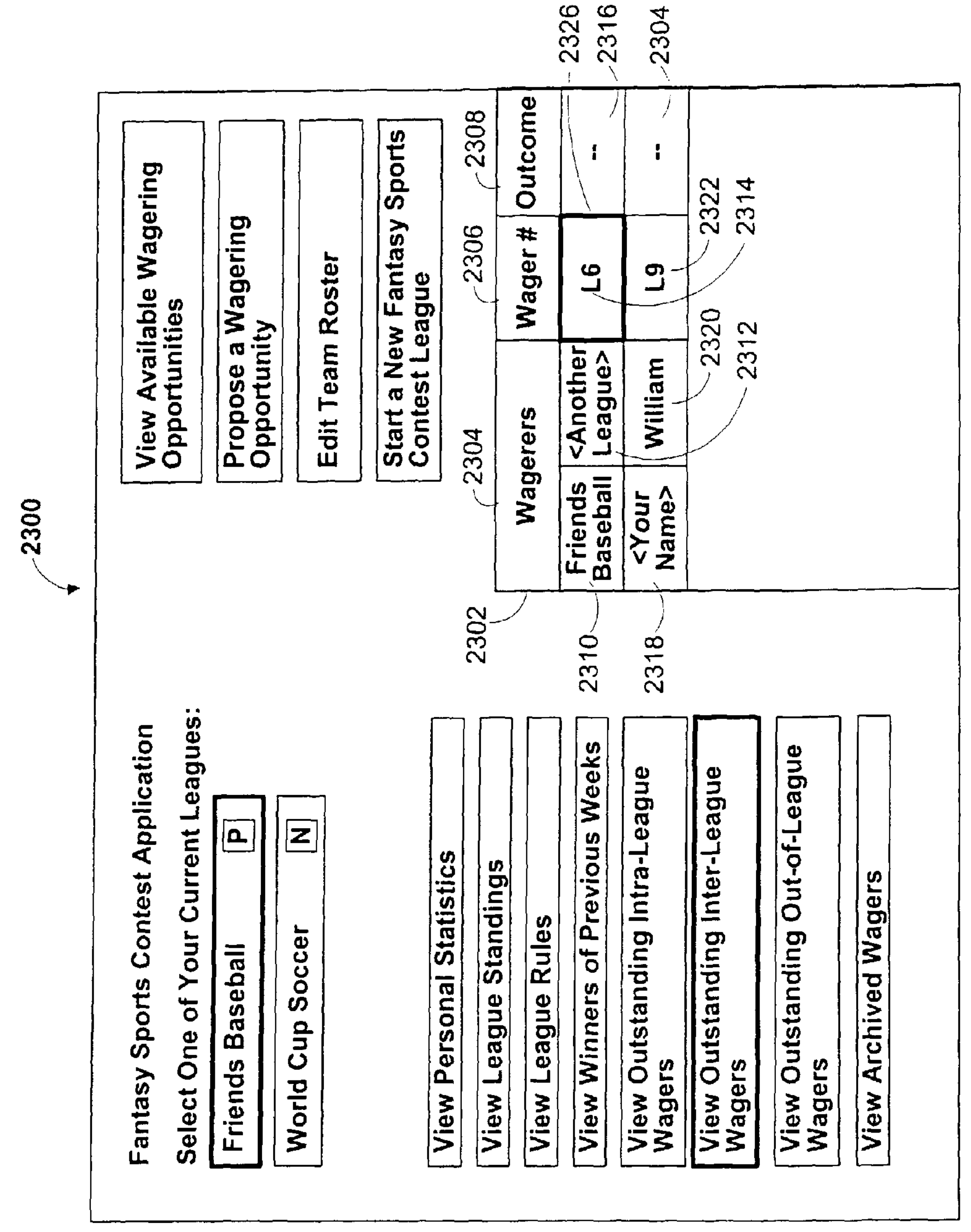
FIGS. 23-25 are illustrative fantasy sports contest application display screens showing outstanding inter-league wagers in accordance with various embodiments of the present invention.

In some embodiments of the present invention, the fantasy sports contest application may provide to a user the ability to view information for outstanding inter-league wagers (e.g., inter-league wagers for a current week, inter-league wagers that have not been paid, etc.). FIG. 23 shows an illustrative outstanding inter-league wager display screen 2300. Referring to both FIGS. 8 and 23, the fantasy sports contest application may display in display region 2302 a list of outstanding inter-league wagers in response to a user selection of option 836 to view outstanding inter-league wagers. In some embodiments of the present invention, display region 2302 may include data indicating the terms of inter-league wagers. In this example, display region 2302 includes information for wagers between different fantasy sports contest leagues or between members of different fantasy sports contest leagues such as wagerers 2304, wager number 2306, and wager outcome 2308. In particular, data in display region 2302 indicates that fantasy sports contest league "Friends Baseball" (808, 2310) wagered "<Another League>" 2312 on wager number "L6" 2314. Outcome 2316 of wager number "L6" 2310 is unknown. As another example, data in display region 2302 indicates that fantasy sports contestant "<Your Name>" 2318 wagered fantasy sports contestant "William" 2320 (i.e., a contestant of a different fantasy sports contest league) on wager number "L9" 2322. Outcome 2324 of wager number "L9" 2322 is also unknown. Wager numbers "L6" 2314 and "L9" 2322 may be based on, for example, one or more contestants' performance in a fantasy sports contest. As another example, wager numbers "L6" 2314 and "L9" 2322 may be based on any event that can be wagered on (e.g., a sporting event that is related to a fantasy sports contest league, an event that is unrelated to a fantasy sports contest league, etc.). Wager numbers "L6" 2314 and "L9" 2322 may be for, for example, money, fantasy sports contest points, prizes, or points redeemable for prizes.

Figure 24:
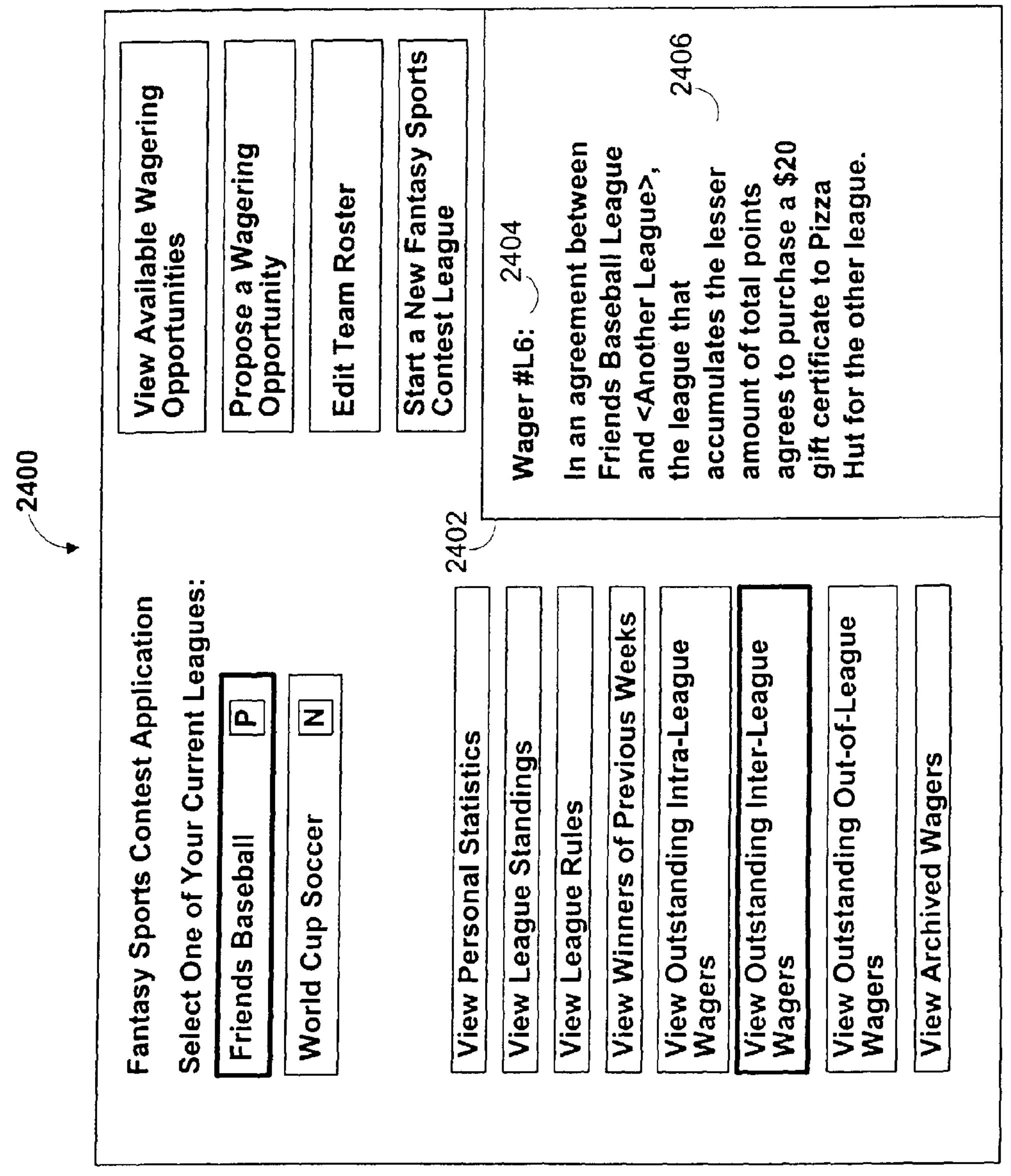

In some embodiments of the present invention, the fantasy sports contest application may provide to a user an opportunity to view information for particular outstanding inter-league wagers. For example, the fantasy sports contest application may display information for particular inter-league wagers between different fantasy sports contest leagues. FIG. 24 shows an illustrative inter-league wager display screen 2400. Referring to both FIGS. 23 and 24, the fantasy sports contest application may display in display region 2402 information for wager number "L6" 2314 in response to a user selection of wager number 2314 (e.g., a user positioning highlight region 2326 on wager number 2314 and selecting an "Enter" key of remote control 318 (FIG. 3)). For example, display region 2402 may include information for wager number 2314 such as wager number 2404 and wager terms 2406. In this example, wager terms 2406 indicate that wager number "L6" (2314, 2404) is a wager for a gift certificate between a first fantasy sports contest league 2310 and a second fantasy sports contest league 2312 and is based on which league accumulates the greater amount of fantasy sports contest points (e.g., by the conclusion of a fantasy sports contest of which both leagues are a sub-division). Wager number "L6" (2314, 2404) may be displayed as an outstanding inter-league wager because outcome 2316 (FIG. 23) has not yet been determined.

Figure 25:
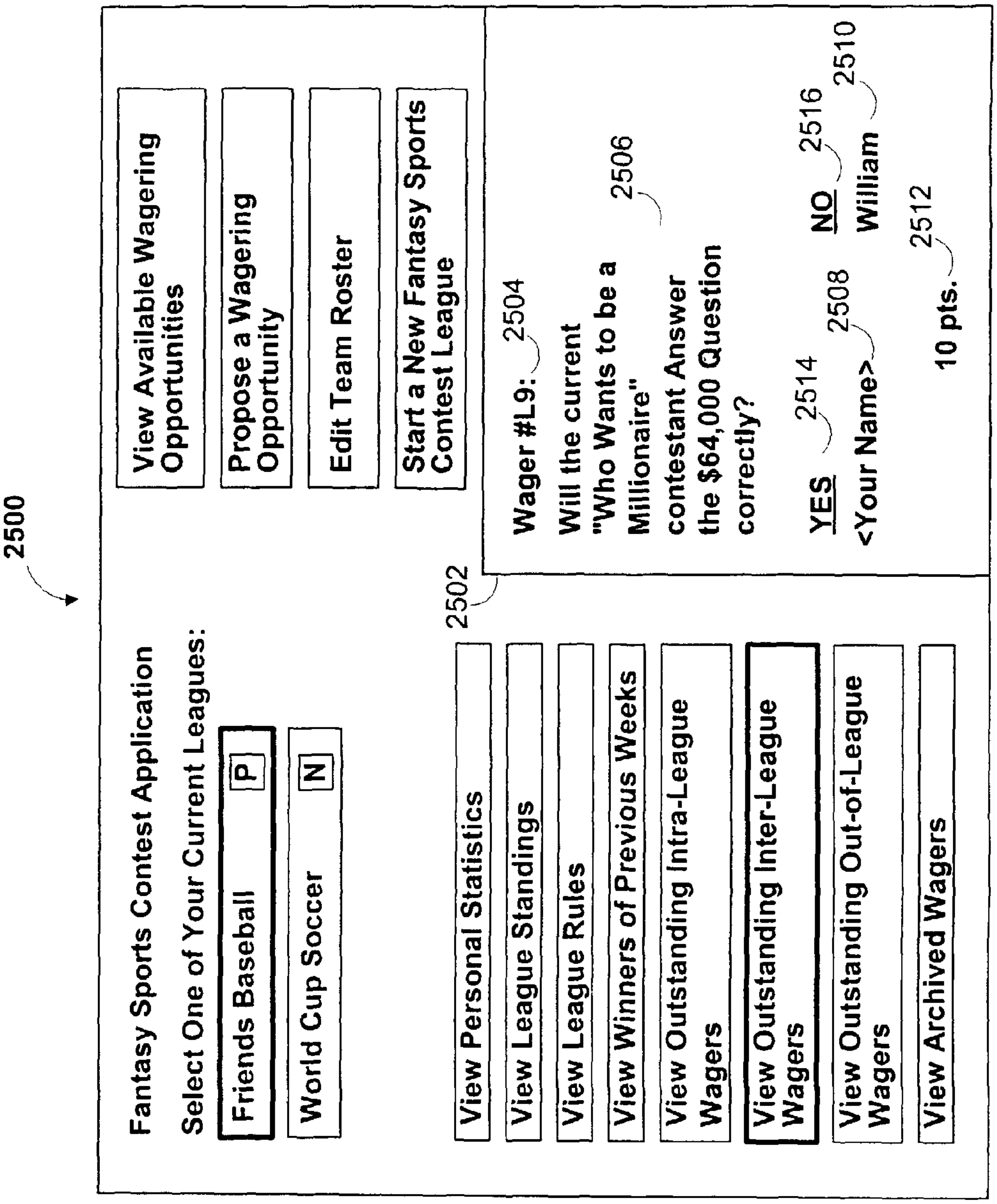

In some embodiments of the present invention, the fantasy sports contest application may provide to a user the ability to view information for particular outstanding inter-league wagers between members of different fantasy sports contest leagues. FIG. 25 shows an illustrative inter-league wager display screen 2500. Referring to both FIGS. 23 and 25, the fantasy sports contest application may display in display region 2502 information for wager number "L9" 2322 in response to a user selection of wager number "L9" 2322. For example, Display region 2502 may include information for wager number "L9" 2322 such as wager number 2504, wager description 2506, wagerers (2508, 2510), wager amount 2512, and other wager terms (2514, 2516). In this example, wager number "L9" (2322, 2504) is based on wager description 2506, "Will the current "Who Wants to Be a Millionaire" contestant answer the $64,000 question correctly?". Wager points 2512 may be, for example, fantasy sports contest points or points redeemable for prizes (e.g., from a website accessible to and affiliated with the fantasy sports contest application system and which is fed information by the fantasy sports contest application regarding a user's point total). Wager number "L9" (2322, 2504) may be displayed as an outstanding inter-league wagering opportunity because outcome 2304 (FIG. 23) has not yet been determined.

Figure 26:
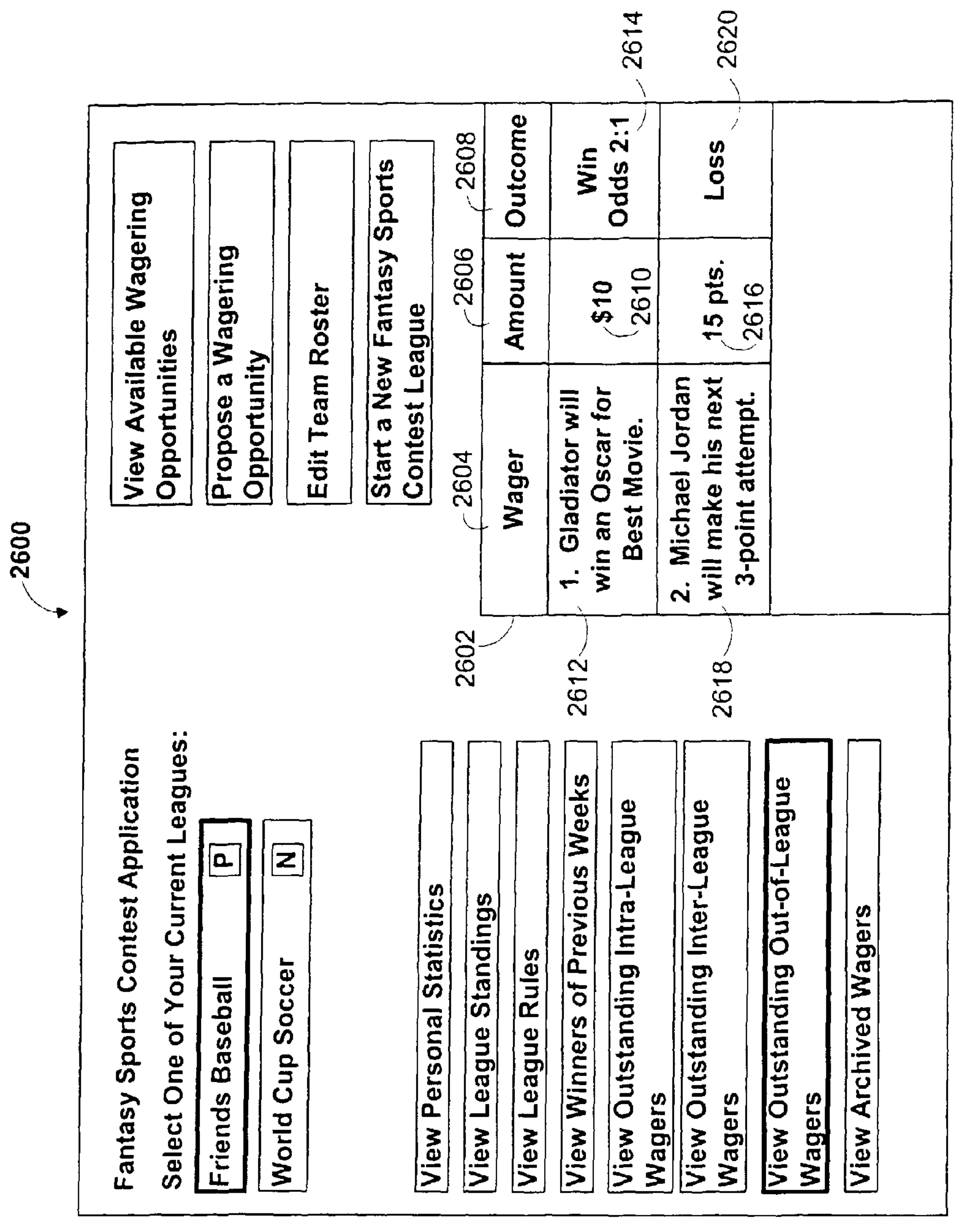
FIG. 26 is an illustrative fantasy sports contest application display screen showing outstanding out-of-league wagers in accordance with one embodiment of the present invention.

In some embodiments of the present invention, the fantasy sports contest application may provide to a user an opportunity to view information for outstanding out-of-league wagers (e.g., out-of-league wagers of a current week, out-of-league wagers for that have not yet been paid, etc.). FIG. 26 shows an illustrative outstanding out-of-league wagers display screen 2600. Referring to both FIGS. 8 and 26, the fantasy sports contest application may display in display region 2602 a list of outstanding out-of-league wagers in response to a user selection of option 838 to view outstanding out-of-league wagers. In some embodiments of the present invention, display region 2602 may include information that indicates to a user the terms of out-of-league wagers. For example, display region 2602 may include information for a user's out-of-league wagers (e.g., between the user and a wagering service) such as wager description 2604, wager amount 2606, and wager outcome 2608. In this example, display region 2602 includes information indicating that the user wagered "$10" 2610 that "'Gladiator' will win an Oscar for Best Movie." 2612. Information 2614 of display region 2602 indicates that the user won this wager with odds paying "2:1". The wager described by wager description 2612 may be, for example, a pari-mutuel wager in which the payout (i.e., the payout odds) was determined by the number and disposition of other wagerers (i.e., including at least one wagerer that is not a fantasy sports contestant). As another example, the payout of the wager described by wager description 2612 may have been predefined. Display region 2602 also includes information that indicates that the user wagered "15 pts." 2616 that "Michael Jordan will make his next 3-point attempt." 2618. Information 2620 of display region 2602 indicates that the user lost this wager. In this example, wager points 2616 may be, for example, points redeemable for prizes (e.g., sports apparel redeemable through a catalog or cash prizes).

In some embodiments of the present invention, the fantasy sports contest application may provide to a user an opportunity to view information for different types of outstanding wagers (e.g., outstanding intra-league wagers, outstanding inter-league wagers, and outstanding out-of-league wagers) in the same display screens. For example, the information for outstanding wagers of FIGS. 17-26 may be integrated into one or more fantasy sports contest application display screens.

In some embodiments of the present invention, the fantasy sports contest application may provide to a user an opportunity to view information for archived wagers (e.g., wagers not of the current week, wagers that have been paid, etc.). For example, the fantasy sports contest application may display a list of archived wagers including archived intra-league wagers, archived inter-league wagers, and archived out-of-league wagers in response to a user selection of option 840 to view archived wagers. The list of archived wagers may appear similar to the lists shown in FIGS. 17-19, 23 and 26. As another example, the fantasy sports contest application may display information for different types of archived wagers (e.g., archived intra-league wagers, archived inter-league wagers, and archived out-of-league wagers) separately.

In some embodiments of the present invention, the fantasy sports contest application may display wager numbers that indicate to a user different types of wagers (e.g., intra-league wagers, intra-league wagers between two contestants of the same fantasy sports contest league, inter-league wagers, inter-league wagers between members of different fantasy sports contest leagues, out-of-league wagers, etc.). For example, wager numbers for intra-league wagers between a contestant and the fantasy sports contest application system may include numerals only (e.g., intra-league wager number "2" 2004 (FIG. 20). As another example, wager numbers for intra-league wagers between two contestants of the same fantasy sports contest league may include a unique letter followed by numerals (e.g., intra-league wager number "A12" 2104 (FIG. 21)). Still another example, wager numbers for all inter-league wagers (e.g., wagers between different fantasy sports contest leagues and wagers between members of different fantasy sports contest leagues) may include a unique letter (e.g., different from other letters that may be used to identify other types of wagers) followed by numerals (e.g., inter-league wager numbers "L6" 2314 and "L9" 2322 (FIG. 23)). This may, for example, allow the fantasy sports contest application to simultaneously display information for different types of wagers without confusing a user. The fantasy sports contest application may differentiate different types of wagers using any other suitable method or combination of methods such as, for example, displaying each type of wager in a different color, font, font size, or region of a display screen or having a particular icon associated therewith.

Figure 27:
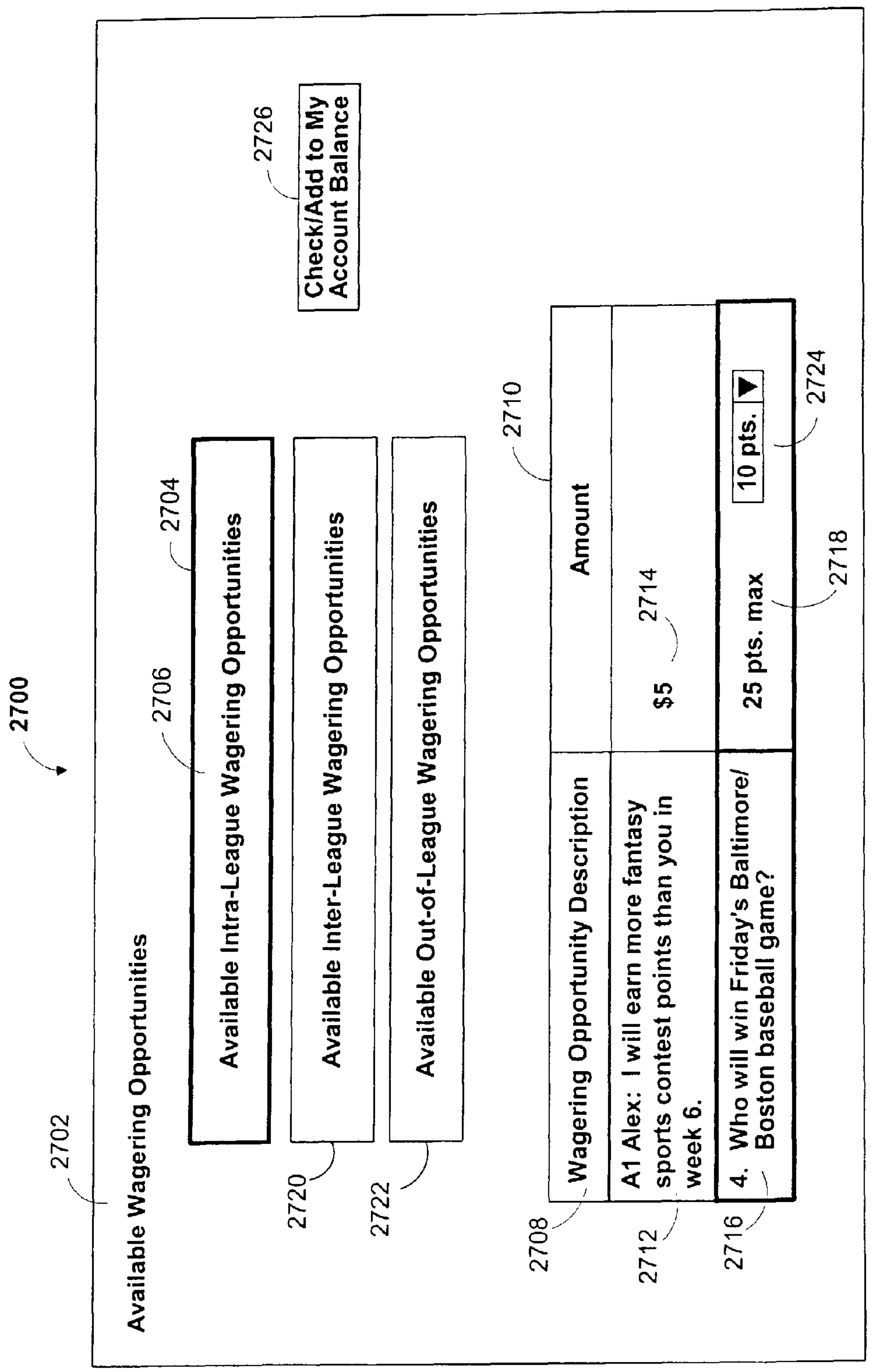
FIG. 27 is an illustrative fantasy sports contest application available intra-league wagering opportunities display screen in accordance with one embodiment of the present invention.

In some embodiments of the present invention, the fantasy sports contest application may provide to a user the ability to view information for wagering opportunities available to the user. FIG. 27 shows an illustrative available wagering opportunities display screen 2700. Referring to both FIGS. 8 and 27, the fantasy sports contest application may display information for available wagering opportunities 2702 in response to a user selection of option 842 to view available wagering opportunities. In this example, highlight region 2704 indicates that available intra-league wagering opportunities 2706 is the active wagering opportunity type (i.e., the wagering opportunity type for which wagering opportunities are displayed). Display screen 2700 may include information for intra-league wagering opportunities such as, for example, intra-league wagering opportunity description 2708 and intra-league wagering opportunity amount 2710. The fantasy sports contest application may accept a wager for a user for an active intra-league wagering opportunity (e.g., a wagering opportunity that is highlighted by a highlight region) in response to a user selection (e.g., a user selection of an "Enter" key of remote control 318 (FIG. 3)) of the active intra-league wagering opportunity.

In some embodiments of the present invention, the fantasy sports contest application may provide to a user the ability to view information for available intra-league wagers between fantasy sports contestants of the same fantasy sports contest league. For example, wagering opportunity description 2712 may indicate an opportunity to wager with contestant "Alex" (i.e., a contestant of one of the user's fantasy sports contest leagues) on "I will earn more fantasy sports contest points than you in week 6.". In particular, contestant "Alex" may be willing to wager that "Alex" will earn more fantasy sports contest points in week 6 of fantasy sports contest league "Friends Baseball" 808 (FIG. 8). In this example, the opportunity to wager described by wagering opportunity description 2712 may be based on a contestants' performance in a fantasy sports contest and in an amount of "$5" 2714. In other examples, the fantasy sports contest application may provide to a user an opportunity to view information for wagering opportunities based events related or unrelated to the contestants' fantasy sports contest league. Also in other examples, the fantasy sports contest application may provide to a user the ability to view information for wagering opportunities for, for example, prizes, fantasy sports contest points, or points redeemable for prizes.

In some embodiments of the present invention, the fantasy sports contest application may provide to a user the ability to view information for intra-league wagering opportunities for fantasy sports contest points between a fantasy sports contestant and the fantasy sports contest application system. For example, wagering opportunity description 2716 may indicate an opportunity to wager with the fantasy sports contest application system on "Who will win Friday's Baltimore/Boston baseball game?". In this example, the wagering opportunity described by wagering opportunity description 2716 may be based on an event related to one of the contestant's fantasy sports contest league (e.g., league 808 (FIG. 8)). In other examples, the fantasy sports contest application may provide to a user an opportunity to view information for intra-league wagering opportunities between a fantasy sports contestant and the fantasy sports contest application system that are based on events unrelated to a contestant's fantasy sports contest league. Wagering opportunity amount 2718 may indicate that the opportunity to wager described by wagering opportunity description 2716 is an opportunity to wager for a maximum amount of 25 fantasy sports contest points 2718.

Figure 28:
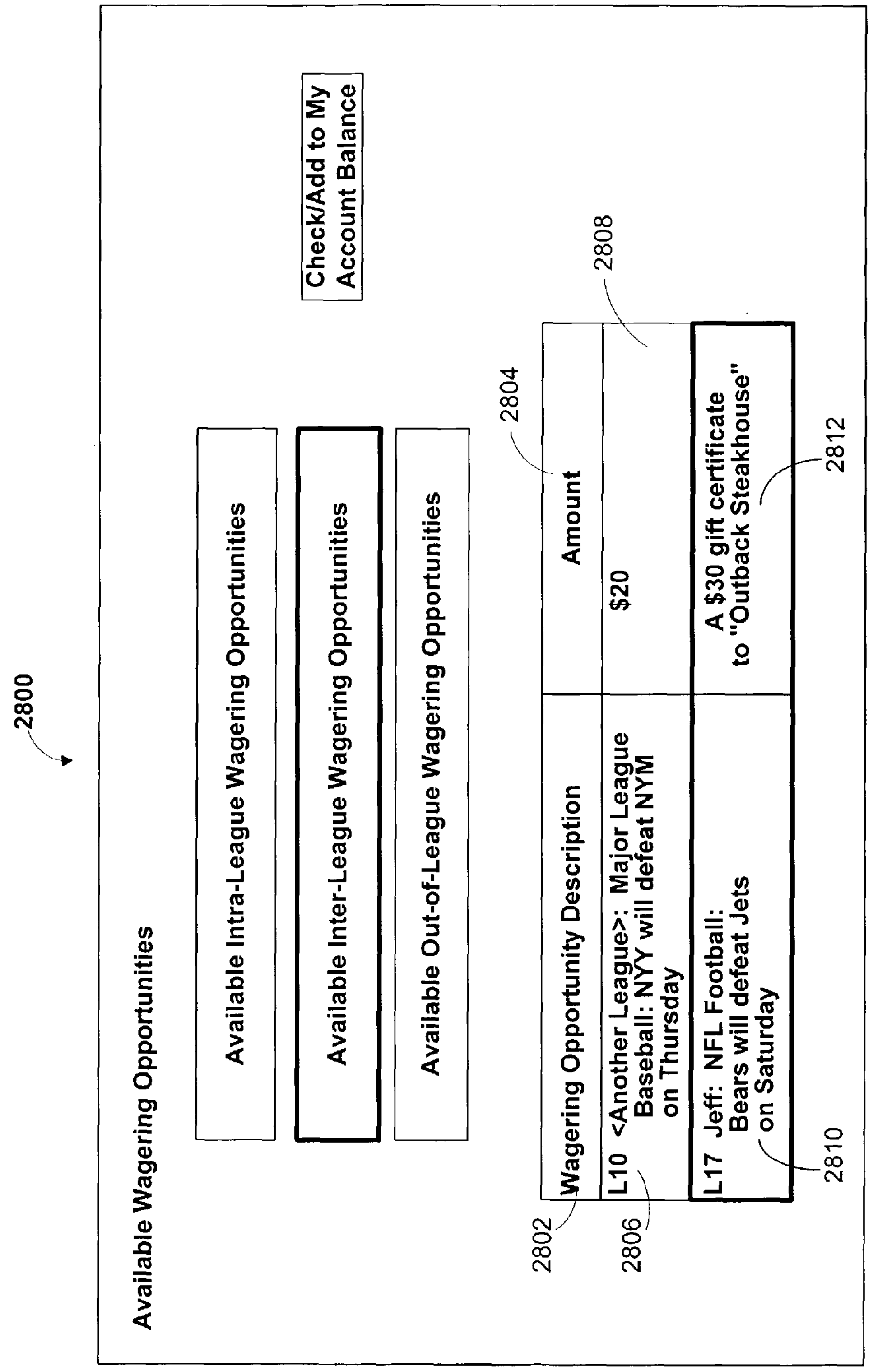
FIG. 28 is an illustrative fantasy sports contest application available inter-league wagering opportunities display screen in accordance with one embodiment of the present invention.

In some embodiments of the present invention, the fantasy sports contest application may provide to a user the ability to view information for available inter-league wagering opportunities. FIG. 28 shows an illustrative available inter-league wagering opportunities display screen 2800. Referring to both FIGS. 27 and 28, the fantasy sports contest application may display information for available inter-league wagering opportunities in display screen 2800 in response to a user selection of option 2720 to view available inter-league wagers (e.g., or by default in response to a user selection of option 842 (FIG. 8) to view available wagering opportunities). For example, display screen 2800 may include information for inter-league wagering opportunities such as inter-league wagering opportunity description 2802 and inter-league wagering opportunity amount 2804. The fantasy sports contest application may accept a wager for a user for an active inter-league wagering opportunity (e.g., an inter-league wagering opportunity that is highlighted by a highlight region) in response to a user selection of the active inter-league wagering opportunity.

In some embodiments of the present invention, the fantasy sports contest application may provide to a user the ability to view information for inter-league wagering opportunities between different fantasy sports contest leagues. For example, wagering opportunity description 2806 may indicate an opportunity to wager with fantasy sports contest league "<Another League>" on "Major League Baseball: NYY will defeat NYM on Thursday." Wagering opportunity description 2806 may indicate an opportunity to wager for wagering opportunity amount "$20" 2808. In this example, the wagering opportunity described by wagering opportunity description 2806 may be based on an event related to one of the user's fantasy sports contest leagues (e.g., active league 808 (FIG. 8)) and for money. In other examples, the fantasy sports contest application may provide to a user an opportunity to view information for inter-league wagering opportunities (e.g., between different fantasy sports contest leagues or contestants of different fantasy sports contest leagues) that are based on events unrelated to contestants' fantasy sports contest leagues. Also in other examples, the fantasy sports contest application may provide to a user an opportunity to view information for inter-league wagering opportunities between fantasy sports contest leagues for prizes, fantasy sports contest points, or points redeemable for prizes.

In some embodiments of the present invention, the fantasy sports contest application may provide to a user an opportunity to view information for inter-league wagering opportunities between contestants of different fantasy sports contest leagues. For example, wagering opportunity description 2810 may indicate an opportunity to wager with fantasy sports contestant "Jeff" (i.e., a contestant of a different fantasy sports contest league) on "NFL Football: Bears will defeat Jets on Saturday." Wagering opportunity description 2810 may indicate an opportunity to wager for wagering opportunity amount "A $30 dollar gift certificate to "Outback Steakhouse"" 2812. In this example, wagering opportunity description 2810 may describe an opportunity to wager based on an event unrelated to one of the user's fantasy sports contest leagues (e.g., league 808 (FIG. 8)) and for a prize. In other examples, the fantasy sports contest application may provide to a user an opportunity to view information for inter-league wagering opportunities between fantasy sports contestants for events related to one of a user's fantasy sports contest leagues. Also in other examples, the fantasy sports contest application may provide to a user the ability to view information for inter-league wagering opportunities between fantasy sports contestants of different fantasy sports contest leagues for money, fantasy sports contest points, or points redeemable for prizes.

Figure 29:
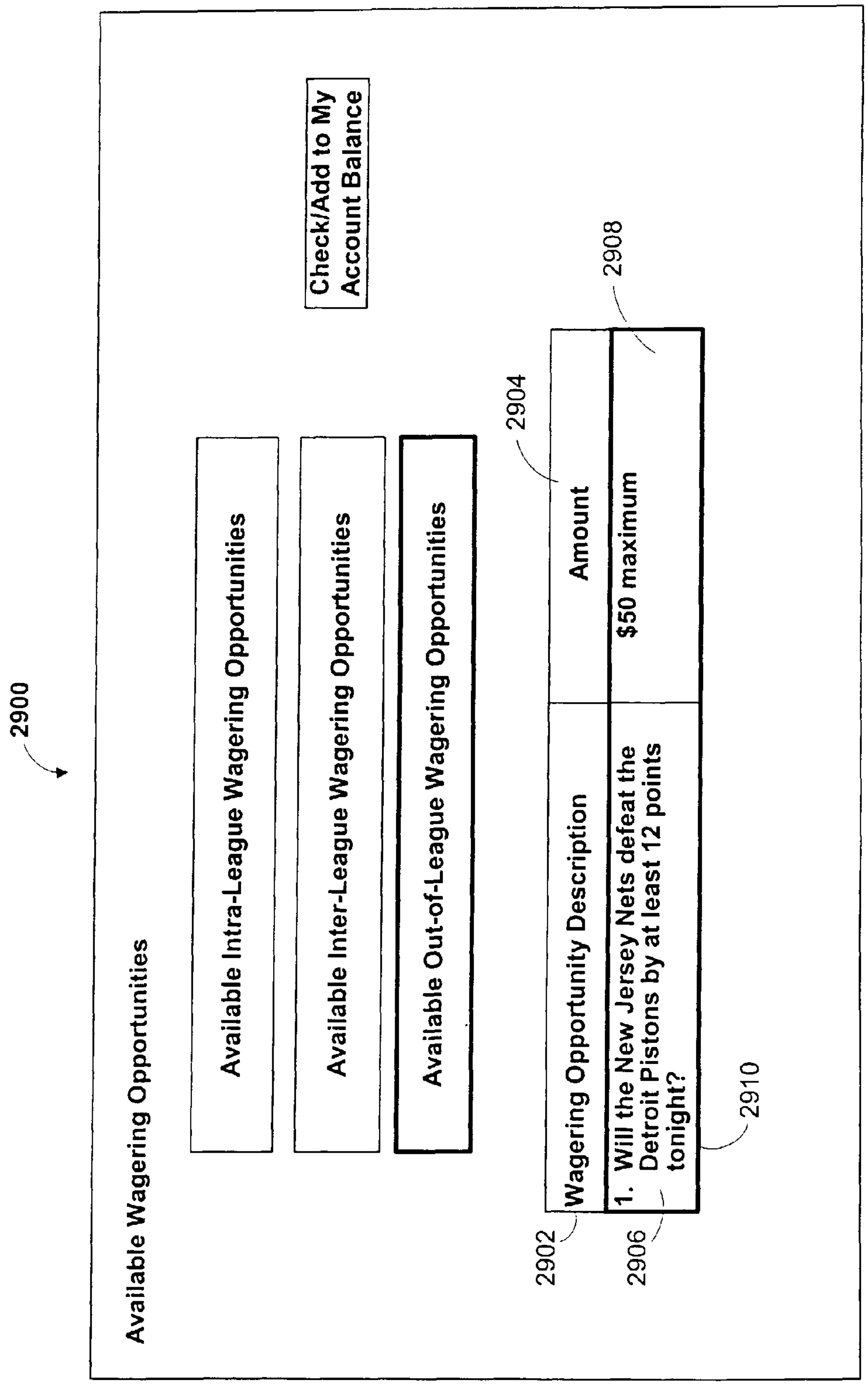
FIG. 29 is an illustrative fantasy sports contest application available out-of-league wagering opportunities display screen in accordance with one embodiment of the present invention.

In some embodiments of the present invention, the fantasy sports contest application may provide to a user the ability to view information for available out-of-league wagering opportunities. FIG. 29 shows an illustrative available out-of-league wagering opportunities display screen 2900. Referring to both FIGS. 27 and 29, the fantasy sports contest application may display information for available out-of-league wagering opportunities in display screen 2900 in response to a user selection of option 2722 to view available out-of-league wagering opportunities. For example, display screen 2900 may include information for out-of-league wagering opportunities such as out-of-league wagering opportunity description 2902 and out-of-league wagering opportunity amount 2904. For example, wagering opportunity description 2906 may indicate an opportunity to wager on "Will the New Jersey Nets defeat the Detroit Pistons by at least 12 points tonight?". Wagering opportunity amount 2908 may indicate that the opportunity to wager is for a "$50 maximum" (e.g., a maximum out-of-league wager amount rule set by a user in edit league rules display screen 1100 (FIG. 11), a maximum out-of-league wager imposed by the fantasy sports contest application based on a user's account balance, etc.). The fantasy sports contest application may provide to the user the ability to select a wager amount (e.g., up to "$50 maximum" 2908) in response to a user selection of the wagering opportunity (e.g., positioning highlight region 2910 and pressing an "Enter" key on remote control 318 (FIG. 3)). The wagering opportunity described by wagering opportunity description 2906 may be, for example, an opportunity to wager for money based on defined wagering odds (e.g., 2:1 payout). Wagering opportunity description 2906 may indicate that a point spread is required to be met for a wagerer to win the wager. In other examples, the fantasy sports contest application may provide to a user the ability to view information for out-of-league wagering opportunities for, for example, non-cash prizes or points redeemable for prizes. The fantasy sports contest application may accept an out-of-league wager for a user in response to a user selection of an out-of-league wagering opportunity.

Figure 30:
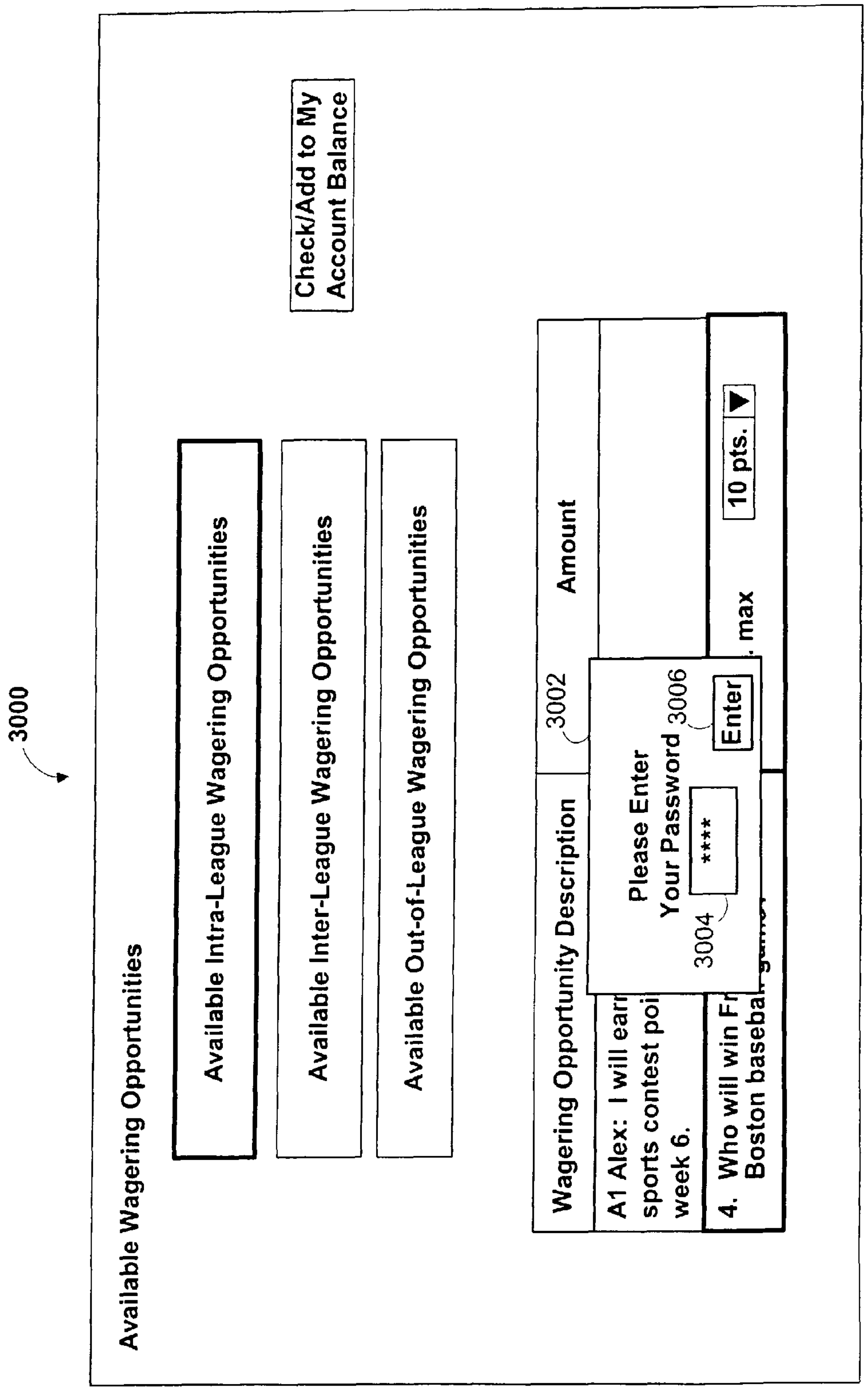
FIG. 30 is an illustrative fantasy sports contest application wagering password entry display screen in accordance with one embodiment of the present invention.

In some embodiments of the present invention, a user may be required to enter a password to wager. FIG. 30 shows an illustrative password entry overlay display screen 3000. Referring to both FIGS. 27 and 30, the fantasy sports contest application may display password entry overlay 3002 in response to a user selection of a wagering opportunity (e.g., the wagering opportunity described by wagering opportunity description 2716 and amount 2724). A user may be required to enter a valid password (e.g., the password of data regions 506 and 508 (FIG. 5)) into data region 3004 and select "Enter" option 3006 to wager.

Figure 31:
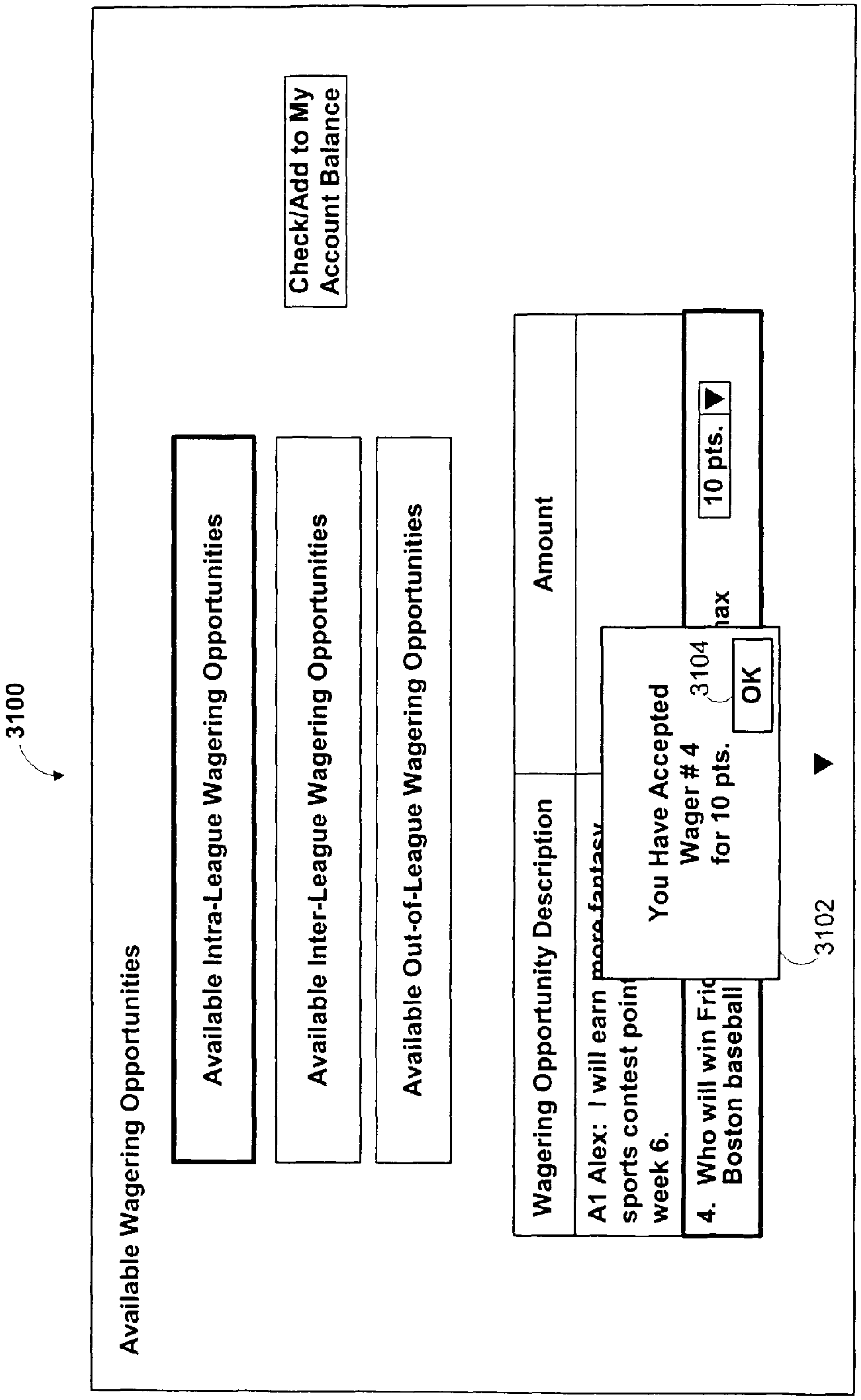
FIG. 31 is an illustrative fantasy sports contest application wager confirmation display screen in accordance with one embodiment of the present invention.

In some embodiments of the present invention, the fantasy sports contest application may display information that confirms valid wagers. FIG. 31 shows an illustrative wager confirmation overlay display screen 3100. Referring to both FIGS. 30 and 31, the fantasy sports contest application may display wager confirmation overlay 3102 in response to a user entry of a valid password into data region 3004 and a user selection of "Enter" option 3006. In this example, overlay 3102 indicates that the user has successfully accepted the wagering opportunity described by wagering opportunity description 2716 (FIG. 27) for 10 points (i.e., selected by the user using the pull-down menu associated with wagering opportunity amount 2724 (FIG. 27)). Overlay 3102 may be removed in response to a user selection of "OK" option 3104.

In some embodiments of the present invention, the fantasy sports contest application may provide to a user the ability to view information for different types of available wagering opportunities (e.g., intra-league wagering opportunities, inter-league wagering opportunities, and out-of-league wagering opportunities) in the same display screens. For example, the fantasy sports contest application may display the wagering opportunities of FIGS. 27-29 in the same display screen in response to a user selection of option 842 to view available wagering opportunities. In some embodiments of the present invention, the fantasy sports contest application may display information that allows a user to easily recognize different types of wagering opportunities (e.g., by displaying information for each type of wagering opportunity in a different color, by displaying unique wager numbers for each different type of wagering opportunity, by associating a different icon with each type of wagering opportunity, etc.).

Figure 32:
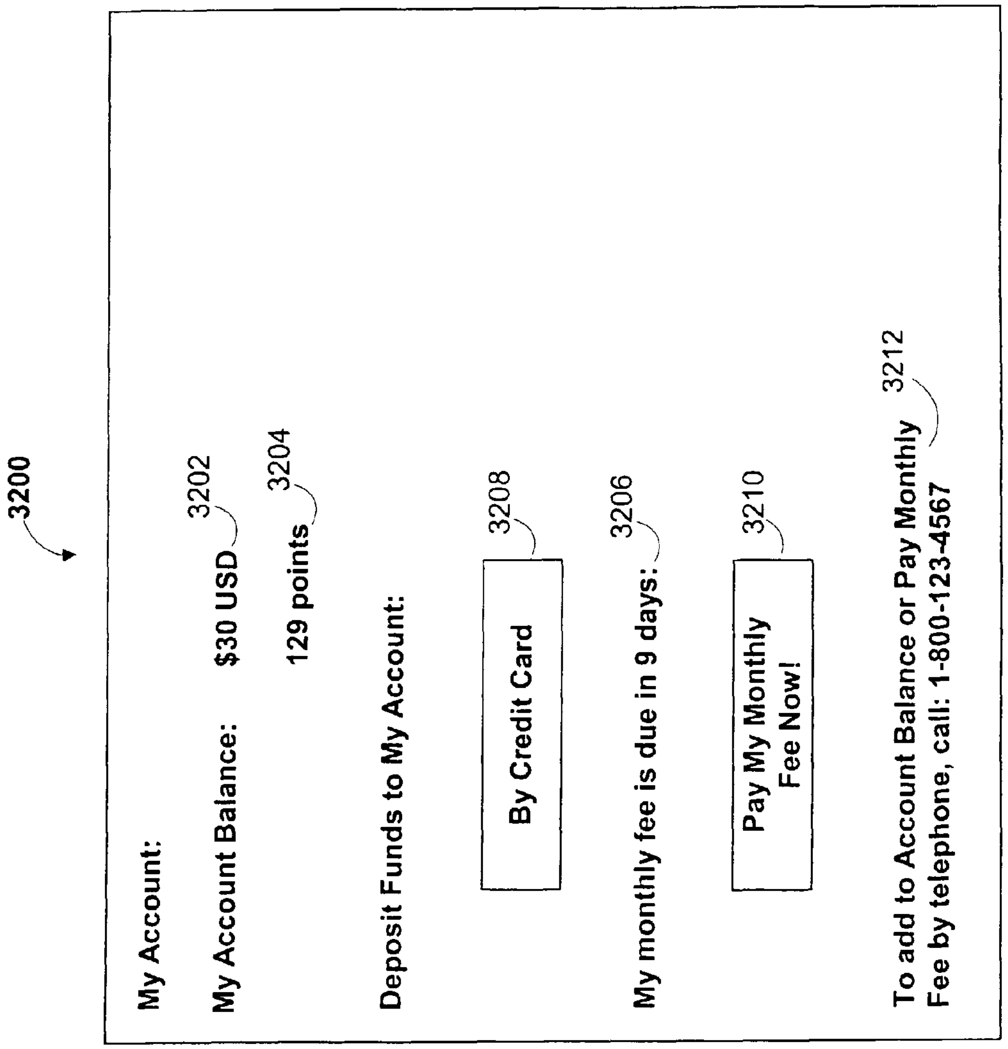
FIG. 32 is an illustrative fantasy sports contest application user account information display screen in accordance with one embodiment of the present invention.

In some embodiments of the present invention, the fantasy sports contest application may provide to a user the ability to view information for a particular user's account. FIG. 32 shows an illustrative user account display screen 3200. Referring to both FIGS. 27 and 32, the fantasy sports contest application may display information for a particular user's account in display screen 3200 in response to a user selection of option 2726 to "Check/Add to My Account Balance." For example, display screen 3200 may include information for a particular user's account such as a user's account balance in money 3202, a user's account balance in points 3204, and a date which a user's monthly fee (e.g., a monthly fee for participation in fantasy sports contest leagues, wagering opportunities, or both) is due 3206. Account balance 3202 may indicate the monetary funds available to a user to, for example, wager, participate in fantasy sports contest leagues, and pay monthly fees due. Account balance 3204 may indicate the number of points a user has available to, for example, wager or redeem prizes (i.e., if the points are redeemable for prizes). Display screen 3200 may include option 3208 to deposit funds to the user's account by credit card. In response to a user selection of option 3208, the fantasy sports contest application may display appropriate data regions for a user to enter credit card information (e.g., credit card number, expiration date, etc.) and a desired amount of funds to be added. Display screen 3200 may include option 3210 to pay a user's monthly fee (e.g., by credit card). Display screen 3200 may also include information for other methods of adding funds to a user's account or paying fees such as, for example, by telephone using telephone number 3212.

Figure 33:
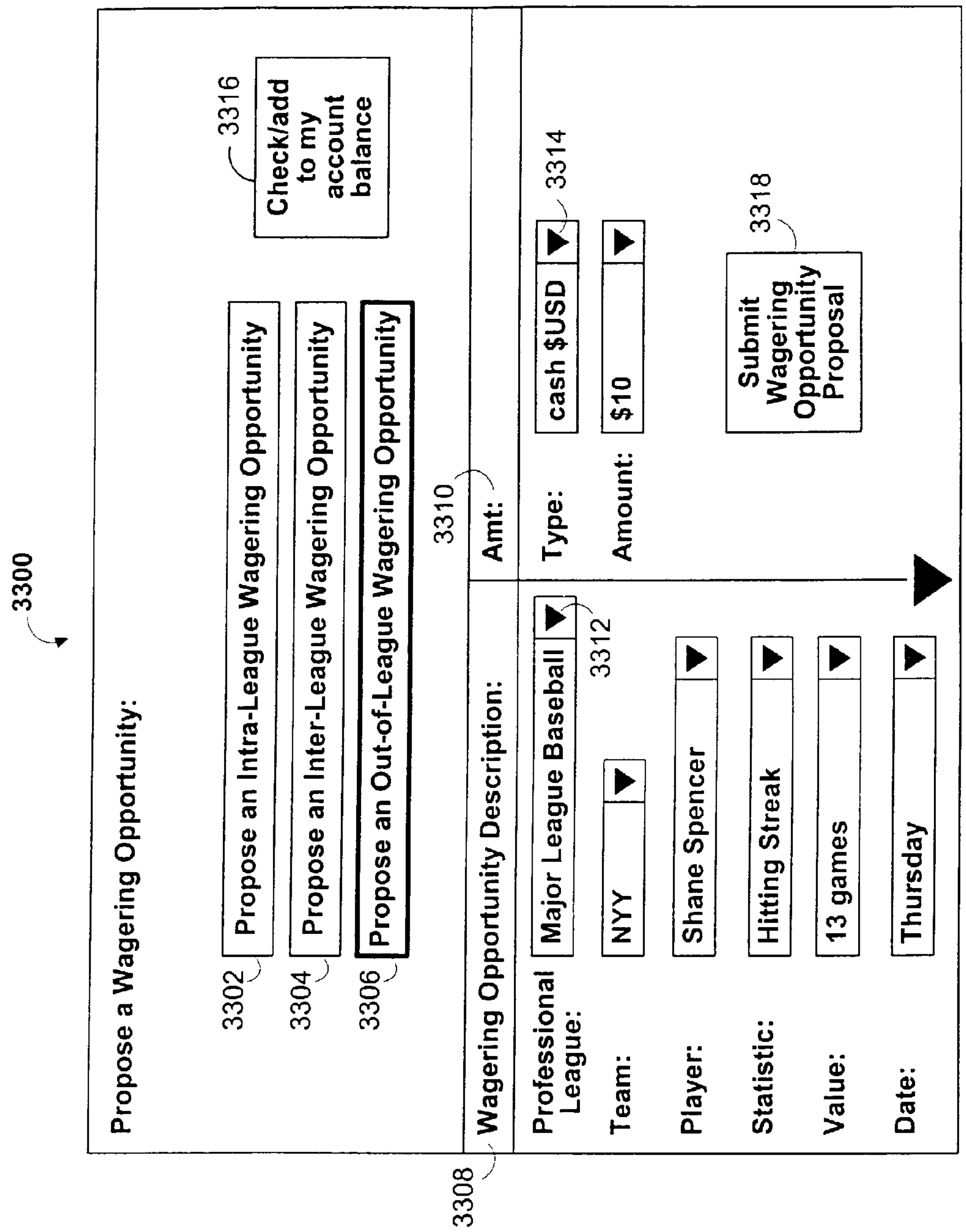
FIG. 33 is an illustrative fantasy sports contest application out-of-league wagering opportunity proposal display screen in accordance with one embodiment of the present invention.

In some embodiments of the present invention, the fantasy sports contest application may provide to a user the ability to propose a wagering opportunity. FIG. 33 shows an illustrative wagering opportunity proposal display screen 3300. Referring to both FIGS. 8 and 33, the fantasy sports contest application may display display screen 3300 in response to a user selection of option 844 to propose a wagering opportunity. A user may be provided with the ability to propose wagering opportunities for, for example, intra-league wagers (e.g., in response to a user selection of option 3302 or by default in response to a user selection of option 844), inter-league wagers (e.g., in response to a user selection of option 3304), and out-of league wagers (e.g., in response to a user selection of option 3306). In this example, the user may provided with the ability to define a wagering opportunity description 3308 and amount 3310 for an out-of-league wagering opportunity. The fantasy sports contest application may display, for example, numerous pull-down menus such as pull down menus 3312 and 3314 from which a user can select various wagering terms (e.g., wager description and wager amount). Display screen 3300 may include option 3316 to "Check/Add to My Account Balance" to allow a user to view the user's account information (e.g., to determine whether to propose a wager). The fantasy sports contest application may determine whether a wagering opportunity proposal is valid (e.g., whether a wagering opportunity proposal is in accordance with wager rules of, for example, rules display screen 1000 (FIG. 10) or wager laws governing a users particular geographical region) in response to a user selection of option 3318 to submit a wagering opportunity proposal. In some embodiments of the present invention, the fantasy sports contest application may display to a user only valid wagering opportunity proposal options and selectable features such that a user's wagering opportunity proposal is always valid (e.g., not displaying options to propose a wagering opportunity for money in geographical regions in which wagering for money is illegal). In some embodiments of the present invention, a user may be required to enter a valid password to propose a wagering opportunity (e.g., in a password entry overlay similar to password entry overlay 3002 (FIG. 30)).

Figure 34:
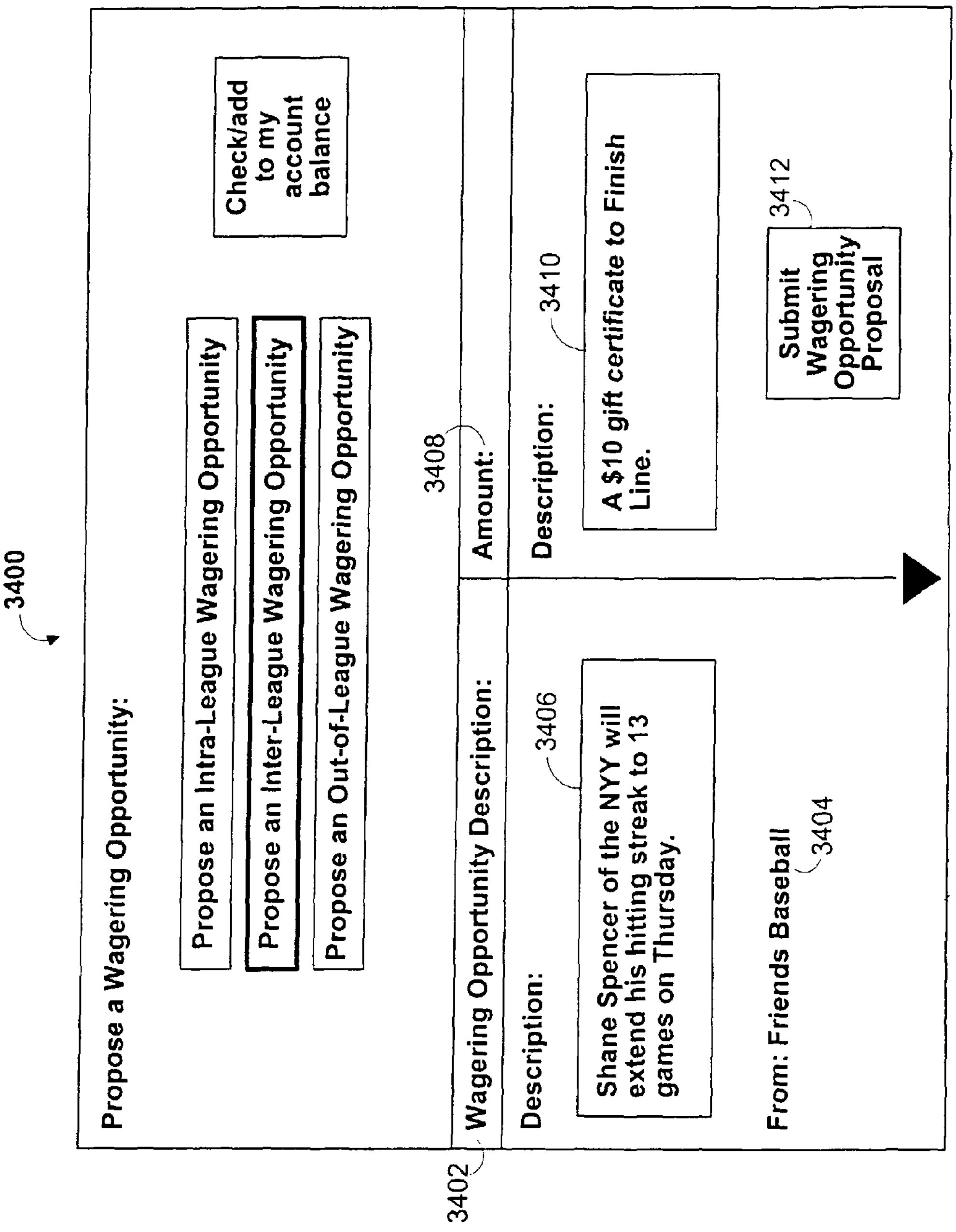
FIG. 34 is an illustrative fantasy sports contest application inter-league wagering opportunity proposal display screen in accordance with one embodiment of the present invention.
Figure 35:
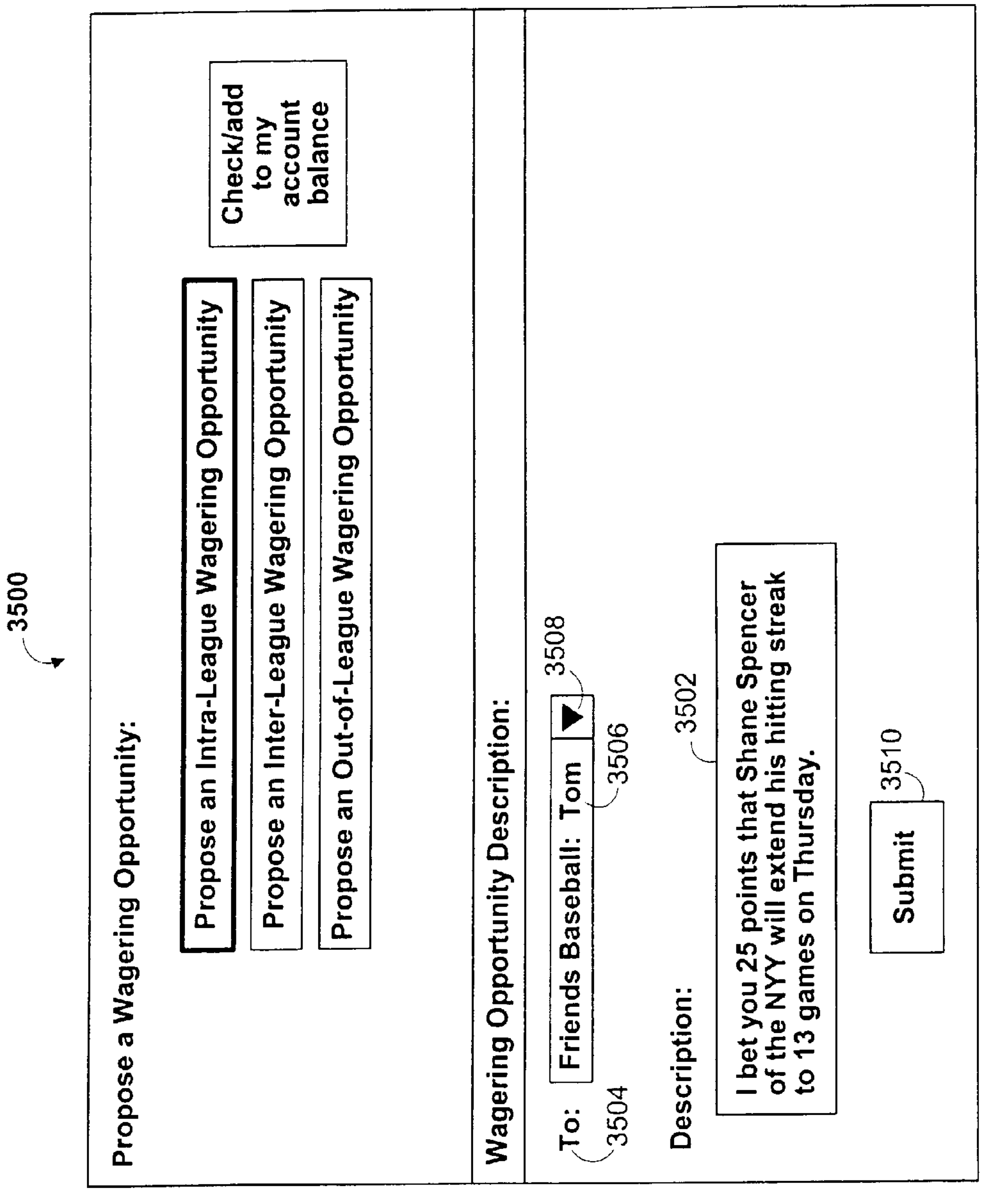
FIG. 35 is an illustrative fantasy sports contest application intra-league wagering opportunity proposal display screen in accordance with one embodiment of the present invention.

The fantasy sports contest application may provide to a user the ability to propose a wagering opportunity using any suitable approach. For example, FIG. 34 shows another illustrative wager opportunity proposal display screen 3400. The fantasy sports contest application may provide to a user the ability to define wagering opportunity description 3402 for a wagering opportunity (e.g., an inter-league wagering opportunity from "Friends Baseball" league 3404 in the example of FIG. 34) in data region 3406 and wagering opportunity amount 3408 in data region 3410 (e.g., using remote control 318 (FIG. 3), using a computer keyboard, etc.). In response to a user selection of option 3412 to submit a wagering opportunity proposal, the fantasy sports contest application may determine, for example, whether the user is permitted to participate in inter-league wagering (e.g., based on laws governing a user's particular geographical region), whether the user (or user's league) has exceeded a limit for inter-league wagering for the week or season, or whether the user has entered a valid wagering amount 3410 (e.g., for prizes, money, points, etc.). FIG. 35 shows still another illustrative wagering opportunity proposal display screen 3500. The fantasy sports contest application may provide to a user the ability to define wagering opportunity terms for a wagering opportunity (e.g., an intra-league wagering opportunity) such as wagering opportunity description and amount in data region 3502 (e.g., using remote control 318 (FIG. 3), using a computer keyboard, etc.). The fantasy sports contest application may also provide to a user the ability to define to whom the wagering opportunity is directed 3504 (e.g., which fantasy sports contest league, which fantasy sports contestant, which wagering service, etc.). In this example, a user may be permitted to select at least one member (e.g., "Tom" 3506) of fantasy sports contest league "Friends Baseball" 808 (FIG. 8) using pull-down menu 3508. Information for the wagering opportunity directed to contestant 3506 may be displayed for contestant 3506 in, for example, an available wagering opportunities display screen (e.g., wagering opportunities display screen 2700 (FIG. 27)), an overlay, or an email (in systems in which the fantasy sports contest application communicates data via the Internet). In response to a user selection of option 3510 to submit a wagering opportunity proposal, the fantasy sports contest application may determine, for example, whether the user submitting the proposal is permitted to participate in wagering (e.g., intra-league wagering), whether the user receiving the proposal is permitted to participate in wagering, or whether the user has exceeded a limit for wagering for the week or season (e.g., as indicated by rules of rules display screen 1000 (FIG. 10)).

Figure 36:
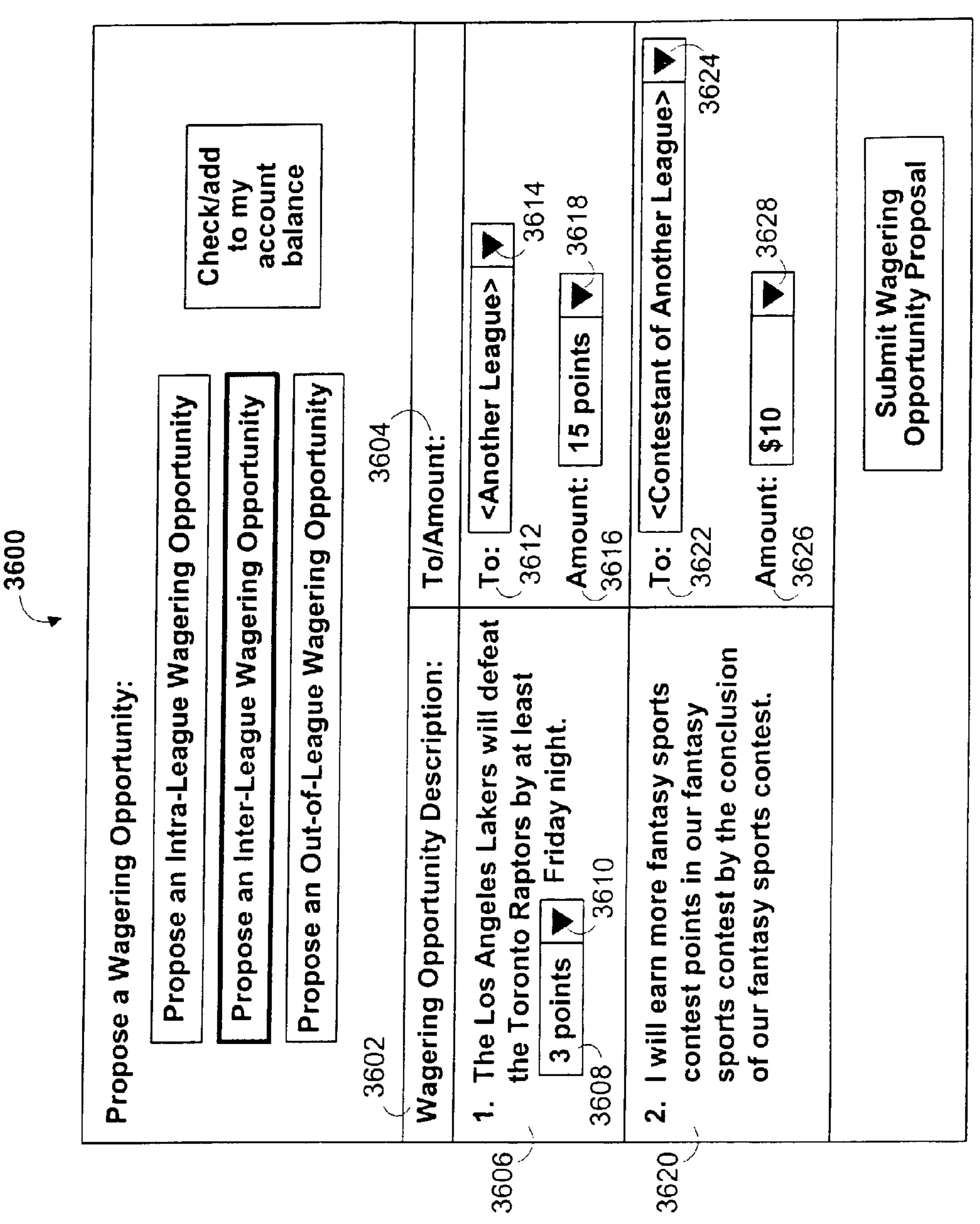
FIG. 36 is an illustrative fantasy sports contest application inter-league wagering opportunity proposal display screen in accordance with one embodiment of the present invention.

In some embodiments of the present invention, the fantasy sports contest application may provide to a user (or league) the ability to propose at least partially predefined wagering opportunities (i.e., wagering opportunities at least partially predefined by the fantasy sports contest application) to, for example, another fantasy sports contestant, another fantasy sports contest league, the fantasy sports contest application system, or a wagering service. FIG. 36 shows another illustrative wagering opportunities proposal display screen 3600. The fantasy sports contest application may display information for at least partially predefined wagering opportunities (e.g., at least partially defined inter-league, intra-league, and out-of-league wagering opportunities) in display screen 3600 in response to a user selection of option 844 to propose a wagering opportunity. At least one type of wagering opportunity term such as, for example, wagering opportunity description 3602 may be predefined for a user. A user may be required to define other types of wagering opportunity terms such as, for example, to whom the wagering opportunity proposal is directed and in what wagering opportunity amount 3604 (e.g., number of points, amount of money, prize, etc.) to propose a wagering opportunity. For example, the fantasy sports contest application may partially define wagering opportunity description 3606 to describe a wagering opportunity that is based on the outcome of a basketball game, but a user may be required to define a point spread 3608 (e.g., using pull-down menu 3610), to whom the wagering opportunity is directed 3612 (e.g., using pull-down menu 3614) and a wagering opportunity amount 3616 (e.g., using pull-down menu 3618) to propose the wagering opportunity. As another example, the fantasy sports contest application may completely define wagering opportunity description "I will earn more fantasy sports contest points in our fantasy sports contest by the conclusion of our fantasy sports contest" 3620, but a user may be required to define to whom the wagering opportunity is directed 3622 (e.g., a contestant of a different fantasy sports contest league that is a sub-division of the user's fantasy sports contest) using pull-down menu 3624 and in what amount 3626 using pull-down menu 3628 to propose the wagering opportunity.

Figure 37:
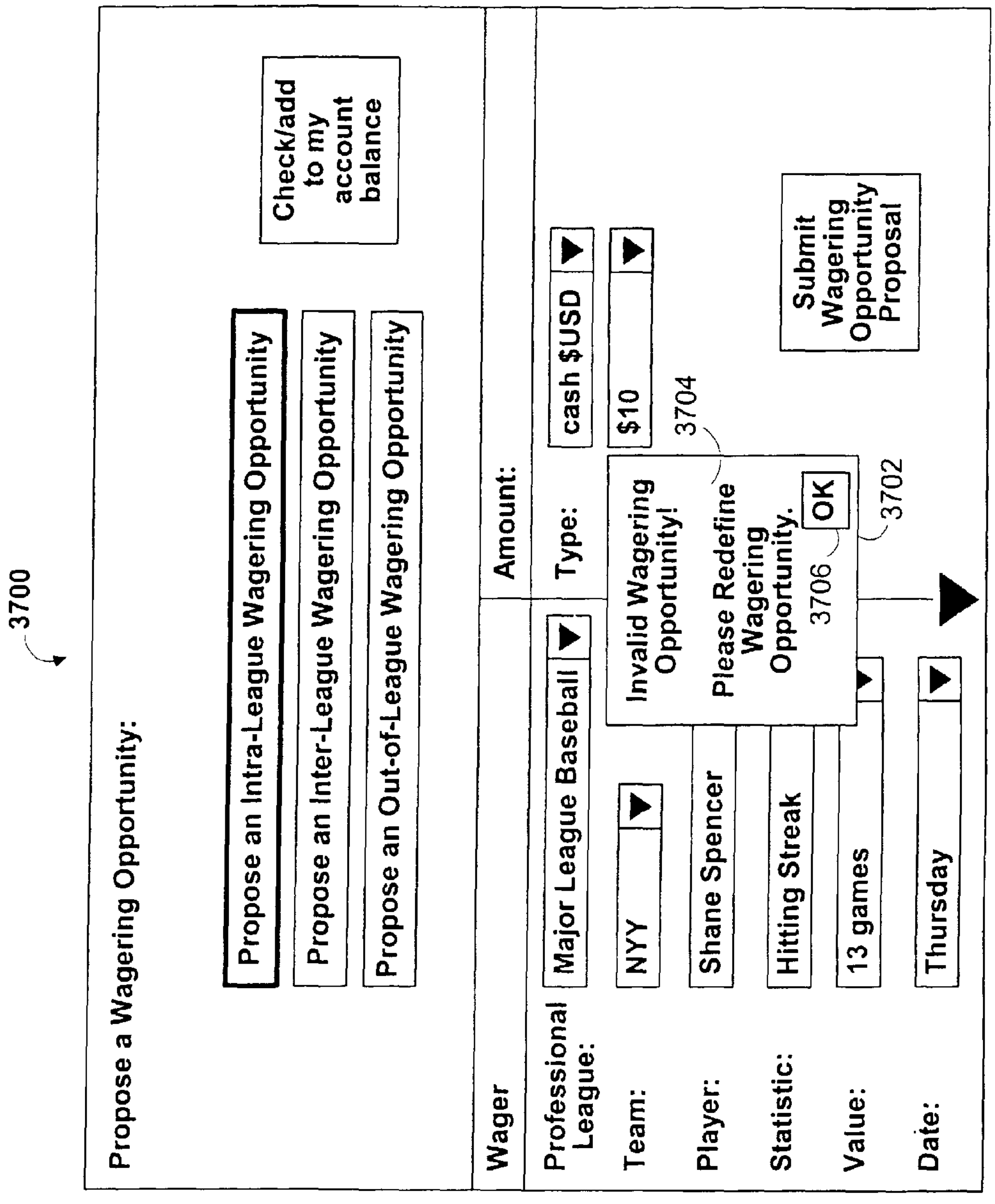
FIG. 37 is an illustrative fantasy sports contest application invalid wagering opportunity proposal display screen in accordance with one embodiment of the present invention.

In some embodiments of the present invention, the fantasy sports contest application may display information indicating an invalid wagering opportunity proposal in response to a user submission of an invalid wagering opportunity proposal. FIG. 37 shows an illustrative invalid wagering opportunity proposal display screen 3700. Referring to FIGS. 33 and 37, the fantasy sports contest application may display overlay 3702 in response to a user selection of option 3318 to submit a wagering opportunity proposal for an invalid wagering opportunity proposal (e.g., a wagering opportunity proposal that does not follow rules indicated in rules display screen 1000 (FIG. 10), a wagering opportunity proposal exceeding a user's account balance 3202 or 3204 (FIG. 32), a wagering opportunity proposal for money in a geographical region in which wagering for money is not legally permitted, etc.). Overlay 3702 may include information 3704 indicating that a user's wagering opportunity proposal is invalid and that a user must re-define the wagering opportunity proposal terms. Overlay 3702 may be removed from display screen 3700 in response to a user selection of "OK" option 3706.

Figure 38:
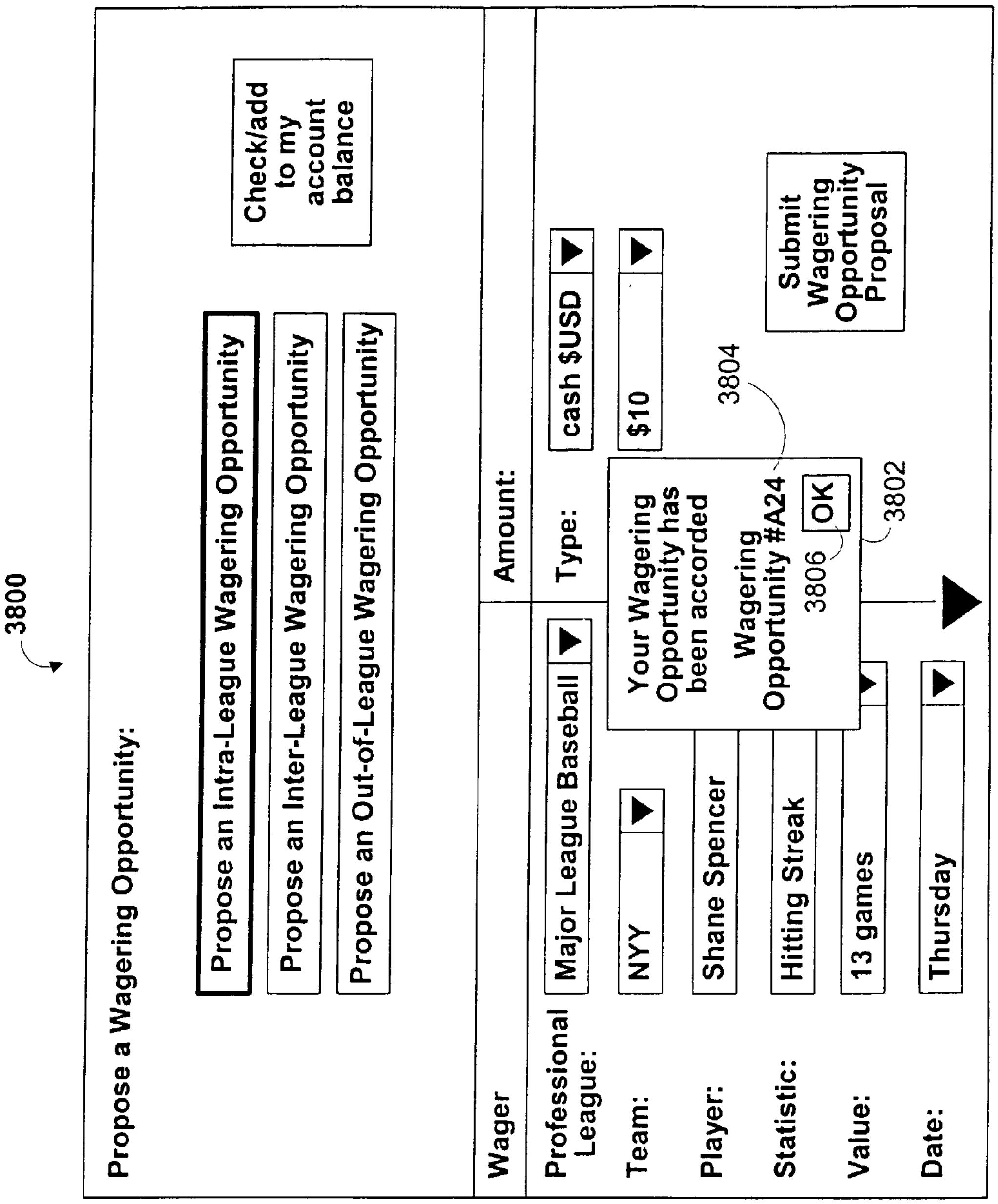
FIG. 38 is an illustrative fantasy sports contest application wagering opportunity proposal confirmation display screen in accordance with one embodiment of the present invention.

In some embodiments of the present invention, the fantasy sports contest application may display information indicating confirmation of a valid wagering opportunity proposal. FIG. 38 shows an illustrative valid wagering opportunity proposal confirmation overlay display screen 3800. Referring to FIGS. 33 and 38, the fantasy sports contest application may display overlay 3802 in response to a user selection of option 3318 to submit a wager proposal for a valid wager proposal (e.g., a wager proposal that follow rules indicated in rules display screen 1000 (FIG. 10), a wager proposal not exceeding user's account balance 3202 or 3204 (FIG. 32), a wager proposal for money in a geographical region in which wagering for money is legally permitted, etc.). Overlay 3802 may include information indicating, for example, a wagering opportunity number 3804 that has been accorded to a valid wagering opportunity proposal. Overlay 3802 may be removed from display screen 3800 in response to a user selection of "OK" option 3806.

Figure 39:
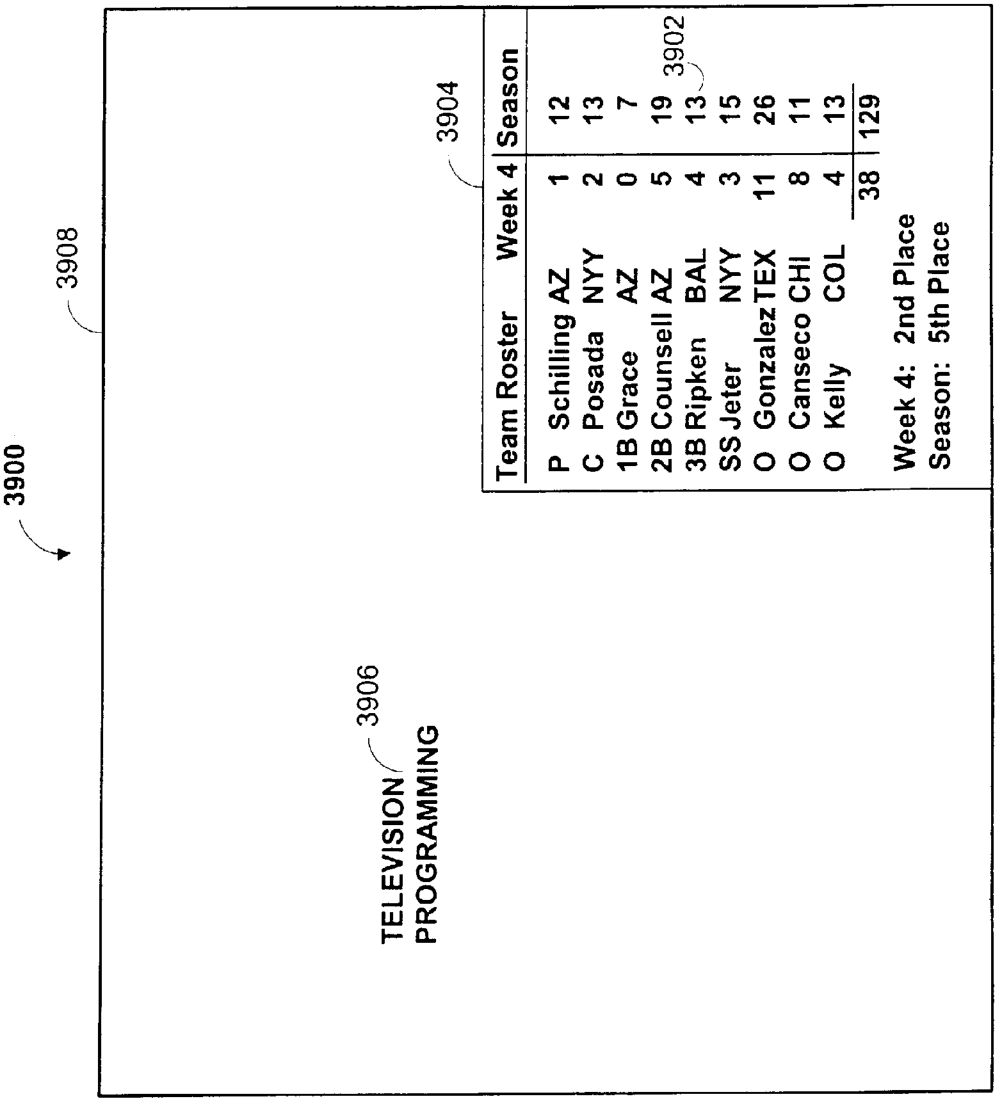
FIG. 39 is an illustrative fantasy sports contest application display screen showing the fantasy sports contest application implemented on an interactive television platform in accordance with one embodiment of the present invention.

In some embodiments of the present invention, the fantasy sports contest application may be implemented on an interactive television platform. Fantasy sports contest application display screens (e.g., and wagering application display screens if the fantasy sports contest application interfaces with one or more wagering applications to provide fantasy sports contests with wagering opportunities) may be displayed on a television or other suitable equipment for displaying television programming (e.g., a PC/TV). FIG. 39 shows an illustrative interactive television fantasy sports contest application display screen 3900. Information for fantasy sports contests, wagering opportunities and wagers and television programming (i.e., television programming that is related or unrelated to fantasy sports contests) may be displayed in any suitable arrangement. For example, the fantasy sports contest application may display fantasy sports contests information 3902 (and information for wagering opportunities and wagers) in a first display region 3904 of display screen 3900. Television programming 3906 for a specific television channel may be displayed in a second display region 3908 of display screen 3900. Display region 3904 may be an overlay including fantasy sports contest information 3902 that at least partially overlays television programming 3906 of display region 3908. For example, display region 3904 may include fantasy sports contest information such as fantasy sports contestant statistics 3902 (e.g., similar to data of display region 804 (FIG. 8)). In other examples, display region 3904 may include any other information for fantasy sports contests and wagering opportunities and wagers including fantasy sports contest league standings (e.g., similar to data of display region 902 (FIG. 9)), fantasy sports contest league rules (e.g., similar to data of FIGS. 10-12), outstanding wagers (e.g., similar to data of FIGS. 17-26), available wagering opportunities (e.g., similar to data of FIGS. 27-29), account information (e.g., similar to data of FIG. 32), and wagering opportunity proposal data (e.g., similar to data of FIGS. 33-36). The display arrangement of FIG. 39 is only illustrative. Any other suitable display arrangement may be used. For example, the fantasy sports contest application may display information for fantasy sports contests and wagering opportunities and wagers such that television programming for a current channel cannot be seen or heard by a user while the information for fantasy sports contests and wagering opportunities and wagers is displayed.

Figure 40:
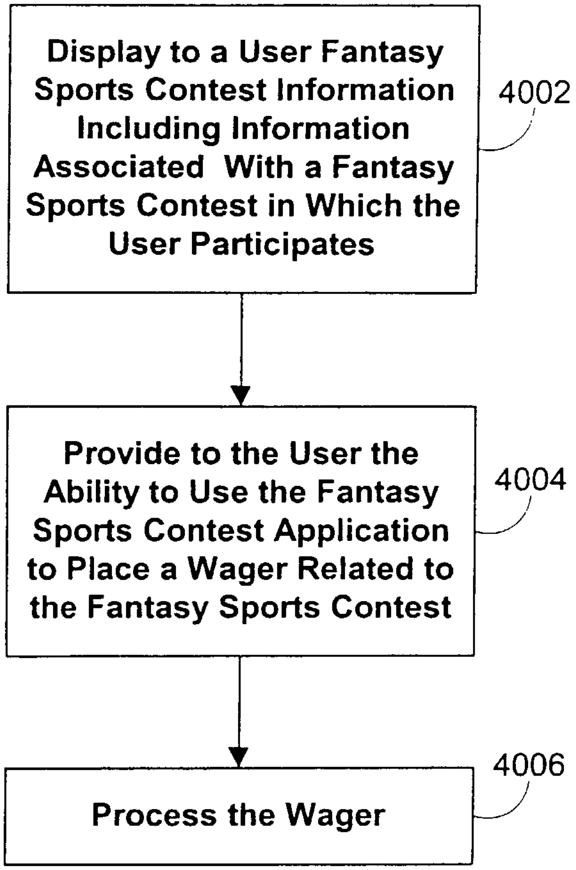
FIG. 40 is a flow chart of illustrative steps involved in providing to a user the ability to use a fantasy sports contest application to access fantasy sports contests and wagering opportunities in accordance with one embodiment of the present invention.

FIG. 40 is a flow chart of illustrative steps involved in providing to a user the ability to use a fantasy sports contest application to access fantasy sports contests and wagering opportunities in accordance with one embodiment of the present invention. At step 4002, the fantasy sports contest application may display to the user information associated with a fantasy sports contest in which the user participates.

For example, the fantasy sports contest application may display information for a real-life sports player that is associated with the fantasy sports contest such real-life statistics data or information indicating the players available for a fantasy sports contest trade (e.g., the information shown in edit team roster display screen 1500 (FIG. 15). As another example, the fantasy sports contest application may display information that indicates the performance of the user in the fantasy sports contest such as the user's personal statistics in the fantasy sports contest (FIG. 8), the league standings of the fantasy sports contest (FIG. 9), or other information that indicates a user's performance in the fantasy sports contest (e.g., the user's account balance in fantasy sports points 3204 (FIG. 32)).

The user may be provided with the ability to use the fantasy sports contest application to place a wager related to the fantasy sports contest at step 4004. In some embodiments of the present invention, the user may be provided with the ability to use the fantasy sports contest application to place a wager based on the performance of the user in the fantasy sports contest (e.g., by indicating wagering opportunity 2712 (FIG. 27), by determining wagering payouts for winners of the fantasy sports contest 1402 (FIG. 14), etc.). In some embodiments of the present invention, the user may be provided with the ability to place a wager based on a portion of a sports event, a sports event or more than one sports event that is related to the user's fantasy sports contest (e.g., by indicating wagering opportunity 2716 (FIG. 27), by indicating wagering opportunity 2806 (FIG. 28), etc.). The wager may be, for example, an intra-league wager, an inter-league wager, or an out-of league wager. The wager may be for, for example, money, fantasy sports contest points, non-cash prizes, or points redeemable for prizes. In some embodiments of the present invention, the fantasy sports contest may provide to the user the ability to place a wager unrelated to the fantasy sports contest.

The fantasy sports contest application (e.g., or one or more wagering applications that interfaces with the fantasy sports contest application) may process the wager for the user at step 4006. For example, the fantasy sports contest application may display to the user information indicating a wager amount (e.g., "$5" 1816 (FIG. 18)), a wager description (e.g., wager description 2406 (FIG. 24)), the parties involved in a wager (e.g., wagerers 1804 (FIG. 18)), when the wager was placed (e.g., by indicating that the wager is an outstanding inter-league wager 836 (FIG. 8) of a current week), an outcome of the wager (e.g., using icon 2216 (FIG. 22)), and whether the wager has been paid (e.g., by indicating that the wager is an outstanding intra-league wager 834 (FIG. 8) that has not been paid).

Figure 41:
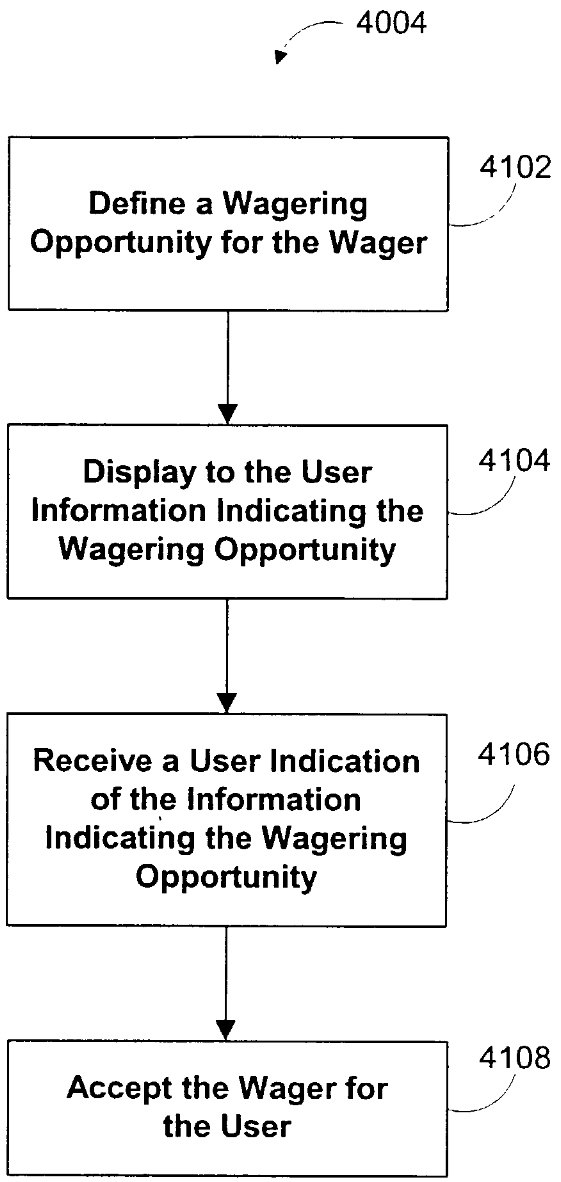
FIG. 41 is a flow chart of illustrative steps involved in providing to the user the ability to use the fantasy sports contest application to place a wager related to the user's fantasy sports contest in accordance with one embodiment of the present invention.

In some embodiments of the present, the fantasy sports contest application may display to the user information indicating a wagering opportunity for the wager. FIG. 41 is a flow chart of illustrative sub-steps involved in step 4004 (FIG. 40). A wagering opportunity may be defined at step 4102. For example, a wagering opportunity may be defined to be a wagering opportunity for money, fantasy sports contest points, non-cash prizes, or points redeemable for prizes. As another example, the wagering opportunity may be defined to be a pari-mutuel wagering opportunity or a wagering opportunity having a predefined payout schedule. Still another example, a wagering opportunity amount, a wagering opportunity description, and to whom a wagering opportunity is directed may be defined at step 4004.

In some embodiments of the present invention, the fantasy sports contest application may use application data to at least partially define the wagering opportunity for the user. For example, the fantasy sports contest application may define a wagering opportunity description 3620 (FIG. 36) using application data from rules data source 104 (FIG. 1), statistics data source 106, contest data source 108, wagering data source 110, fantasy sports contest and wagering data source 204 (FIG. 2), external data source 220, or any other source of application data or combination of data sources.

Figure 42:
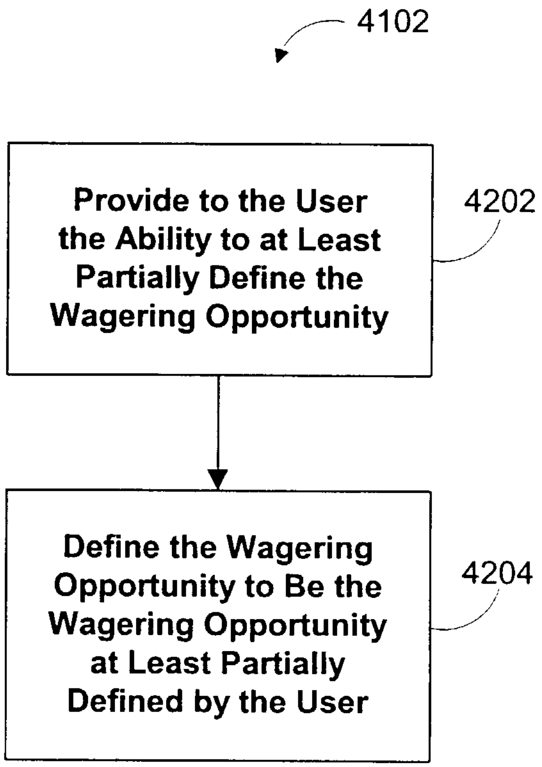
FIG. 42 is a flow chart of illustrative steps involved in defining a wagering opportunity for a wager in accordance with one embodiment of the present invention.

In some embodiments of the present invention, the fantasy sports contest application may provide to a user the ability to at least partially define the wagering opportunity. FIG. 42 is a flow chart of illustrative sub-steps of step 4102 (FIG. 41). The fantasy sports contest application may provide to the user the ability to at least partially define the wagering opportunity at step 4202. For example, the fantasy sports contest application may provide to the user the ability to define a wagering opportunity description (e.g., wagering opportunity description 3308 (FIG. 33), 3402 (FIG. 34), 3602 (FIG. 36), etc.) by entering information into a data field such as data field 3406 (FIG. 34) or using one or more pull-down menus such as pull down menu 3312 (FIG. 33). The fantasy sports contest application may provide to the user the ability to at least partially define other wagering terms such as, for example, to whom a wagering opportunity is directed (3612 (FIG. 36), 3504 (FIG. 35)). The fantasy sports contest application may define the wagering opportunity to be the wagering opportunity at least partially defined by the user at step 4204.

Figure 43:
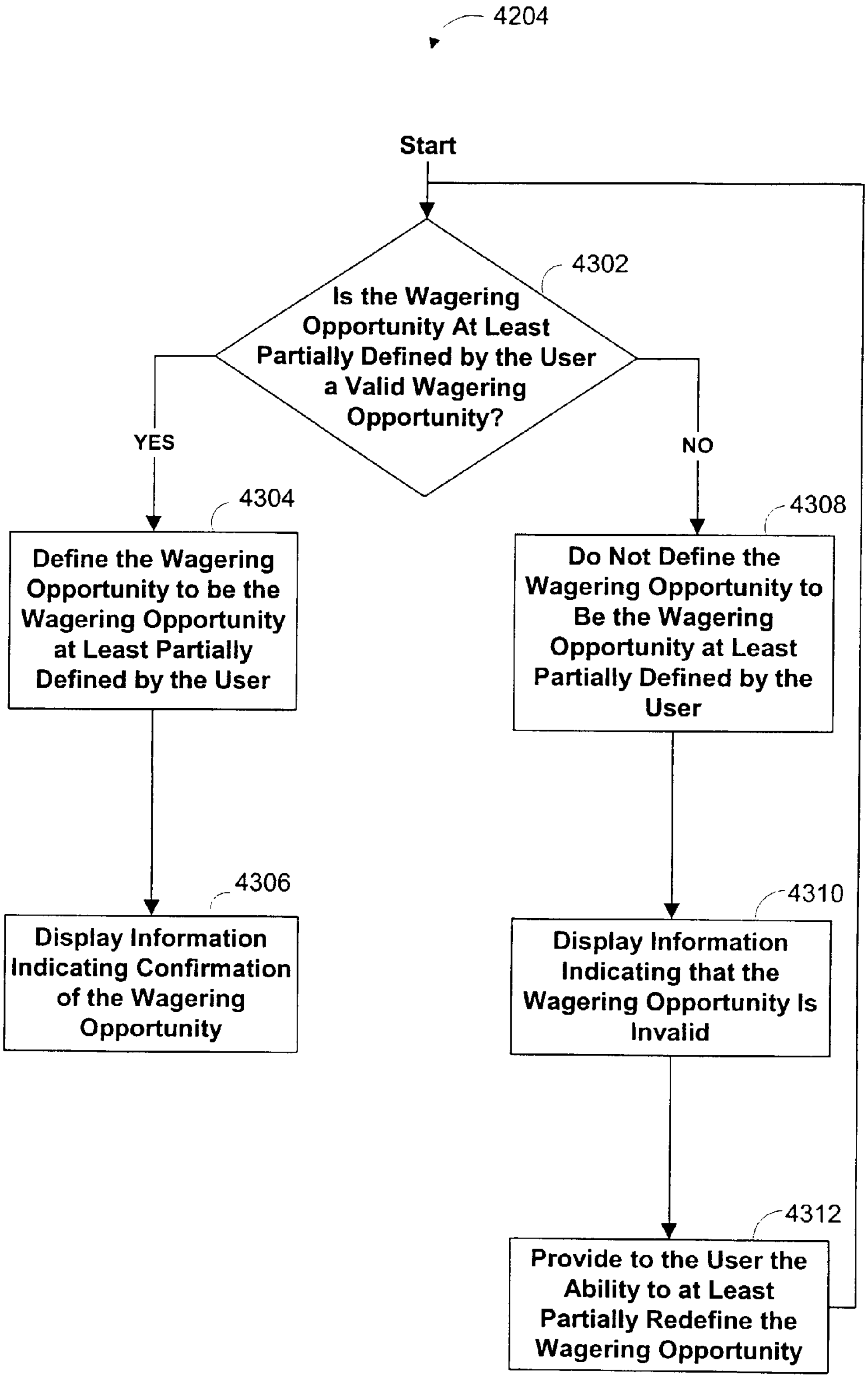
FIG. 43 is a flow chart of illustrative steps involved in defining a wagering opportunity to be a wagering opportunity at least partially defined by the user in accordance with one embodiment of the present invention.

In some embodiments of the present invention, the fantasy sports contest may determine whether the wagering opportunity at least partially defined by the user is a valid wagering opportunity. FIG. 43 is a flow chart of illustrative sub-steps involved in step 4204 (FIG. 2). The fantasy sports contest application may determine whether the wagering opportunity at least partially defined by the user is a valid wagering opportunity at step 4302. For example, the fantasy sports contest may determine whether the wagering opportunity at least partially defined by the user is in compliance with, for example, both the laws governing a user's geographic region (e.g., indicated by data from rules data source 104 (FIG. 1) and fantasy sports contest and wagering data source 204 (FIG. 2)) and the rules information of display region 1002 (FIG. 10). If the wagering opportunity is valid, the fantasy sports contest application may define the wagering opportunity to be the wagering opportunity at least partially defined by the user at step 4304. At step 4306, the fantasy sports contest application may display to the user information indicating confirmation of the wagering opportunity (e.g., the information of overlay 3802 (FIG. 38)). If the wagering opportunity is invalid, the fantasy sports contest application may not define the wagering opportunity to be the wagering opportunity at least partially defined by the user at step 4308. At steps 4310 and 4312, the fantasy sports contest application may display to the user information indicating that the wagering opportunity is invalid and provide to the user the ability to at least partially redefine the wagering opportunity (e.g., as shown in overlay 3707 (FIG. 37)).

Returning to FIG. 41, the fantasy sports contest application may display information indicating the wagering opportunity to the user at step 4104. For example, the fantasy sports contest application may display the information for available wagering opportunities of FIGS. 27-29 at step 4104.

The fantasy sports contest application may receive a user indication of the wagering opportunity at step 4106. For example, the user may use remote control 318 (FIG. 3) or other suitable user input device to, for example, indicate a wagering opportunity to the fantasy sports contest application.

Figure 44:
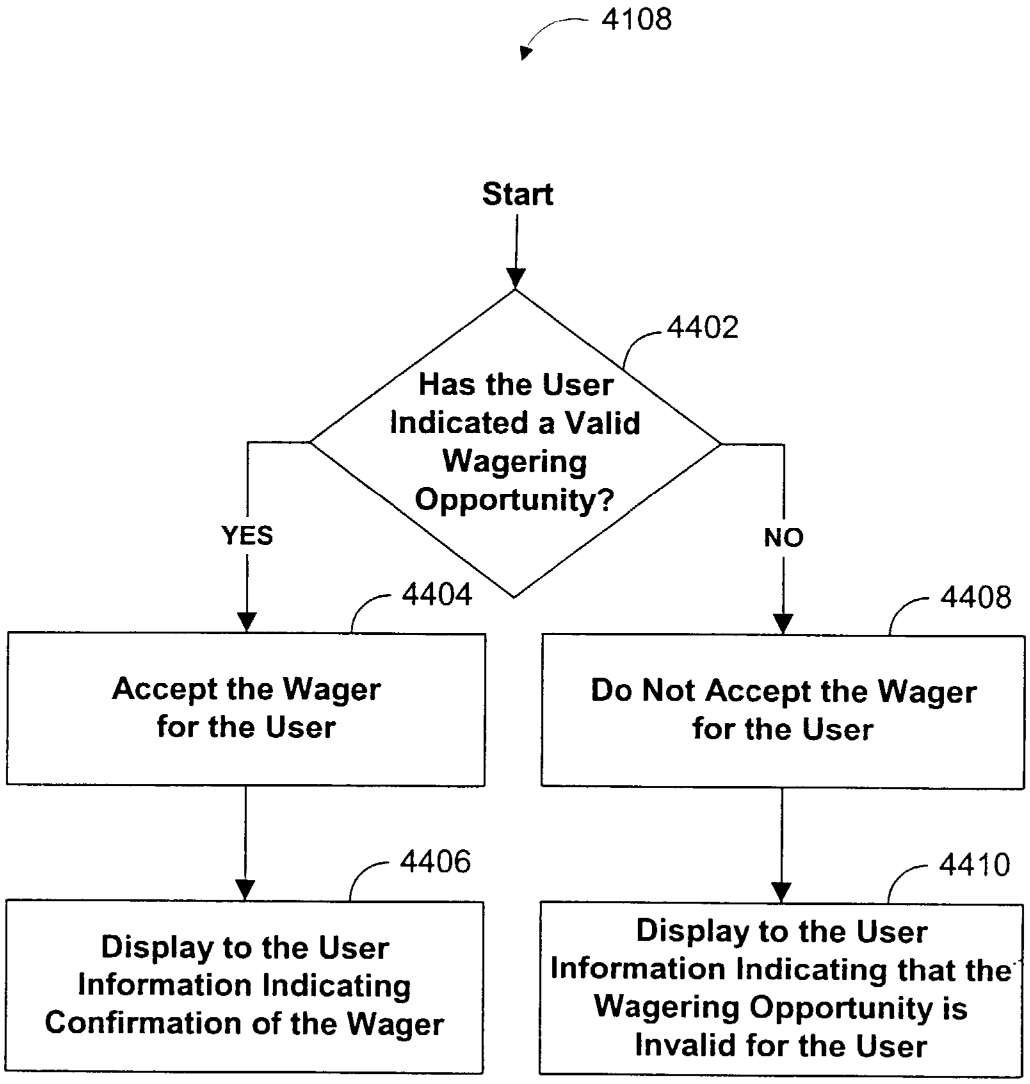
FIG. 44 is a flow chart of illustrative steps involved in accepting a wager for a user in accordance with one embodiment of the present invention.

The fantasy sports contest application may accept the wager for the user at step 4108. In some embodiments of the present invention (e.g., in embodiments in which the fantasy sports contest application may display to the user information for wagering opportunities that are not necessarily in compliance with rules governing wagering for the user), the fantasy sports contest application may determine whether the user has selected a valid wagering opportunity. FIG. 44 is a flow chart of illustrative sub-steps of step 4108 (FIG. 41). At step 4402, the fantasy sports contest application may determine whether the user has indicated a valid wagering opportunity at step 4402 (e.g., a wagering opportunity in compliance with the rules information of display region 1002 (FIG. 10). If the user has indicated a valid wagering opportunity, the fantasy sports contest application may accept the wager for the user at step 4404. At step 4406, the fantasy sports contest application may display to the user information indicating confirmation of the wager (e.g., the information of overlay 3102 (FIG. 31). If the user has indicated an invalid wagering opportunity, the fantasy sports contest application may not accept the wager for the user at step 4408. At step 4410, the fantasy sports contest application may display to the user information indicating that the wagering opportunity is invalid for the user (e.g., in an overlay similar to overlay 3702 (FIG. 37).

Figure 45:
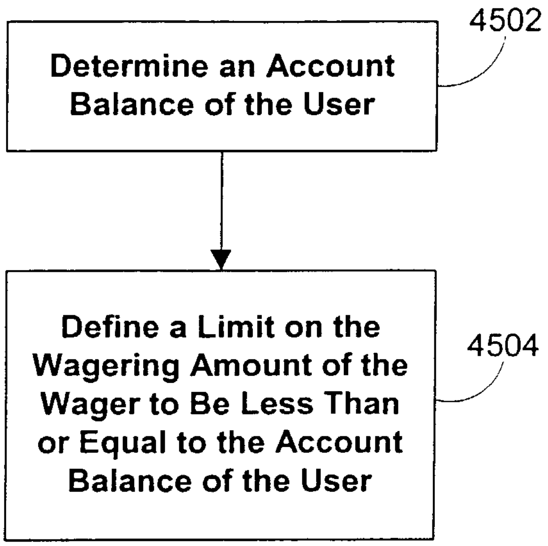
FIGS. 45-46 are flow charts of illustrative steps involved in defining a limit on the wagering amount of a wager in accordance with one embodiment of the present invention.

In some embodiments of the present invention, the fantasy sports contest application may define a limit on the wagering amount of a wager. FIG. 45 is a flow chart of illustrative steps involved in determining a limit on the wagering amount of a wager. The fantasy sports contest application may determine an account balance of the user at step 4502 (e.g., account balance in monetary funds 3202 (FIG. 32), account balance in points 3204 (FIG. 32), etc.) The fantasy sports contest application may define a limit on the wagering amount of the wager to be less than or equal to the account balance of the user at step 4504.

Figure 46:
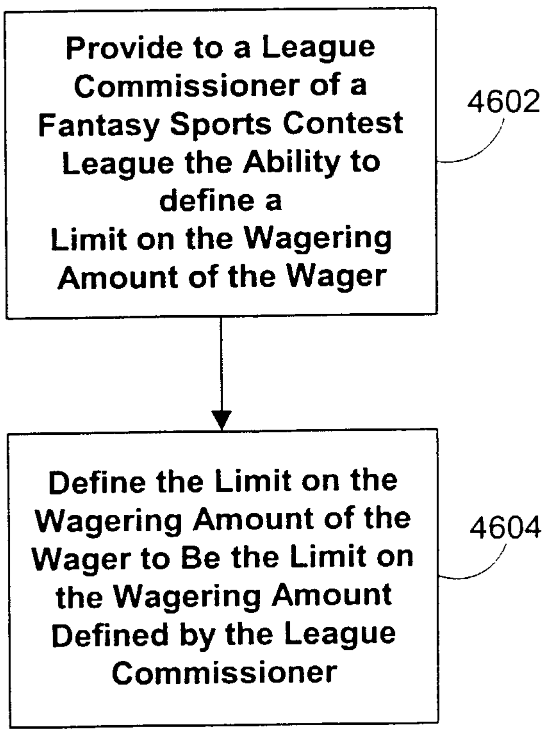

FIG. 46 is flowchart of illustrative steps involved in defining a limit on the wagering amount of a wager in another embodiment of the present invention. The fantasy sports contest may provide to a league commissioner of a fantasy sports contest league the ability to define a limit on the wagering amount of a wager at step 4602. For example, the fantasy sports contest application may provide to a league commissioner the ability to define a limit on intra-league wagering 1214 (FIG. 12), inter-league wagering 1216, and out-of-league wagering 1218. At step 4604, the fantasy sports contest application may define the limit on the wagering amount of the wager to be the limit on the wagering amount defined by the league commissioner.

Figure 47:
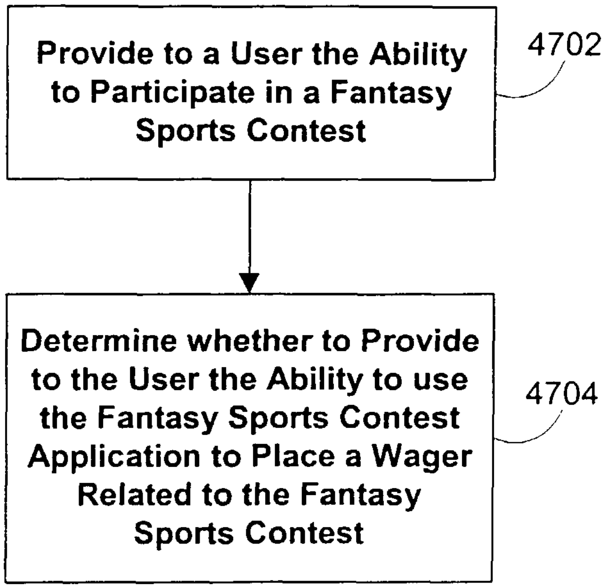
FIG. 47 is a flow chart of illustrative steps involved in providing to a user the ability to use a fantasy sports contest application to access fantasy sports contests and wagering opportunities in accordance with one embodiment of the present invention.

FIG. 47 is a flow chart of illustrative sub-steps involved in providing to a user the ability to use a fantasy sports contest application to access fantasy sports contests and wagering opportunities in accordance with one embodiment of the present invention. The fantasy sports contest application may provide to a user the ability to participate in a fantasy sports contest at step 4702. For example, the fantasy sports contest application may display to user option 825 (FIG. 8) to start or participate in a new fantasy sports contest league. At step 4704, the fantasy sports contest application may determine whether to provide to the user the ability to use the fantasy sports contest application to place a wager related to the fantasy sports contest. In some embodiments of the present invention, the fantasy sports contest application may determine whether to provide to the user the ability to use the fantasy sports contest application to place a wager unrelated to the fantasy sports contest.

Figure 48:
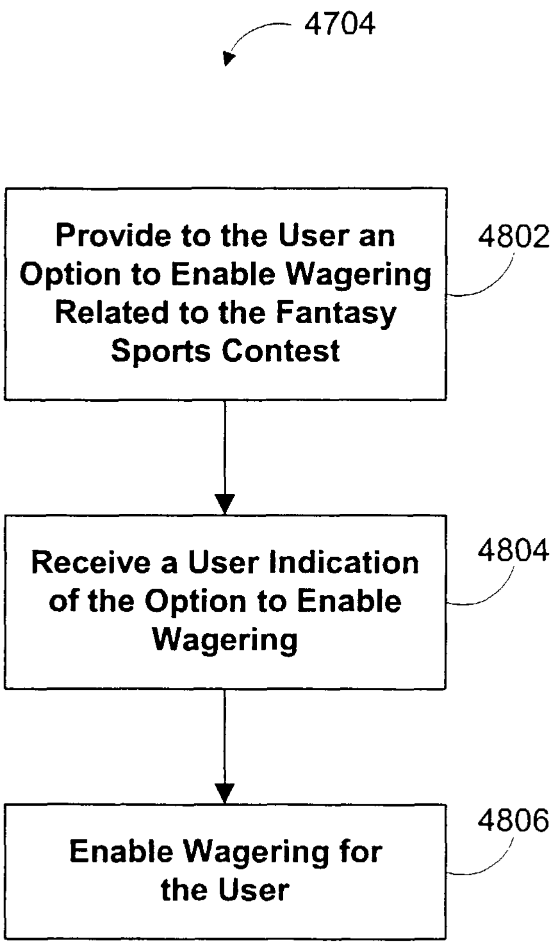
FIGS. 48-49 are flow charts of illustrative steps involved in determining whether to provide to the user the ability to use the fantasy sports contest application to place a wager related to the fantasy sports contest in accordance with various embodiment of the present invention.

In some embodiments of the present invention, the fantasy sports contest application may provide to a user the ability to enable wagering related to the fantasy sports contest. FIG. 48 is a flow chart of illustrative sub-steps of step 4704 (FIG. 47). At step 4802, the fantasy sports contest application may provide to the user an option to enable wagering related to the fantasy sports contest. For example, the fantasy sports contest application may provide to the user option 1208 (FIG. 12) to enable intra-league wagering, option 1210 to enable inter-league wagering, and option 1212 to enable out-of-league wagering. The fantasy sports contest application may receive a user indication (e.g., from remote control 318 (FIG. 3)) of the option to enable wagering at step 4804. At step 4806, the fantasy sports contest application may enable wagering for the user (e.g., the fantasy sports contest application may include information for wagering opportunities and wagers in fantasy sports contest application display screens).

Figure 49:
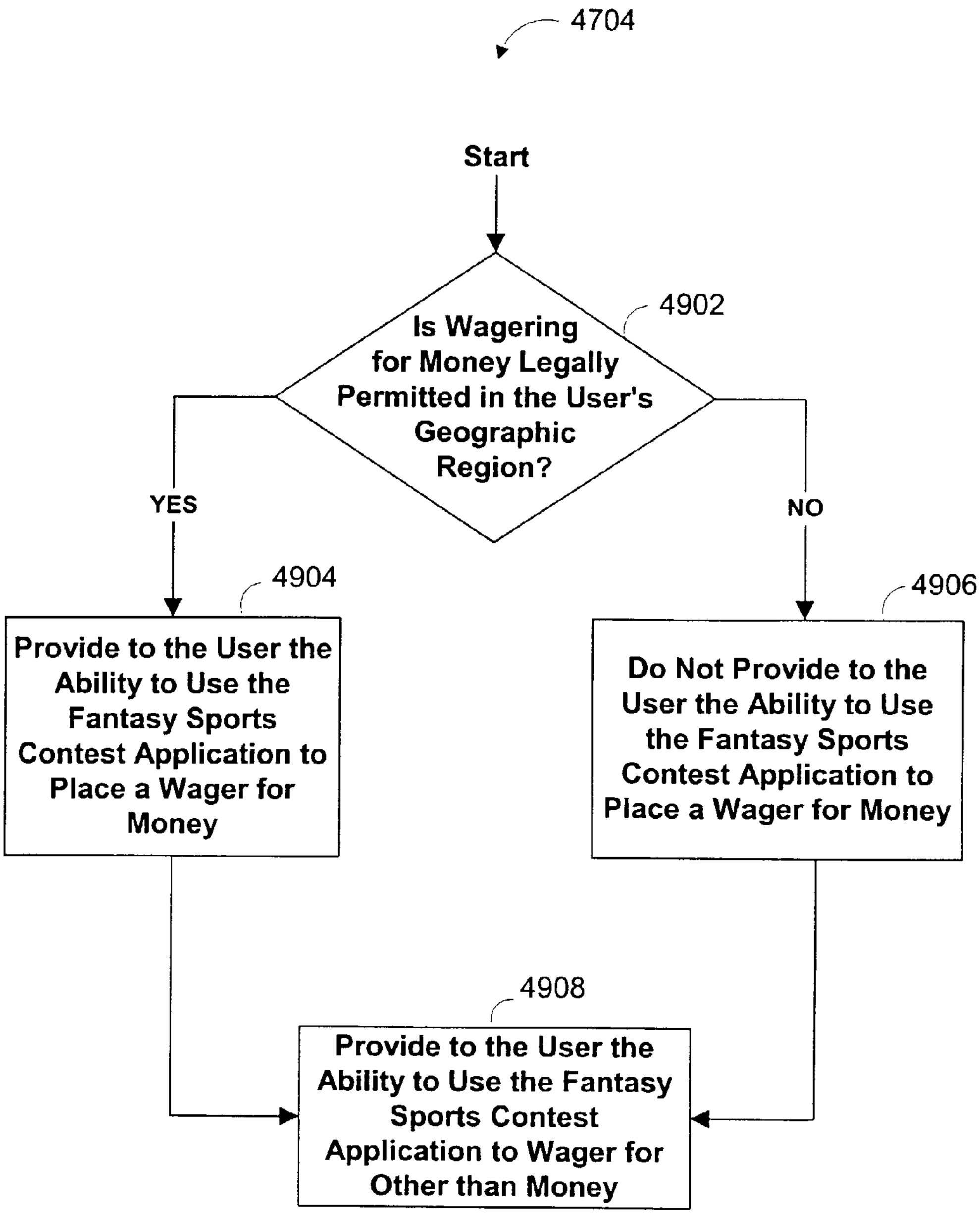

In some embodiments of the invention, the fantasy sports contest application may determine for the user whether to provide to the user the ability to use the fantasy sports contest application to place a wager related to the fantasy sports contest application. FIG. 49 is a flow chart of another embodiment of illustrative sub-steps of step 4704 (FIG. 47). The fantasy sports contest may determine whether wagering for money is legally permitted in the user's geographic region at step 4902. For example, the fantasy sports application may use application data from rules data source 104 (FIG. 1), wagering data source 110, fantasy sports contest and wagering data source 204 (FIG. 2), external data source 220 or any other suitable data source or combination of such sources to determine whether wagering for money is legally permitted in a user's geographic region. If wagering for money is legally permitted in the user's geographic region, the fantasy sports contest application may provide to the user the ability to use the fantasy sports contest application to place a wager for money at step 4904 (e.g., the fantasy sports contest application may provide to the user the ability to accept wager 2806 (FIG. 28) for "$20" 2808, provided the user proves that the user is over the legal age by, for example, entering valid credit card information using display screen 32 (FIG. 32)). If wagering for money is not legally permitted in the user's geographic region, the fantasy sports contest application may not provide to the user the ability to use the fantasy sports contest application to place a wager for money at step 4906 (e.g., the fantasy sports contest application may prevent wagering opportunities for money from being displayed to the user).

The fantasy sports contest application may provide to the user the ability to use the fantasy sports contest application to wager for other than money at step 4908 (e.g., in addition to or as an alternative to wagering for money) provided that the wagering is legally permitted. For example, the fantasy sports contest may provide to the user the ability to use the fantasy sports contest to wager for non-cash prizes (e.g., a trophy) or points redeemable for non-cash prizes if wagering for money is not legally permitted in a user's geographic region.

Thus it is seen that systems and methods for providing fantasy sports contests with wagering opportunities are provided. Persons skilled in the art will appreciate that the present invention can be practiced by other than the described embodiments, which are presented for purposes of illustration rather than of limitation, and the present invention is limited only by the claims that follow.

I claim:

1. A method for using a fantasy sports contest application to provide to a user the ability to access fantasy sports contests and wagering opportunities, the method comprising:

causing to be displayed, on a user equipment device, fantasy sports contest information, comprising information associated with a fantasy sports contest in which the user participates;

generating an interactive menu for creating, on the user equipment device, a wagering contest by selecting from a plurality of wagering contest attributes in the interactive menu, wherein the plurality of wagering contest attributes available are determined by the information associated with the fantasy sports contest and wagering rules of the fantasy sports contest;

in response to the creation of the wagering contest, transmitting to other users participating in the fantasy sports contest in which the user participates, an option to place a wager in the created wagering contest;

receiving on the user equipment device, wagers that have been placed in the created wagering contest; and processing the wager.

2. The method of claim 1 wherein causing the fantasy sports contest information to be displayed comprises causing information for real-life athletic competition that is associated with the fantasy sports contest to be displayed.

3. The method of claim 1 wherein causing the fantasy sports contest information to be displayed comprises causing information that indicates the performance of the user in the fantasy sports contest to be displayed.

4. The method of claim 1 further comprising using the fantasy sports contest application to place a wager based on the user's performance in the fantasy sports contest.

5. The method of claim 1 further comprising using the fantasy sports contest application to place a wager based on a portion of a real-life sporting event that is related to the fantasy sports contest.

6. The method of claim 1 further comprising using the fantasy sports contest application to place a wager based on a real-life sporting event that is related to the fantasy sports contest.

7. The method of claim 1 further comprising using the fantasy sports contest application to place a wager based on more than one real-life sporting event that is related to the fantasy sports contest.

8. The method of claim 1 wherein transmitting the option to place a wager comprises:

defining a wagering opportunity for the wager;

displaying to the user information indicating the wagering opportunity;

receiving a user indication of the information indicating the wagering opportunity; and accepting the wager for the user.

9. The method of claim 8 wherein the user participates in a fantasy sports contest league within the fantasy sports contest and wherein defining a wagering opportunity comprises defining an intra-league wagering opportunity between the user and another contestant of the fantasy sports contest league.

10. The method of claim 8 wherein the user participates in a fantasy sports contest league within the fantasy sports contest and wherein defining a wagering opportunity comprises defining an intra-league wagering opportunity between the user and a fantasy sports contest application system.

11. The method of claim 8 wherein the user participates in a fantasy sports contest league within the fantasy sports contest and wherein defining a wagering opportunity comprises defining an inter-league wagering opportunity between the user and one or more contestants of another fantasy sports contest league.

12. The method of claim 8 wherein the user participates in a fantasy sports contest league within the fantasy sports contest and wherein defining a wagering opportunity comprises defining an inter-league wagering opportunity between:

a) the user and one or more other contestants of the fantasy sports contest league; and b) one or more contestants of another fantasy sports contest league.

13. The method of claim 8 wherein the user participates in a fantasy sports contest league within the fantasy sports contest and wherein defining a wagering opportunity comprises defining an out-of-league wagering opportunity between the user and another party that does not include any fantasy sports contestants.

14. The method of claim 8 wherein the user participates in a fantasy sports contest league within the fantasy sports contest and wherein defining a wagering opportunity comprises defining an out-of-league wagering opportunity between:

a) the user and one or more other contestants of the fantasy sports contest league; and b) another party that does not include any fantasy sports contestants.

15. The method of claim 8 wherein defining a wagering opportunity comprises defining a wagering opportunity for money.

16. The method of claim 8 wherein defining a wagering opportunity comprises defining a wagering opportunity for fantasy sports contest points.

17. The method of claim 8 wherein defining a wagering opportunity comprises defining a wagering opportunity for non-cash prizes.

18. The method of claim 8 wherein defining a wagering opportunity comprises defining a wagering opportunity for points redeemable for cash prizes.

19. The method of claim 8 wherein defining a wagering opportunity comprises defining a wagering opportunity for points redeemable for non-cash prizes.

20. The method of claim 8 wherein defining a wagering opportunity comprises defining a wagering opportunity amount.

21. The method of claim 8 wherein defining a wagering opportunity comprises defining a wagering opportunity description.

22. The method of claim 8 wherein defining a wagering opportunity comprises defining to whom the wagering opportunity is directed.

23. The method of claim 8 wherein defining a wagering opportunity comprises defining a wagering opportunity having a pre-determined payout schedule.

24. The method of claim 8 wherein defining a wagering opportunity comprises using application data to at least partially define the wagering opportunity for the user.

25. The method of claim 8 wherein defining a wagering opportunity comprises:

providing to the user the ability to at least partially define the wagering opportunity; and defining the wagering opportunity to be the wagering opportunity at least partially defined by the user.

26. The method of claim 25 wherein defining the wagering opportunity to be the wagering opportunity at least partially defined by the user comprises:

determining whether the wagering opportunity at least partially defined by the user is a valid wagering opportunity; and defining the wagering opportunity to be the wagering opportunity at least partially defined by the user when the wagering opportunity at least partially defined by the user is a valid wagering opportunity.

27. The method of claim 26 further comprising displaying to the user information indicating confirmation of the wagering opportunity.

28. The method of claim 25 wherein defining the wagering opportunity to be the wagering opportunity at least partially defined by the user comprises:

determining whether the wagering opportunity at least partially defined by the user is a valid wagering opportunity; and not defining the wagering opportunity to be the wagering opportunity at least partially defined by the user when the wagering opportunity at least partially defined by the user is not a valid wagering opportunity.

29. The method of claim 28 further comprising displaying to the user information indicating that the wagering opportunity is invalid.

30. The method of claim 28 further comprising providing to the user the ability to at least partially redefine the wagering opportunity.

31. The method of claim 8 wherein accepting the wager for the user comprises:

determining whether the wagering opportunity indicated by the user is a valid wagering opportunity for the user; and accepting the wager for the user if the wagering opportunity indicated by the user is a valid wagering opportunity for the user.

32. The method of claim 31 further comprising displaying to the user information indicating confirmation of the wager.

33. The method of claim 8 wherein accepting the wager for the user comprises:

determining whether the wagering opportunity indicated by the user is a valid wagering opportunity for the user; and declining the wager for the user if the wagering opportunity indicated by the user is not a valid wagering opportunity for the user.

34. The method of claim 33 further comprising displaying to the user information indicating that the wagering opportunity is an invalid wagering opportunity for the user.

35. The method of claim 1 wherein processing the wager comprises displaying to the user information indicating a wager amount for the wager.

36. The method of claim 1 wherein processing the wager comprises displaying to the user information indicating a wager description for the wager.

37. The method of claim 1 wherein processing the wager comprises displaying to the user information indicating the parties involved in the wager.

38. The method of claim 1 wherein processing the wager comprises displaying to the user information indicating when the wager was placed.

39. The method of claim 1 wherein processing the wager comprises displaying to the user information indicating an outcome of the wager.

40. The method of claim 1 further comprising defining a limit on a wagering amount for the wager.

41. The method of claim 40 wherein defining a limit on a wagering amount for the wager comprises:

determining an account balance of the user; and defining the limit on the wagering amount to be less than or equal to the account balance of the user.

42. The method of claim 40 wherein the user participates in a fantasy sports contest league within the fantasy sports contest and defining a limit on a wagering amount for the wager comprises defining the limit on the wagering amount by a league commissioner of the fantasy sports contest league.

43. The method of claim 1 further comprising using the fantasy sports contest application to place a wager unrelated to the fantasy sports contest.

44. The method of claim 1 wherein the option defines to whom the wagering contest is directed.

45. The method of claim 1 further comprising determining whether to create the wager related to the fantasy sports contest.

46. The method of claim 1, wherein the wagering rules of the fantasy sports contest restrict wagering contest to only participants in the fantasy sports contest.

47. The method of claim 1, wherein the wagering rules of the fantasy sports contest restrict wagering contest to only non-cash prizes.

48. A system for implementing a fantasy sports contest application operative to provide to a user the ability to access fantasy sports contests and wagering opportunities, the system comprising:

means for causing to be displayed fantasy sports contest information comprising information associated with a fantasy sports contest in which the user participates;

means for generating an interactive menu for creating a wagering contest by selecting from a plurality of wagering contest attributes in the interactive menu, wherein the plurality of wagering contest attributes available are determined by the information associated with the fantasy sports contest and wagering rules of the fantasy sports contest;

means for, in response to the creation of the wagering contest, transmitting to other users participating in the fantasy sports contest in which the user participates an option to place a wager in the created wagering contest;

means for receiving wagers that have been place in the created wagering contest; and means for processing the wager.

49. The system of claim 48 wherein the means for causing to the user fantasy sports contest information to be displayed comprises means for causing information for real-life athletic competition that is associated with the fantasy sports contest to be displayed.

50. The system of claim 48 wherein the means for causing to the user fantasy sports contest information to be displayed comprises means for causing information that indicates the performance of the user in the fantasy sports contest to be displayed.

51. The system of claim 48 further comprising means for using the fantasy sports contest application to place a wager based on the user's performance in the fantasy sports contest.

52. The system of claim 48 further comprising means for using the fantasy sports contest application to place a wager based on a portion of a real-life sporting event that is related to the fantasy sports contest.

53. The system of claim 48 further comprising means for using the fantasy sports contest application to place a wager based on a real-life sporting event that is related to the fantasy sports contest.

54. The system of claim 48 further comprising means for using the fantasy sports contest application to place a wager based on more than one real-life sporting event that is related to the fantasy sports contest.

55. The system of claim 48 wherein the means for transmitting the option to place a wager comprises:

means for defining a wagering opportunity for the wager;

means for displaying to the user information indicating the wagering opportunity;

means for receiving a user indication of the information indicating the wagering opportunity; and means for accepting the wager for the user.

56. The system of claim 55 wherein the user participates in a fantasy sports contest league within the fantasy sports contest and wherein the means for defining a wagering opportunity comprises means for defining an intra-league wagering opportunity between the user and another contestant of the fantasy sports contest league.

57. The system of claim 55 wherein the user participates in a fantasy sports contest league within the fantasy sports contest and wherein the means for defining a wagering opportunity comprises means for defining an intra-league wagering opportunity between the user and a fantasy sports contest application system.

58. The system of claim 55 wherein the user participates in a fantasy sports contest league within the fantasy sports contest and wherein the means for defining a wagering opportunity comprises means for defining an inter-league wagering opportunity between the user and one or more contestants of another fantasy sports contest league.

59. The system of claim 55 wherein the user participates in a fantasy sports contest league within the fantasy sports contest and wherein the means for defining a wagering opportunity comprises means for defining an inter-league wagering opportunity between:

a) the user and one or more other contestants of the fantasy sports contest league; and b) one or more contestants of another fantasy sports contest league.

60. The system of claim 55 wherein the user participates in a fantasy sports contest league within the fantasy sports contest and wherein the means for defining a wagering opportunity comprises means for defining an out-of-league wagering opportunity between the user and another party that does not include any fantasy sports contestants.

61. The system of claim 55 wherein the user participates in a fantasy sports contest league within the fantasy sports contest and wherein the means for defining a wagering opportunity comprises means for defining an out-of-league wagering opportunity between:

a) the user and one or more other contestants of the fantasy sports contest league; and b) another party that does not include any fantasy sports contestants.

62. The system of claim 55 wherein the means for defining a wagering opportunity comprises means for defining a wagering opportunity for money.

63. The system of claim 55 wherein the means for defining a wagering opportunity comprises means for defining a wagering opportunity for fantasy sports contest points.

64. The system of claim 55 wherein the means for defining a wagering opportunity comprises means for defining a wagering opportunity for non-cash prizes.

65. The system of claim 55 wherein the means for defining a wagering opportunity comprises means for defining a wagering opportunity for points redeemable for cash prizes.

66. The system of claim 55 wherein the means for defining a wagering opportunity comprises means for defining a wagering opportunity for points redeemable for non-cash prizes.

67. The system of claim 55 wherein the means for defining a wagering opportunity comprises means for defining a wagering opportunity amount.

68. The system of claim 66 wherein the means for defining a wagering opportunity comprises means for defining a wagering opportunity description.

69. The system of claim 55 wherein the means for defining a wagering opportunity comprises means for defining to whom the wagering opportunity is directed.

70. The system of claim 55 wherein the means for defining a wagering opportunity comprises means for defining a wagering opportunity having a pre-determined payout schedule.

71. The system of claim 55 wherein the means for defining a wagering opportunity comprises means for using application data to at least partially define the wagering opportunity for the user.

72. The system of claim 55 wherein the means for defining a wagering opportunity comprises:

means for providing to the user the ability to at least partially define the wagering opportunity; and means for defining the wagering opportunity to be the wagering opportunity at least partially defined by the user.

73. The system of claim 72 wherein the means for defining the wagering opportunity to be the wagering opportunity at least partially defined by the user comprises:

means for determining whether the wagering opportunity at least partially defined by the user is a valid wagering opportunity; and means for defining the wagering opportunity to be the wagering opportunity at least partially defined by the user when the wagering opportunity at least partially defined by the user is a valid wagering opportunity.

74. The system of claim 73 further comprising means for displaying to the user information indicating confirmation of the wagering opportunity.

75. The system of claim 72 wherein the means for defining the wagering opportunity to be the wagering opportunity at least partially defined by the user comprises:

means for determining whether the wagering opportunity at least partially defined by the user is a valid wagering opportunity; and means for not defining the wagering opportunity to be the wagering opportunity at least partially defined by the user when the wagering opportunity at least partially defined by the user is not a valid wagering opportunity.

76. The system of claim 75 further comprising means for displaying to the user information indicating that the wagering opportunity is invalid.

77. The system of claim 75 further comprising means for providing to the user the ability to at least partially redefine the wagering opportunity.

78. The system of claim 55 wherein the means for accepting the wager for the user comprises:

means for determining whether the wagering opportunity indicated by the user is a valid wagering opportunity for the user; and means for accepting the wager for the user if the wagering opportunity indicated by the user is a valid wagering opportunity for the user.

79. The system of claim 78 further comprising means for displaying to the user information indicating confirmation of the wager.

80. The system of claim 55 wherein the means for accepting the wager for the user comprises:

means for determining whether the wagering opportunity indicated by the user is a valid wagering opportunity for the user; and means for declining the wager for the user if the wagering opportunity indicated by the user is not a valid wagering opportunity for the user.

81. The system of claim 80 further comprising means for displaying to the user information indicating that the wagering opportunity is an invalid wagering opportunity for the user.

82. The system of claim 48 wherein the means for processing the wager comprises means for displaying to the user information indicating a wager amount for the wager.

83. The system of claim 48 wherein the means for processing the wager comprises means for displaying to the user information indicating a wager description for the wager.

84. The system of claim 48 wherein the means for processing the wager comprises means for displaying to the user information indicating the parties involved in the wager.

85. The system of claim 48 wherein the means for processing the wager comprises means for displaying to the user information indicating when the wager was placed.

86. The system of claim 48 wherein the means for processing the wager comprises means for displaying to the user information indicating an outcome of the wager.

87. The system of claim 48 further comprising means for defining a limit on a wagering amount for the wager.

88. The system of claim 87 wherein the means for defining a limit on a wagering amount for the wager comprises:

means for determining an account balance of the user; and means for defining the limit on the wagering amount to be less than or equal to the account balance of the user.

89. The system of claim 87 wherein the user participates in a fantasy sports contest league within the fantasy sports contest and wherein the means for defining a limit on a wagering amount for the wager comprises means for allowing a league commissioner of the fantasy sports contest application to define the limit on the wagering amount.

90. The system of claim 48 further comprising means for using the fantasy sports contest application to place a wager unrelated to the fantasy sports contest.

91. The system of claim 48 further comprising:

means for defining to whom the wagering contest is directed.

92. The system of claim 48 further comprising means for determining whether to create the wager related to the fantasy sports contest.

93. The system of claim 48, wherein the wagering rules of the fantasy sports contest restrict wagering contest to only participants in the fantasy sports contest.

94. The system of claim 48, wherein the wagering rules of the fantasy sports contest restrict wagering contest to only non-cash prizes.

95. A system for providing to a user the ability to access fantasy sports contests and wagering opportunities, the system comprising:

a fantasy sports contest application configured to:

direct a display device to display to the user fantasy sports contest information received from one or more servers comprising information associated with a fantasy sports contest in which the user participates;

generate an interactive menu for creating a wagering contest by selecting from a plurality of wagering contest attributes in the interactive menu, wherein the plurality of wagering contest attributes available are determined by the information associated with the fantasy sports contest and wagering rules of the fantasy sports contest;

in response to creation of the wagering contest, transmit to other users participating in the fantasy sports contest in which the user participates, an option to place a wager in the created wagering contest;

receive wagers that have been placed in the created wagering contest related to the fantasy sports contest; and process the wager.

96. The system of claim 95 wherein the fantasy sports contest information comprises information for real-life athletic competition that is associated with the fantasy sports contest.

97. The system of claim 95 wherein the fantasy sports contest information comprises information that indicates the performance of the user in the fantasy sports contest.

98. The system of claim 95 wherein the wager comprises a wager based on the user's performance in the fantasy sports contest.

99. The system of claim 95 wherein the wager comprises a wager based on a portion of a real-life sporting event that is related to the fantasy sports contest.

100. The system of claim 95 wherein the wager comprises a wager based on a real-life sporting event that is related to the fantasy sports contest.

101. The system of claim 95 wherein the wager comprises a wager based on more than one real-life sporting event that is related to the fantasy sports contest.

102. The system of claim 95 further comprising a user input device, wherein:

the fantasy sports contest application is further configured to:

define a wagering opportunity for the wager;

direct the display device to display to the user information indicating the wagering opportunity;

receive from the user input device a user indication of the information indicating the wagering opportunity; and accept the wager for the user.

103. The system of claim 102 wherein the user participates in a fantasy sports contest league within the fantasy sports contest and wherein the wagering opportunity comprises an intra-league wagering opportunity between the user and another contestant of the fantasy sports contest league.

104. The system of claim 102 wherein the user participates in a fantasy sports contest league within the fantasy sports contest and wherein the wagering opportunity comprises an intra-league wagering opportunity between the user and a fantasy sports contest application system.

105. The system of claim 102 wherein the user participates in a fantasy sports contest league within the fantasy sports contest and wherein the wagering opportunity comprises an inter-league wagering opportunity between the user and one or more contestants of another fantasy sports contest league.

106. The system of claim 102 wherein the user participates in a fantasy sports contest league within the fantasy sports contest and wherein the wagering opportunity comprises an inter-league wagering opportunity between:

a) the user and one or more other contestants of the fantasy sports contest league; and b) one or more contestants of another fantasy sports contest league.

107. The system of claim 102 wherein the user participates in a fantasy sports contest league within the fantasy sports contest and wherein the wagering opportunity comprises an out-of-league wagering opportunity between the user and another party that does not include any fantasy sports contestants.

108. The system of claim 102 wherein the user participates in a fantasy sports contest league within the fantasy sports contest and wherein the wagering opportunity comprises an out-of-league wagering opportunity between:

a) the user and one or more other contestants of the fantasy sports contest league; and b) another party that does not include any fantasy sports contestants.

109. The system of claim 102 wherein the wagering opportunity comprises a wagering opportunity for money.

110. The system of claim 102 wherein the wagering opportunity comprises a wagering opportunity for fantasy sports contest points.

111. The system of claim 102 wherein the wagering opportunity comprises a wagering opportunity for non-cash prizes.

112. The system of claim 102 wherein the wagering opportunity comprises a wagering opportunity for points redeemable for cash prizes.

113. The system of claim 102 wherein the wagering opportunity comprises a wagering opportunity for points redeemable for non-cash prizes.

114. The system of claim 102 wherein the wagering opportunity comprises a wagering opportunity amount.

115. The system of claim 102 wherein the wagering opportunity comprises a wagering opportunity description.

116. The system of claim 102 wherein the wagering opportunity comprises to whom the wagering opportunity is directed.

117. The system of claim 102 wherein the wagering opportunity comprises a wagering opportunity having a pre-determined payout schedule.

118. The system of claim 102 wherein the wagering opportunity comprises a wagering opportunity at least partially defined for the user using data received from the one or more servers.

119. The system of claim 102 wherein:

the wagering opportunity comprises a wagering opportunity at least partially defined by the user; and the fantasy sports contest application is further configured to:

provide to the user the ability to at least partially define the wagering opportunity; and define the wagering opportunity to be the wagering opportunity at least partially defined by the user.

120. The system of claim 119 wherein:

the wagering opportunity at least partially defined by the user comprises a valid wagering opportunity; and the fantasy sports contest application is further configured to:

determine that the wagering opportunity at least partially defined by the user is a valid wagering opportunity; and define the wagering opportunity to be the wagering opportunity at least partially defined by the user.

121. The system of claim 120 wherein the fantasy sports contest application is further configured to direct the display device to display to the user information indicating confirmation of the wagering opportunity.

122. The system of claim 119 wherein:

the wagering opportunity at least partially defined by the user is an invalid wagering opportunity; and the fantasy sports contest application is further configured to:

determine that the wagering opportunity at least partially defined by the user is an invalid wagering opportunity; and not define the wagering opportunity to be the wagering opportunity at least partially defined by the user.

123. The system of claim 122 wherein the fantasy sports contest application is further configured to direct the display device to display to the user information indicating that the wagering opportunity is invalid.

124. The system of claim 122 wherein the fantasy sports contest application is further configured to provide to the user the ability to at least partially redefine the wagering opportunity.

125. The system of claim 102 wherein the fantasy sports contest application is further configured to:

determine whether the wagering opportunity indicated by the user is a valid wagering opportunity for the user; and accept the wager for the user if the wagering opportunity indicated by the user is a valid wagering opportunity for the user.

126. The system of claim 125 wherein the fantasy sports contest application is further configured to direct the display device to display to the user information indicating confirmation of the wager.

127. The system of claim 102 wherein the fantasy sports contest application is further configured to:

determine whether the wagering opportunity indicated by the user is a valid wagering opportunity for the user; and decline the wager for the user if the wagering opportunity indicated by the user is not a valid wagering opportunity for the user.

128. The system of claim 127 wherein the fantasy sports contest application is further configured to direct the display device to display to the user information indicating that the wagering opportunity is an invalid wagering opportunity for the user.

129. The system of claim 95 wherein the fantasy sports contest application is further configured to direct the display device to display to the user information indicating a wager amount for the wager.

130. The system of claim 95 wherein the fantasy sports contest application is further configured to direct the display device to display to the user information indicating a wager description for the wager.

131. The system of claim 95 wherein the fantasy sports contest application is further configured to direct the display device to display to the user information indicating the parties involved in the wager.

132. The system of claim 95 wherein the fantasy sports contest application is further configured to direct the display device to display to the user information indicating when the wager was placed.

133. The system of claim 95 wherein the fantasy sports contest application is further configured to direct the display device to display to the user information indicating an outcome of the wager.

134. The system of claim 95 wherein the fantasy sports contest application is further configured to define a limit on a wagering amount for the wager.

135. The system of claim 134 wherein the fantasy sports contest application is further configured to:

determine an account balance of the user; and define the limit on the wagering amount to be less than or equal to the account balance of the user.

136. The system of claim 134 further comprising a user input device of a league commissioner of a fantasy sports contest league in which the user participates within the fantasy sports contest, wherein the fantasy sports contest application is further configured to use data received from the user input device to define the limit on the wagering amount for the wager.

137. The system of claim 95 further comprising means for providing to the user the ability to use the fantasy sports contest application to place a wager unrelated to the fantasy sports contest.

138. The system of claim 95 wherein the fantasy sports contest application is further configured to:

define to whom the wagering contest is directed.

139. The system of claim 95 wherein the fantasy sports contest application is further configured to determine whether to create the wager related to the fantasy sports contest.

140. A non-transitory machine-readable medium for a fantasy sports contest application, the machine-readable medium having machine program logic recorded thereon for:

causing to be displayed on a user equipment device, fantasy sports contest information comprising information associated with a fantasy sports contest in which the user participates;

generating an interactive menu for creating a wagering contest by selecting from a plurality of wagering contest attributes in the interactive menu, wherein the plurality of wagering contest attributes available are determined by the information associated with the fantasy sports contest and wagering rules of the fantasy sports contest;

in response to the creation of the wagering contest, transmitting to other users participating in the fantasy sports contest in which the user participates, an option to place a wager in the created wagering contest;

receiving, on the user equipment device, wagers that have been placed in the created wagering contest; and processing the wager.

141. The non-transitory machine-readable medium of claim 140 wherein causing the user fantasy sports contest information to be displayed comprises causing information for real-life athletic competition that is associated with the fantasy sports contest to be displayed.

142. The non-transitory machine-readable medium of claim 140 wherein causing the user fantasy sports contest information to be displayed comprises causing information that indicates the performance of the user in the fantasy sports contest.

143. The non-transitory machine-readable medium of claim 140 further comprising using the fantasy sports contest application to place a wager based on the user's performance in the fantasy sports contest.

144. The non-transitory machine-readable medium of claim 140 further comprising using the fantasy sports contest application to place a wager based on a portion of a real-life sporting event that is related to the fantasy sports contest.

145. The non-transitory machine-readable medium of claim 140 further comprising using the fantasy sports contest application to place a wager based on a real-life sporting event that is related to the fantasy sports contest.

146. The non-transitory machine-readable medium of claim 140 further comprising using the fantasy sports contest application to place a wager based on more than one real-life sporting event that is related to the fantasy sports contest.

147. The non-transitory machine-readable medium of claim 140 wherein placing a wager comprises:

defining a wagering opportunity for the wager;

displaying to the user information indicating the wagering opportunity;

receiving a user indication of the information indicating the wagering opportunity; and accepting the wager for the user.

148. The non-transitory machine-readable medium of claim 147 wherein the user participates in a fantasy sports contest league within the fantasy sports contest and wherein defining a wagering opportunity comprises defining an intra-league wagering opportunity between the user and another contestant of the fantasy sports contest league.

149. The non-transitory machine-readable medium of claim 147 wherein the user participates in a fantasy sports contest league within the fantasy sports contest and wherein defining a wagering opportunity comprises defining an intra-league wagering opportunity between the user and a fantasy sports contest application system.

150. The non-transitory machine-readable medium of claim 147 wherein the user participates in a fantasy sports contest league within the fantasy sports contest and wherein defining a wagering opportunity comprises defining an inter-league wagering opportunity between the user and one or more contestants of another fantasy sports contest league.

151. The non-transitory machine-readable medium of claim 147 wherein the user participates in a fantasy sports contest league within the fantasy sports contest and wherein defining a wagering opportunity comprises defining an inter-league wagering opportunity between:

a) the user and one or more other contestants of the fantasy sports contest league; and b) one or more contestants of another fantasy sports contest league.

152. The non-transitory machine-readable medium of claim 147 wherein the user participates in a fantasy sports contest league within the fantasy sports contest and wherein defining a wagering opportunity comprises defining an out-of-league wagering opportunity between the user and another party that does not include any fantasy sports contestants.

153. The non-transitory machine-readable medium of claim 147 wherein the user participates in a fantasy sports contest league within the fantasy sports contest and wherein defining a wagering opportunity comprises defining an out-of-league wagering opportunity between:

a) the user and one or more other contestants of the fantasy sports contest league; and b) another party that does not include any fantasy sports contestants.

154. The non-transitory machine-readable medium of claim 147 wherein defining a wagering opportunity comprises defining a wagering opportunity for money.

155. The non-transitory machine-readable medium of claim 147 wherein defining a wagering opportunity comprises defining a wagering opportunity for fantasy sports contest points.

156. The non-transitory machine-readable medium of claim 147 wherein defining a wagering opportunity comprises defining a wagering opportunity for non-cash prizes.

157. The non-transitory machine-readable medium of claim 147 wherein defining a wagering opportunity comprises defining a wagering opportunity for points redeemable for cash prizes.

158. The non-transitory machine-readable medium of claim 147 wherein defining a wagering opportunity comprises defining a wagering opportunity for points redeemable for non-cash prizes.

159. The non-transitory machine-readable medium of claim 147 wherein defining a wagering opportunity comprises defining a wagering opportunity amount.

160. The non-transitory machine-readable medium of claim 147 wherein defining a wagering opportunity comprises defining a wagering opportunity description.

161. The non-transitory machine-readable medium of claim 147 wherein defining a wagering opportunity comprises defining to whom the wagering opportunity is directed.

162. The non-transitory machine-readable medium of claim 147 wherein defining a wagering opportunity comprises defining a wagering opportunity having a pre-determined payout schedule.

163. The non-transitory machine-readable medium of claim 147 wherein defining a wagering opportunity comprises using application data to at least partially define the wagering opportunity for the user.

164. The non-transitory machine-readable medium of claim 147 wherein defining a wagering opportunity comprises:

providing to the user the ability to at least partially define the wagering opportunity; and defining the wagering opportunity to be the wagering opportunity at least partially defined by the user.

165. The non-transitory machine-readable medium of claim 164 wherein defining the wagering opportunity to be the wagering opportunity at least partially defined by the user comprises:

determining whether the wagering opportunity at least partially defined by the user is a valid wagering opportunity; and defining the wagering opportunity to be the wagering opportunity at least partially defined by the user when the wagering opportunity at least partially defined by the user is a valid wagering opportunity.

166. The non-transitory machine-readable medium of claim 165 further comprising machine program logic recorded thereon for displaying to the user information indicating confirmation of the wagering opportunity.

167. The non-transitory machine-readable medium of claim 164 wherein defining the wagering opportunity to be the wagering opportunity at least partially defined by the user comprises:

determining whether the wagering opportunity at least partially defined by the user is a valid wagering opportunity; and not defining the wagering opportunity to be the wagering opportunity at least partially defined by the user when the wagering opportunity at least partially defined by the user is not a valid wagering opportunity.

168. The non-transitory machine-readable medium of claim 167 further comprising machine program logic recorded thereon for displaying to the user information indicating that the wagering opportunity is invalid.

169. The non-transitory machine-readable medium of claim 167 further comprising machine program logic recorded thereon for providing to the user the ability to at least partially redefine the wagering opportunity.

170. The non-transitory machine-readable medium of claim 147 wherein accepting the wager for the user comprises:

determining whether the wagering opportunity indicated by the user is a valid wagering opportunity for the user; and accepting the wager for the user if the wagering opportunity indicated by the user is a valid wagering opportunity for the user.

171. The non-transitory machine-readable medium of claim 170 further comprising machine program logic recorded thereon for displaying to the user information indicating confirmation of the wager.

172. The non-transitory machine-readable medium of claim 147 wherein accepting the wager for the user comprises:

determining whether the wagering opportunity indicated by the user is a valid wagering opportunity for the user; and declining the wager for the user if the wagering opportunity indicated by the user is not a valid wagering opportunity for the user.

173. The non-transitory machine-readable medium of claim 172 further comprising machine program logic recorded thereon for displaying to the user information indicating that the wagering opportunity is an invalid wagering opportunity for the user.

174. The non-transitory machine-readable medium of claim 140 wherein processing the wager comprises displaying to the user information indicating a wager amount for the wager.

175. The non-transitory machine-readable medium of claim 140 wherein processing the wager comprises displaying to the user information indicating a wager description for the wager.

176. The non-transitory machine-readable medium of claim 140 wherein processing the wager comprises displaying to the user information indicating the parties involved in the wager.

177. The non-transitory machine-readable medium of claim 140 wherein processing the wager comprises displaying to the user information indicating when the wager was placed.

178. The non-transitory machine-readable medium of claim 140 wherein processing the wager comprises displaying to the user information indicating an outcome of the wager.

179. The non-transitory machine-readable medium of claim 140 further comprising machine program logic recorded thereon for defining a limit on a wagering amount for the wager.

180. The non-transitory machine-readable medium of claim 179 wherein defining a limit on a wagering amount for the wager comprises:

determining an account balance of the user; and defining the limit on the wagering amount to be less than or equal to the account balance of the user.

181. The non-transitory machine-readable medium of claim 179 wherein the user participates in a fantasy sports contest league within the fantasy sports contest and defining a limit on a wagering amount for the wager comprises defining the limit on the wagering amount by a league commissioner of the fantasy sports contest league.

182. The non-transitory machine-readable medium of claim 140 further comprising machine program logic recorded thereon for providing to the user the ability to use the fantasy sports contest application to place a wager unrelated to the fantasy sports contest.

183. The non-transitory machine-readable medium of claim 140 wherein creating a wagering contest related to the fantasy sports contest comprises:

defining to whom the wagering contest is directed.

184. The non-transitory machine-readable medium of claim 140 further comprising machine program logic recorded thereon for determining whether to create the wager related to the fantasy sports contest.

* * * * *

UNITED STATES PATENT AND TRADEMARK OFFICE

CERTIFICATE OF CORRECTION

PATENT NO. : 8,538,563 B1
APPLICATION NO. : 10/234349
DATED : September 17, 2013
INVENTOR(S) : David Barber It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2598 days.

Signed and Sealed this
Thirteenth Day of January, 2015

Michelle K. Lee

Michelle K. Lee
*Deputy Director of the United States Patent and Trademark Office*